US008566721B2

(12) United States Patent
Langmacher et al.

(10) Patent No.: US 8,566,721 B2
(45) Date of Patent: Oct. 22, 2013

(54) EDITING KEY-INDEXED GRAPHS IN MEDIA EDITING APPLICATIONS

(75) Inventors: Tom Langmacher, Washougal, WA (US); Samuel Joseph Liberto, III, Portland, OR (US)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 12/433,886

(22) Filed: Apr. 30, 2009

(65) Prior Publication Data

US 2010/0281366 A1  Nov. 4, 2010

(51) Int. Cl.
*G06F 3/00* (2006.01)
*G06T 13/00* (2011.01)

(52) U.S. Cl.
USPC ........................ 715/720; 345/473; 345/474

(58) Field of Classification Search
USPC ........................................................ 715/720
See application file for complete search history.

(56) References Cited

U.S. PATENT DOCUMENTS

| | | |
|---|---|---|
| 4,714,400 A | 12/1987 | Barnett et al. |
| 4,868,687 A | 9/1989 | Penn et al. |
| 5,151,998 A | 9/1992 | Capps |
| 5,204,969 A | 4/1993 | Capps et al. |
| 5,331,111 A | 7/1994 | O'Connell |
| 5,359,712 A | 10/1994 | Cohen et al. |
| 5,659,793 A | 8/1997 | Escobar et al. |
| 5,664,216 A | 9/1997 | Blumenau |
| 5,682,326 A | 10/1997 | Klingler et al. |
| 5,692,117 A * | 11/1997 | Berend et al. ................. 345/475 |
| 5,812,983 A | 9/1998 | Kumagai |
| 5,835,611 A | 11/1998 | Kaiser et al. |
| 5,874,950 A | 2/1999 | Broussard et al. |
| 5,892,506 A | 4/1999 | Hermanson |
| 5,929,867 A | 7/1999 | Herbstman et al. |
| 5,940,573 A | 8/1999 | Beckwith |
| 5,999,173 A | 12/1999 | Ubillos |
| 5,999,195 A | 12/1999 | Santangeli |
| 6,011,562 A | 1/2000 | Gagne et al. |
| 6,023,016 A | 2/2000 | Tamura |
| 6,108,011 A * | 8/2000 | Fowler .......................... 345/441 |
| 6,150,598 A | 11/2000 | Suzuki et al. |
| 6,154,221 A * | 11/2000 | Gangnet ....................... 345/442 |
| 6,154,600 A | 11/2000 | Newman et al. |

(Continued)

FOREIGN PATENT DOCUMENTS

WO  WO 2009/122213  10/2009
WO  WO 2010/106586  9/2010

OTHER PUBLICATIONS

Cinelerra CV Manual, available at http://cinelerra.org/docs/split_manual_en/cinelerra_cv_manual_en_toc.html, Chapters 1,2 and 18, Mar. 8, 2008.*

(Continued)

*Primary Examiner* — Boris Pesin
*Assistant Examiner* — Matthew Ell
(74) *Attorney, Agent, or Firm* — Adeli & Tollen LLP

(57) ABSTRACT

Some embodiments of the invention provide media editing applications with novel key-indexed graph editing operations. In some embodiments, the media editing application allows a user to modify such a graph without actually selecting any key index on the graph. In some embodiments, the media editing application allows a user to modify the graph by interacting with one or more shapes that are defined in terms of the graph, without selecting any of the key indices that are used to specify the graph.

32 Claims, 40 Drawing Sheets

(56) References Cited

U.S. PATENT DOCUMENTS

| | | | |
|---|---|---|---|
| 6,154,601 A | 11/2000 | Yaegashi et al. | |
| 6,239,846 B1* | 5/2001 | Billing | 348/578 |
| 6,266,103 B1 | 7/2001 | Barton et al. | |
| 6,365,817 B1 | 4/2002 | Suzuki et al. | |
| 6,392,135 B1 | 5/2002 | Kitayama | |
| 6,469,711 B2 | 10/2002 | Foreman et al. | |
| 6,504,545 B1 | 1/2003 | Browne et al. | |
| 6,512,522 B1 | 1/2003 | Miller et al. | |
| 6,544,294 B1 | 4/2003 | Greenfield et al. | |
| 6,704,029 B1 | 3/2004 | Ikeda et al. | |
| 6,744,968 B1 | 6/2004 | Imai et al. | |
| 6,763,175 B1 | 7/2004 | Trottier et al. | |
| 6,828,971 B2 | 12/2004 | Uesaki et al. | |
| 6,867,787 B1 | 3/2005 | Shimizu et al. | |
| 6,873,955 B1 | 3/2005 | Suzuki et al. | |
| 6,881,888 B2 | 4/2005 | Akazawa et al. | |
| 6,928,613 B1 | 8/2005 | Ishii et al. | |
| 6,956,574 B1 | 10/2005 | Cailloux et al. | |
| 7,006,688 B2 | 2/2006 | Zaklika et al. | |
| 7,030,872 B2 | 4/2006 | Tazaki | |
| 7,062,713 B2 | 6/2006 | Schriever et al. | |
| 7,134,093 B2 | 11/2006 | Etgen et al. | |
| 7,194,676 B2 | 3/2007 | Fayan et al. | |
| 7,225,405 B1 | 5/2007 | Barrus et al. | |
| 7,239,316 B1 | 7/2007 | Cox et al. | |
| 7,317,457 B2* | 1/2008 | Felt | 345/473 |
| 7,319,764 B1 | 1/2008 | Reid et al. | |
| 7,325,199 B1 | 1/2008 | Reid | |
| 7,355,606 B2 | 4/2008 | Paquette | |
| 7,518,611 B2* | 4/2009 | Boyd et al. | 345/473 |
| 7,546,532 B1 | 6/2009 | Nichols et al. | |
| 7,725,828 B1 | 5/2010 | Johnson | |
| 7,932,909 B2 | 4/2011 | Niles et al. | |
| 8,006,195 B1 | 8/2011 | Woodings et al. | |
| 8,286,081 B2 | 10/2012 | Langmacher et al. | |
| 2001/0020953 A1 | 9/2001 | Moriwake et al. | |
| 2001/0036356 A1 | 11/2001 | Weaver et al. | |
| 2001/0040592 A1 | 11/2001 | Foreman et al. | |
| 2002/0044148 A1 | 4/2002 | Ludi | |
| 2002/0143545 A1 | 10/2002 | Tamura et al. | |
| 2002/0154140 A1 | 10/2002 | Tazaki | |
| 2002/0154156 A1 | 10/2002 | Moriwake et al. | |
| 2002/0154173 A1 | 10/2002 | Etgen et al. | |
| 2002/0156805 A1 | 10/2002 | Schriever et al. | |
| 2002/0163498 A1 | 11/2002 | Chang et al. | |
| 2003/0035555 A1 | 2/2003 | King et al. | |
| 2003/0117431 A1 | 6/2003 | Moriwake et al. | |
| 2003/0146915 A1 | 8/2003 | Brook et al. | |
| 2003/0164845 A1 | 9/2003 | Fayan et al. | |
| 2004/0071441 A1 | 4/2004 | Foreman et al. | |
| 2004/0088723 A1 | 5/2004 | Ma et al. | |
| 2004/0199395 A1 | 10/2004 | Schulz | |
| 2005/0007383 A1 | 1/2005 | Potter et al. | |
| 2005/0231512 A1 | 10/2005 | Niles et al. | |
| 2006/0005130 A1 | 1/2006 | Hiroi et al. | |
| 2006/0008247 A1 | 1/2006 | Minami et al. | |
| 2006/0109271 A1 | 5/2006 | Lomask | |
| 2007/0093913 A1 | 4/2007 | Ferguson et al. | |
| 2007/0104384 A1 | 5/2007 | Shaw | |
| 2007/0159487 A1 | 7/2007 | Felt | |
| 2008/0080721 A1 | 4/2008 | Reid et al. | |
| 2008/0129735 A1 | 6/2008 | Buck | |
| 2008/0253735 A1* | 10/2008 | Kuspa et al. | 386/52 |
| 2008/0255902 A1 | 10/2008 | Poer et al. | |
| 2009/0201310 A1 | 8/2009 | Weiss | |
| 2009/0297022 A1 | 12/2009 | Pettigrew et al. | |
| 2010/0201692 A1 | 8/2010 | Niles et al. | |
| 2010/0214872 A1 | 8/2010 | Schmid et al. | |
| 2010/0275121 A1 | 10/2010 | Johnson | |
| 2010/0281367 A1 | 11/2010 | Langmacher et al. | |
| 2010/0281380 A1 | 11/2010 | Langmacher et al. | |
| 2010/0281404 A1 | 11/2010 | Langmacher et al. | |
| 2011/0131526 A1 | 6/2011 | Vronay et al. | |
| 2011/0258547 A1 | 10/2011 | Symons et al. | |

OTHER PUBLICATIONS

Allen et al., Apple Pro Training Series Motion 3, Aug. 30, 2007, p. 372, 375.*

Author Unknown, "Adobe Premiere Pro CS3: User Guide," Month Unknown, 2007, Adobe Systems Incorporated, San Jose, California, USA.

Author Unknown, "Adobe Director 11: User Guide," Month Unknown, 2008, Adobe Systems Incorporated, San Jose, California, USA.

Author Unknown, "Using Adobe Flash CS4 Professional," Month Unknown, 2008, Adobe Systems Incorporated, San Jose, California, USA.

Author Unknown, "Using Adobe Premiere Elements 8 Editor," Month Unknown, 2009, Adobe Systems Incorporated, San Jose, California, USA.

Cinelerra Linux Video Editing, Cinelerra Cv Manual Section 18: Keyframing, Feb. 16, 2008, http://cinelerra.org/docs/wiki/doku.php?id=english_manual:cinelerra_cv_en_18.

KDenLive Open Source Video Editing, Keyframe for Every Video and Audio Effect Variable in the Effects Stack, Nov. 10, 2008 through May 1, 2009, http://www.kdenlive.org/mantis/view.php?id=336&nbn=11.

Portions of prosecution history of U.S. Appl. No. 10/337,925, Sep. 27, 2007, Reid, Glenn, et al.

Portions of prosecution history of U.S. Appl. No. 12/475,601, Dec. 18, 2009, Langmacher, Tom, et al.

Portions of prosecution history of U.S. Appl. No. 12/475,602, Dec. 18, 2009, Langmacher, Tom, et al.

Portions of prosecution history of U.S. Appl. No. 12/475,598, Dec. 18, 2009, Langmacher, Tom, et al.

Jones, Jerry, "India Pro Special Effects Titler," The Ken Stone Index, Apr. 1, 2002, pp. 1-18.

Meade, Tom, et al., "Maya 6: The Complete Reference," Month N/A, 2004, pp. iv-xviii, 194, 204, McGraw-Hill Professional, USA.

Spencer, Mark, "Working with Keyframes in Motion, Part 1: Creating and Manipulating Keyframes," The Ken Stone Index, Feb. 11, 2005.

Stone, Ken, "Boris Calligraphy: Text Generators for Final Cut Pro 3 Title Creation and Animation with 'Title 3D' and 'Title Crawl'," The Ken Stone Index, Jan. 14, 2002, pp. 1-11.

Stone, Ken, "The Basics—Editing with Transitions in Final Cut Pro," The Ken Stone Index, Jun. 12, 2001, pp. 1-8.

Stone, Ken, "Using the Text Generators in FCP," The Ken Stone Index, Aug. 27, 2001, pp. 1-13.

Updated portions of prosecution history of U.S. Appl. No. 12/475,601, Feb. 6, 2012, Langmacher, Tom, et al.

Updated portions of prosecution history of U.S. Appl. No. 12/475,602, Feb. 10, 2012, Langmacher, Tom, et al.

Updated portions of prosecution history of U.S. Appl. No. 12/475,598, Feb. 2, 2012, Langmacher, Tom, et al.

Author Unknown, "Apple Announces Final Cut Pro 4," NAB, Apr. 6, 2003, pp. 1-3, Apple Inc., Las Vegas, NV, USA.

Author Unknown, "Adobe Premiere Pro CS3: Classroom in a Book," Month Unknown, 2008, pp. 2-3, 201-221, 225-247, Chapters 9 and 10.

Brenneis, Lisa, "Final Cut Pro 3 for Macinotsh: Visual QuickPro Guide," Apr. 2002, 288 pages, Peachpit Press, Berkeley, CA, USA.

Author Unknown, "iMovie '08 Getting Started," Month Unknown, 2008, pp. 1-50, Apple Inc., USA.

Stone, Ken, "Basic Keyframing in Final Cut Express," The Ken Stone Index, Jan. 27, 2003, pp. 1-14, V. 1.0.1, Ken Stone.

Stone, Ken, "Motion Paths and the Bezier Handle in FCP," The Ken Stone Index, Aug. 13, 2001, pp. 1-11, Ken Stone.

Updated portions of prosecution history of U.S. Appl. No. 12/475,598, Mar. 26, 2012, Langmacher, Tom, et al.

Updated portions of prosecution history of U.S. Appl. No. 12/475,601, Oct. 30, 2012, Langmacher, Tom, et al.

Updated portions of prosecution history of U.S. Appl. No. 12/475,602, Sep. 6, 2012, Langmacher, Tom, et al.

Updated portions of prosecution history of U.S. Appl. No. 12/475,598, Oct. 3, 2012, Langmacher, Tom, et al.

* cited by examiner

EDITING KEY-INDEXED GRAPHS IN MEDIA EDITING APPLICATIONS

CROSS REFERENCE TO RELATED APPLICATIONS

This Application is related to the following applications: U.S. patent application Ser. No. 12/475,601, now published as U.S. Patent Publication 2010/0281404, filed May 31, 2009; U.S. patent application Ser. No. 12/475,602, now issued as U.S. Pat. No. 8,286,081, filed May 31, 2009; and U.S. patent application Ser. No. 12/475,598, now issued as U.S. Pat. No. 8,458,593, filed May 31, 2009.

FIELD OF THE INVENTION

The invention relates to editing key-indexed graphs in media editing applications.

BACKGROUND OF THE INVENTION

To date, many media editing applications have been proposed for editing digital graphic design, image editing, audio editing, and video editing. These applications provide graphical designers, media artists, and other users with the tools for creating and editing media presentations. Examples of such applications include Final Cut Pro® and iMovie®, both sold by Apple Computer, Inc.

Several of the media editing applications provide editing tools that allow its user to perform keyframe editing. Typically, keyframe editing entails manipulating keyframes, which are control points that are associated with a particular location in a media clip. FIG. 1 illustrates manipulating keyframes 105 and 110 to perform keyframe editing. Here, to modify an attribute value at a first keyframe, the user selects the keyframe 105 and drags the keyframe to a new location. To make the attribute values at a second keyframe match the first keyframe, the user repeats the steps described above for the keyframe 110 and aligns the two keyframes 105 and 110.

FIG. 2 illustrates an example of another existing keyframe editing operation. This operation performs an interpolation between the first and second keyframes by manipulating Bezier handles on the keyframes 105 and 110. Specifically, to create the interpolation, the user (i) selects the keyframe 105 such that handles 205 and 210 appear; (ii) selects the handle 210; (iii) adjusts the handle 210 to create a first portion of an inner curve adjacent to the keyframe 105; (iv) selects the keyframe 110 such that handles 215 and 220 appear; (v) selects the handle 215; and (vi) adjusts the handle 215 to create a second portion of the inner curve adjacent to the keyframe 110.

A number of shortcomings exist in the keyframe editing described above. One such shortcoming is that a user of media editing application must know how to manipulate multiple keyframes with a certain amount of precision to create even a simple effect. Furthermore, the user must not only understand how to manipulate Bezier handles but also possess the patience and drawings skills to use them to create a desired interpolation between keyframes.

Therefore, there is a need for a more simplified way of performing keyframe editing. Also, there is a need for a media editing application that allow its user to perform simple to complex keyframe editing with minimal drawing skills and without having to understand how Bezier handles work.

SUMMARY OF THE INVENTION

Some embodiments of the invention provide media editing applications with novel key-indexed graph editing operations. Some media editing applications use key indices (e.g., keyframes) to define a graph that specifies the value of an attribute of a media clip or an attribute of an editing operation over a duration (e.g., a duration of time, a duration of frequencies, etc.). In some embodiment, the media editing application allows a user to modify such a graph without actually selecting any key index on the graph. For example, some embodiments allow the user to directly select the graph and modify it by moving the selected part of the graph to a new location.

In conjunction with this graph selection capability, or instead of it, some embodiments also allow a user to modify the graph by interacting with one or more shapes that are defined in terms of the graph, without selecting any of the key indices that are used to specify the graph. For instance, in some such embodiments, the user can select an interior location within the shape and move it in order to modify the graph.

Some embodiments also allow the user to specify a location for a new key index by selecting an interior location within the shape. For instance, in some such embodiments, when the user selects the interior location of the shape, it causes a new key index to be created on the graph at the horizontal coordinate of the selected location. When a key index is created, some embodiments create and display on the shape a representation of the key index, which the user can select and move in order to cause the key index to be relocated to a new location on the graph. One example of such a representation in some embodiments is a line that spans the shape at the location of the key index. This line can be viewed as dividing the shape into two distinct shapes. Alternatively, as further described below, such a line can simply be viewed as only a selectable control within the shape. Irrespective of its characterization, this line in some embodiments can be used to modify the key-index location, to modify the graph and shape, and/or to place bounds on modifications to the shape and the graph.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
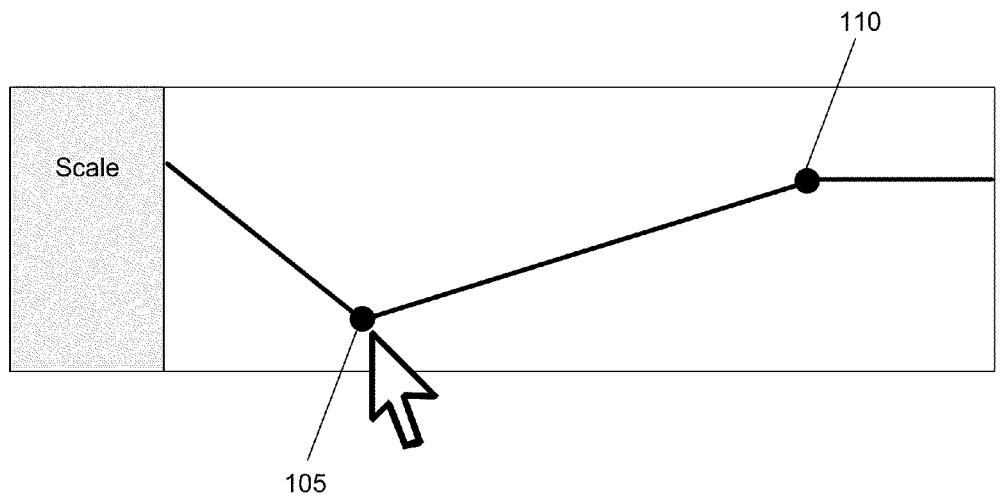
FIGS. 1-2 illustrate conventional keyframe editing.
Figure 2:
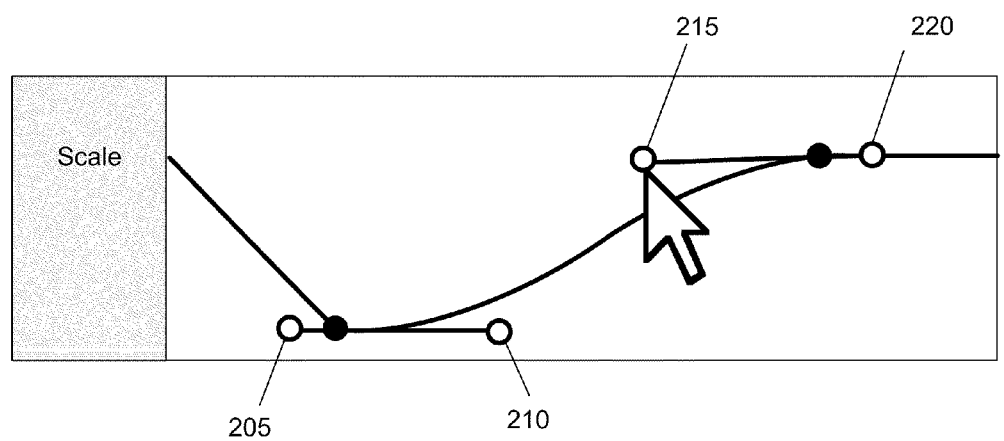

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide media editing applications with novel key-indexed graph editing operations. Some media editing applications use key indices to define a graph that specifies the value of an attribute of a media clip or an attribute of an editing operation over a duration (e.g., a duration of time, a duration of frequencies, etc.). In some embodiment, the media editing application allows a user to modify such a graph without actually selecting any key index. For example, some embodiments allow the user to directly select the graph and modify it by moving the selected part of the graph to a new location.

In conjunction with this graph selection capability, or instead of it, some embodiments also allow a user to modify the graph by interacting with one or more shapes that are defined in terms of the graph, without selecting any of the key indices that are used to specify the graph. Some embodiments provide this graph-selection and shape-selection capability, by defining the key-indexed graph and its associated shape as selectable and modifiable items in the graphical user interface (UI) of the media editing application (i.e., as items that can be selected and modified by the user in the UI). Some of these embodiments also define the key indices as selectable items in the UI, while other embodiments do not.

Several examples of such embodiments will be initially described below by reference to FIGS. 3-7. However, before describing these initial examples, several terms are defined. In some media editing applications, a key index represents a value (e.g., a default value or a user-specified value) of a clip's or an operation's attribute at a particular location along a particular duration. For example, in a fade to black effect for a video clip, a starting key index might represent one point during a duration when an opacity attribute starts to change from fully visible to fully transparent, and an ending key index represents another transitional point during the duration when the change ends. A graph is typically defined between two key indices (e.g., starting key index, ending key index) in order to define a transition that specifies the speed and/or ease at which the attribute value changes. In some cases, the transition between two key indices is linear (e.g., gradual, swift). The transition between the two key indices may also be nonlinear (e.g., exponential).

Media editing applications can use such key indices and graphs to specify the transitioning values of any attribute associated with the edited media content (e.g., media clips) or the editing operations. Different types of media content may have different attributes. For instance, attributes of a video clip may include opacity, axis, color, and scale, while attributes of an audio clip may include volume level, echo, and pan. Moreover, the duration across which the attributes are defined may differ. They may differ in length or in type (e.g., the duration might be expressed in time, or in frequency, or along a different axis).

For some embodiments of the invention, FIGS. 3-7 illustrate several examples of editing a key-indexed graph by modifying the graph without directly selecting the key indices that define the graph. These examples illustrate five different stages of editing a key-indexed graph in a media editing application. For purposes of simplifying the description of these figures, only the key-index graph editing window 300 of the media editing application is shown in these figures. Several more detailed embodiments will be described below for presenting a key-index graph editing window in a media editing application.

Figure 3:
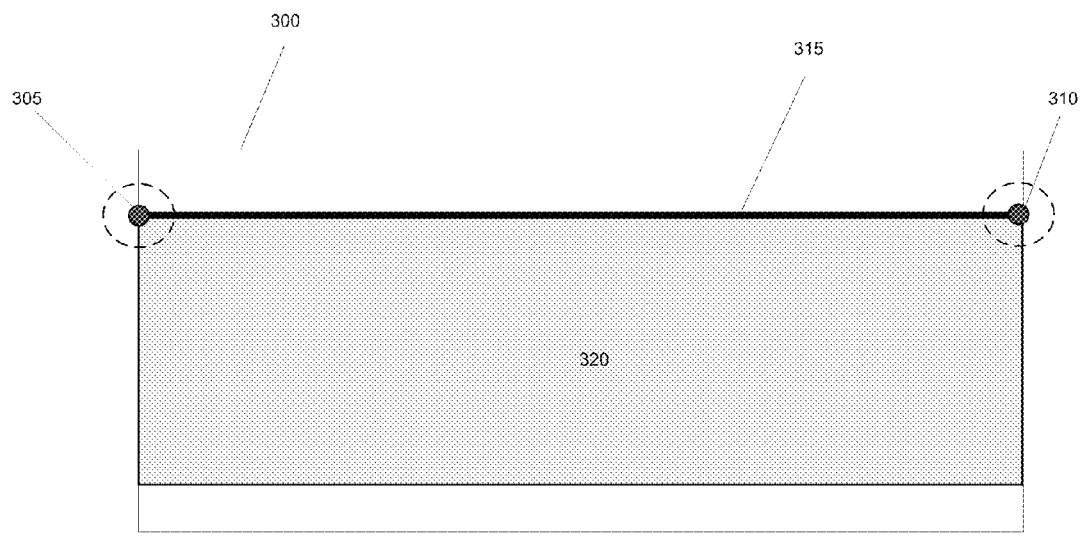
FIG. 3 illustrates an example of a line graph that is initially shown in a key-index graph editing window.

FIG. 3 illustrates a line graph 315 that is initially shown in the key-index graph editing window 300. As shown in this figure, the line graph is defined by reference to two key indices 305 and 310. This graph represents the value of an attribute (e.g., opacity, position, volume level) of a media clip (e.g., audio clip, video clip, text overlay, picture, and/or other media) over a duration of time. This graph also defines a rectangular shape 320 within the window 300 of the media editing application; in other words, the rectangle 320 is initially defined underneath the graph 315. Also, in this example, a timeline (not shown) spans across the window 300. One or more media tracks (not shown) span along this timeline. Each track is for holding one or more media clips, with each clip lasting a particular duration.

Figure 4:
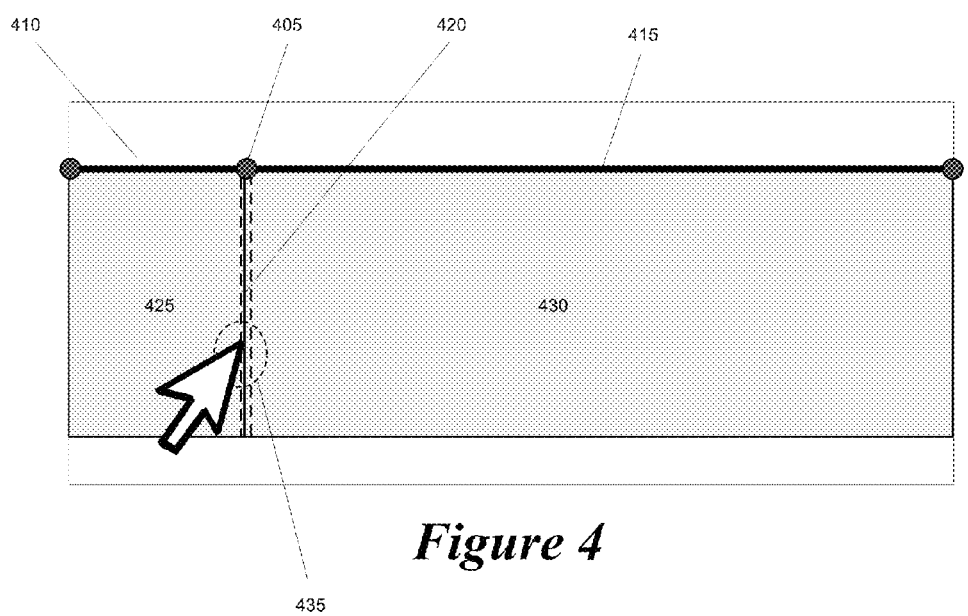
FIG. 4 illustrates an example of modifying a graph by interacting with a rectangular shape.

FIG. 4 illustrates an example of modifying the line graph 315 by interacting with the rectangular shape 320. Specifically, it illustrates that the cursor selection of (e.g., a double click operation within) an interior location 435 within the rectangular shape 320 creates a new key index 405 that divides the line graph 315 into two new portions, line graphs 410 and 415. Specifically, this cursor selection creates the new key index 405 about the horizontal location 435 of the cursor. The new key index 405 defines the new line graph 410 along with the key index 305, and defines the new line graph 415 along with the key index 310.

The media editing applications of different embodiments treat differently the division of the line graph 315 into the two line graphs 410 and 415. For instance, some embodiments discard the line graph 315 and only use the two line graphs 410 and 415 as selectable elements in the graphical user interface of the media editing application. Other embodiments, however, use the new graphs 410 and 415 as conceptual, pictorial representations of the division of the graph 315; in other words, these embodiments maintain the line graph 315 as the selectable element in the GUI, and use the new key index 405 for placing bounds on the modifications that are received directly or indirectly with respect to the line graph 315.

When a key index is created on a graph, some embodiments create and display on a shape that is defined by reference to the graph a representation of the key index. This representation can then be selected and moved in order to cause the key index to be relocated to a new location on the graph. One example of such a representation in some embodiments is a line that spans the shape at the location of the key index. For instance, in FIG. 4, the selection of the interior location of the rectangular shape 320 causes a line 420 to appear on the shape. This line 420 can be viewed as dividing the shape 320 into two distinct shapes 425 and 430. Alternatively, this line 420 can simply be viewed as only a selectable control within the shape.

Figure 5:
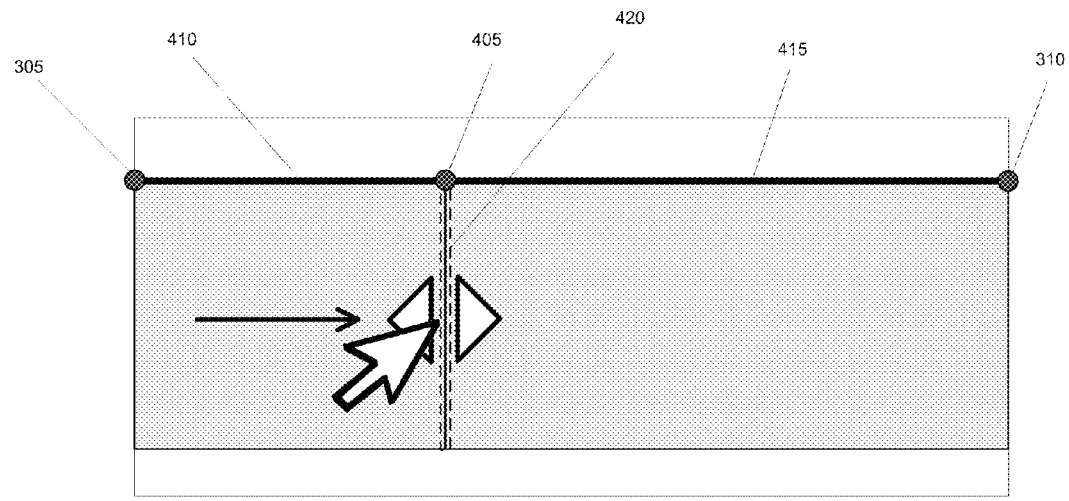
FIG. 5 illustrates an example of moving a key index to a new location on a graph without selecting and moving the key index.

Irrespective of its characterization, this line 420 in some embodiments can be used to modify the location of the key index 405, to modify the graph and shape, and/or to place bounds on modifications to the shape and the graph. For instance, FIG. 5 illustrates an example of moving the key index 405 to a new location on the graph 315 without selecting and moving the key index. Specifically, it illustrates that the cursor selection and movement (e.g., a cursor click and drag operation) of the line 420 along a horizontal direction causes the key index 405 to be moved with the line. The movement also redefines the graphs 410 and 415, as it reduces the distance between the key indices 405 and 310 while distancing the key indices 305 and 405. In other words, the horizontal movement causes the transitional period between the key indices 305 and 405 to increase while causing the transitional period between the key indices 405 and 310 to decrease.

Figure 6:
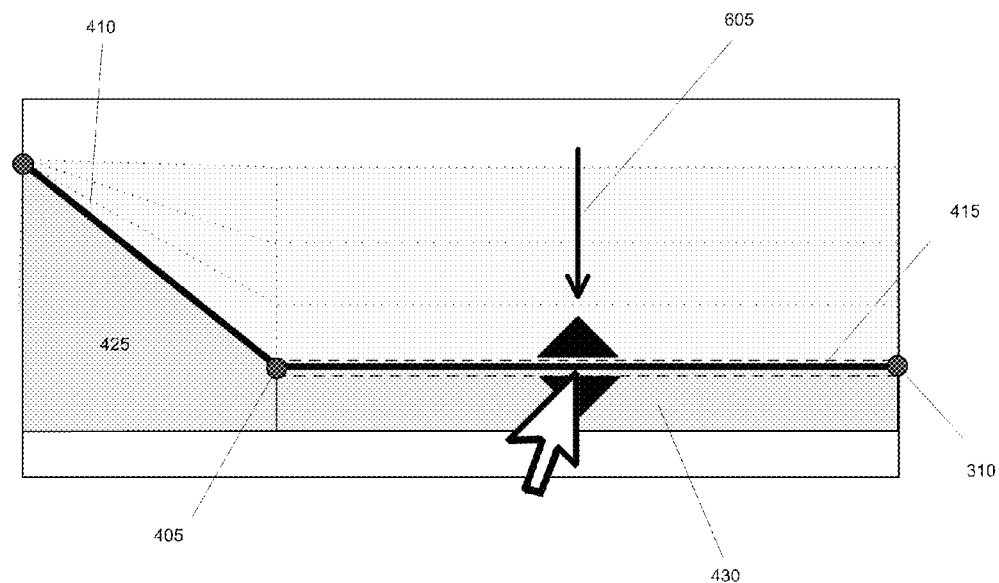
FIG. 6 illustrates an example of selecting modifying graphs without selecting any key index.

FIG. 6 illustrates an example of selectively modifying the graph 315 without selecting any key index. In this example, the graph 315 is modified through the cursor selection and vertical movement 605 (e.g., a cursor click and drag operation) of a part of the line graph 415 that is defined between the two key indices 405 and 310. The vertical movement 605 also causes the rectangular shape 430 that is defined the line graph 415 to be resized. As the key index 405 represents one of the vertices of the line graph 410, the vertical movement 605 further (1) modifies the slope of the line graph 410, and (2) causes the shape 425 to lose its rectangular shape and become trapezoidal.

Figure 7:
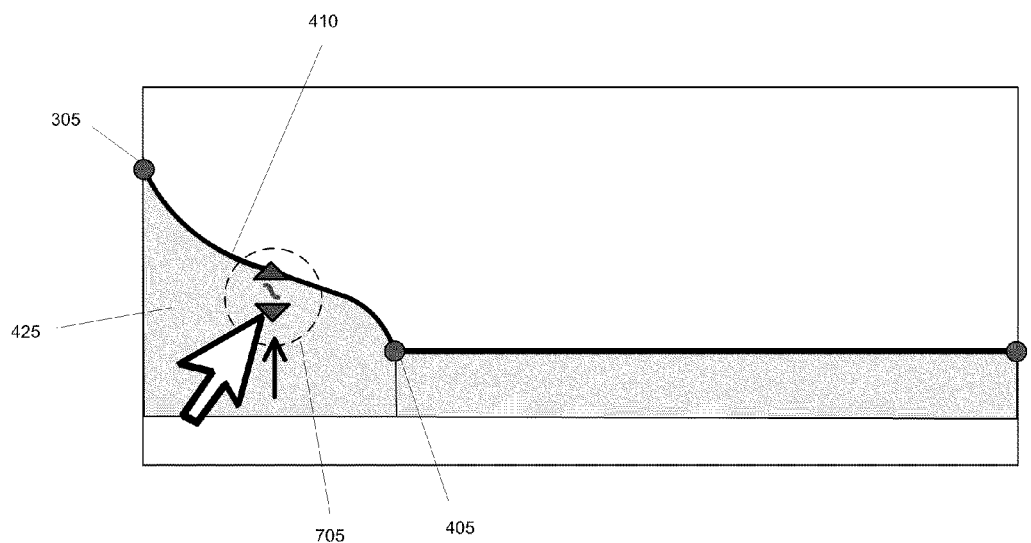
FIG. 7 illustrates an example of forming a curve on a graph by interacting with a modified shape.

FIG. 7 illustrates an example of modifying the key-indexed graph 315 by interacting with a shape that is defined by reference to this graph. In this example, an interior location 705 within the shape 425 is selected and moved vertically (e.g., through a click and drag operation) towards the line graph 410. This selection and movement of the interior location causes a curve to be formed on the line graph 410. In some embodiments, the cursor selection and movement of the interior location creates a smooth curve by pushing out or pulling in a part of the line graph while smoothing out other parts. For instance, in FIG. 7, the selection and movement creates the smooth curve by pushing out a part of the line graph 410 about the selected interior location while at the same time pulling in a part adjacent to the key index 305.

The examples illustrated in FIGS. 3-7 were described above to include certain features. However, one of ordinary skill will realize that not all these features need to be used together. For instance, some embodiments might allow an interior location of a shape to be selected in order to create key indices but might not allow it to be manipulated in order to create a curve. Similarly, some embodiment might allow a key-indexed graph to be selected and moved anywhere along its duration but might not allow a representation of a key index (e.g., line) to be selected and moved.

Several more detailed examples of manipulating key-indexed graphs will be described below. However, before describing these examples, an exemplary media editing application that implements the graph editing operations of some embodiments will be described below in Section I. Section II then describes several examples of populating a graph editor with several key-indexed graphs. Section II also describes several examples of manipulating key-indexed graphs using a graph editor. Section III follows that discussion with a description of the software modules and data structures used to implement some embodiments of the media editing application. Lastly, Section IV describes a computer system which implements some embodiments of the invention.

I. Media Editing Application

Figure 8:
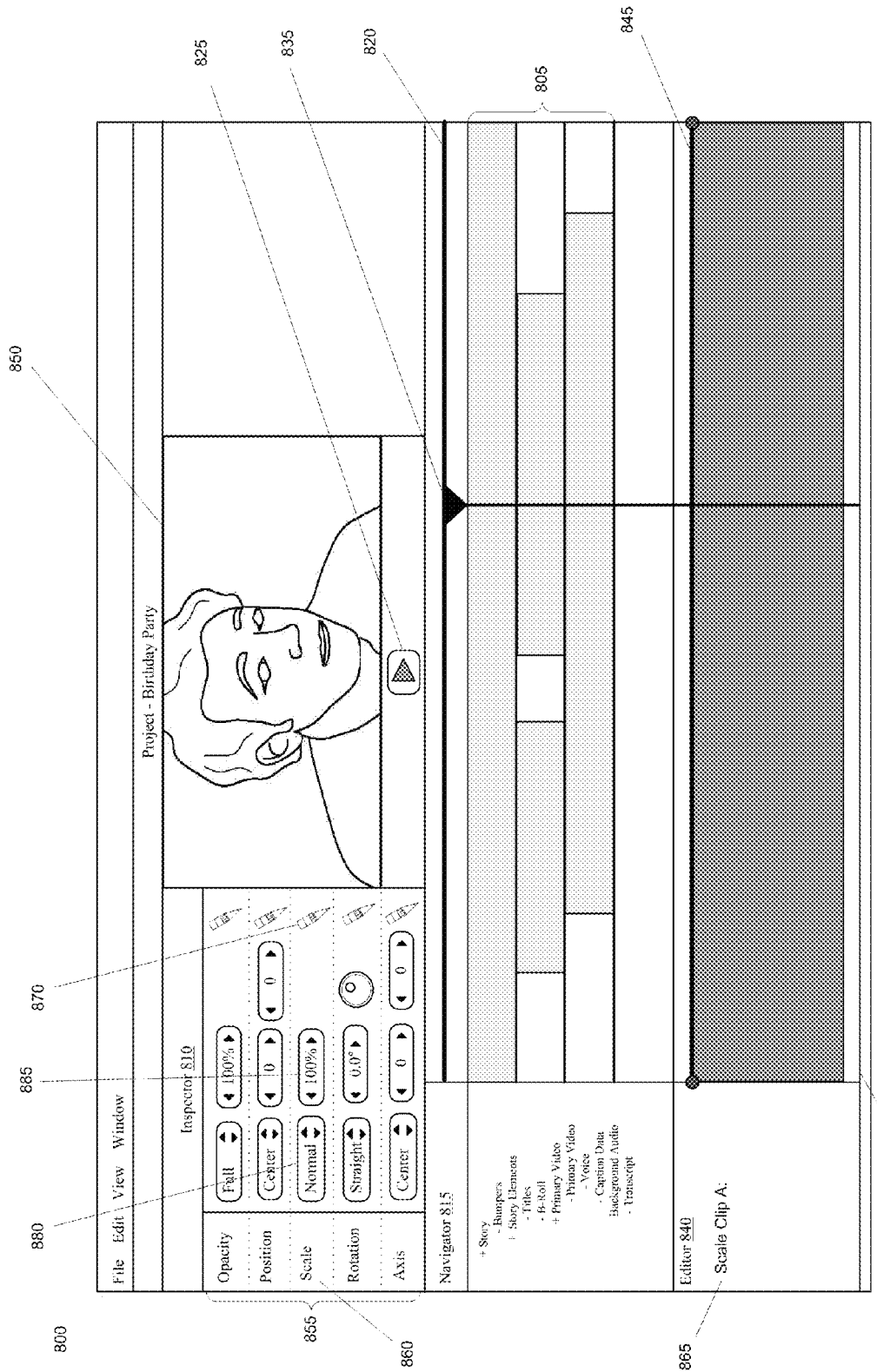
FIG. 8 provide an illustrative example of a graphical user interface ("GUI") of a media editing application with a graph editor.

FIG. 8 illustrates a graphical user interface ("GUI") 800 of a video editing application that uses the novel key-indexed graph editing operations of some embodiments of the invention. As shown in these figures, the GUI 800 includes a preview display area 850, a composite display area 805, an attribute display area 810, a timeline 820, and a media browser 815, and a graph editor 840 with a graph editing window 875.

The preview display area 850 displays the preview of the media presentation that the media editing application creates. The composite display area 805 provides a visual representation of the composite presentation being created by the application's user. It displays one or more geometric shapes that represent one or more pieces of media content that are a part of the media presentation. In the example illustrated in FIG. 8, the composite display area 805 is an area that includes multiple media tracks that span across the timeline 820. One or more pieces of media content can be placed on each track.

The attribute display area 810 is an area in the GUI 800 through which the application's user can view attributes of media content in the media presentation, or media editing operations for the media presentation. The user can select one or more attributes in this area 810. For some or all attributes, such a selection will cause an editable graph to be presented in the graph editing window 875 in order to allow the user to view and possibly edit the graph. The attribute display area 810 also provides various user interface tools 855 (e.g., list boxes, text fields, buttons, radial dials, etc.) for modifying the attributes.

The timeline 820 represents a duration or a portion of the duration in the media presentation. A time marker (also called a playhead) 835 is situated on the timeline 820. The user of the media editing application can drag the time marker along the timeline to display a preview of the media presentation at a particular point in the presentation, or to play the preview starting from the particular point by selecting the play button 825.

The media browser 815 is an area in the GUI 800 through which the user can view media content in the media presentation. For instance, in FIG. 8, the media browser lists several items that represent the different pieces in the media presentation. In some embodiments, these items are organized hierarchically, and several of the items may be selected to hide or reveal one or more of the pieces.

The graph editor 840 is the area in the application that displays the graph editing window 875. This window 875 displays one or more key-indexed graphs that can be modified by a user according to one or more of the novel graph editing operations of some embodiments of the invention. In the example illustrated in FIG. 8, the window 875 displays the graph 845 that is associated with a scale attribute of the media content over a particular duration of the media presentation. The graph editor shows this association by (i) displaying a description 865 of the attribute and (ii) displaying the key-indexed graph 845 over a particular duration in the timeline 820.

In the example illustrated in FIG. 8, the key-indexed graph 845 is provided in a separate window 875 that is dedicated for displaying such graphs in the media editing application. However, in some embodiments, one or more such graphs may be provided in another window in the media editing application. For instance, in some such embodiments, one or more such graphs may be shown in the composite display area 805 with the clip representations (e.g., on top of, adjacent to, the clip representations).

Figure 9A:
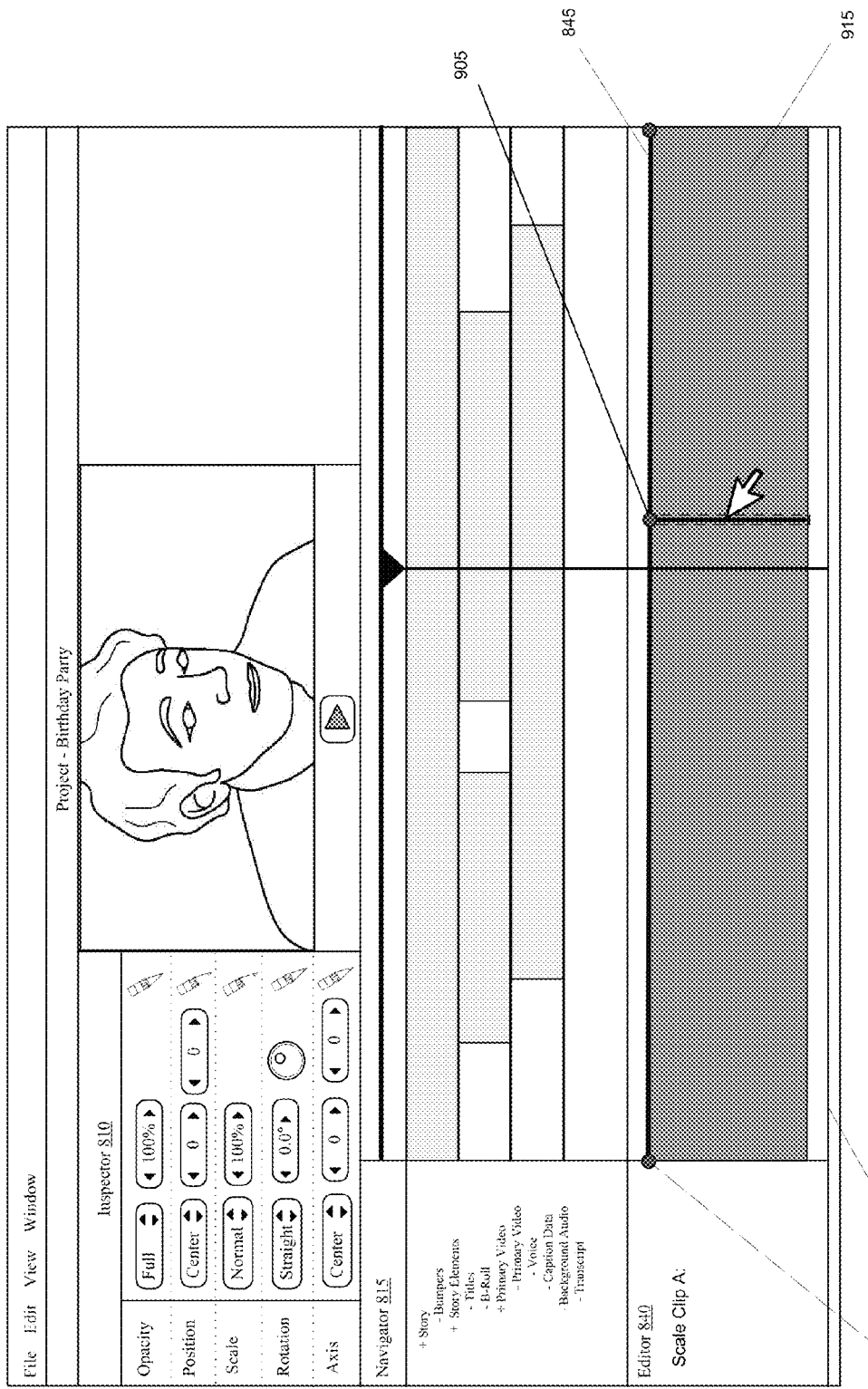
FIGS. 9A and 9B illustrate an example modifying a graph using the GUI that is illustrated in FIG. 8.
Figure 9B:
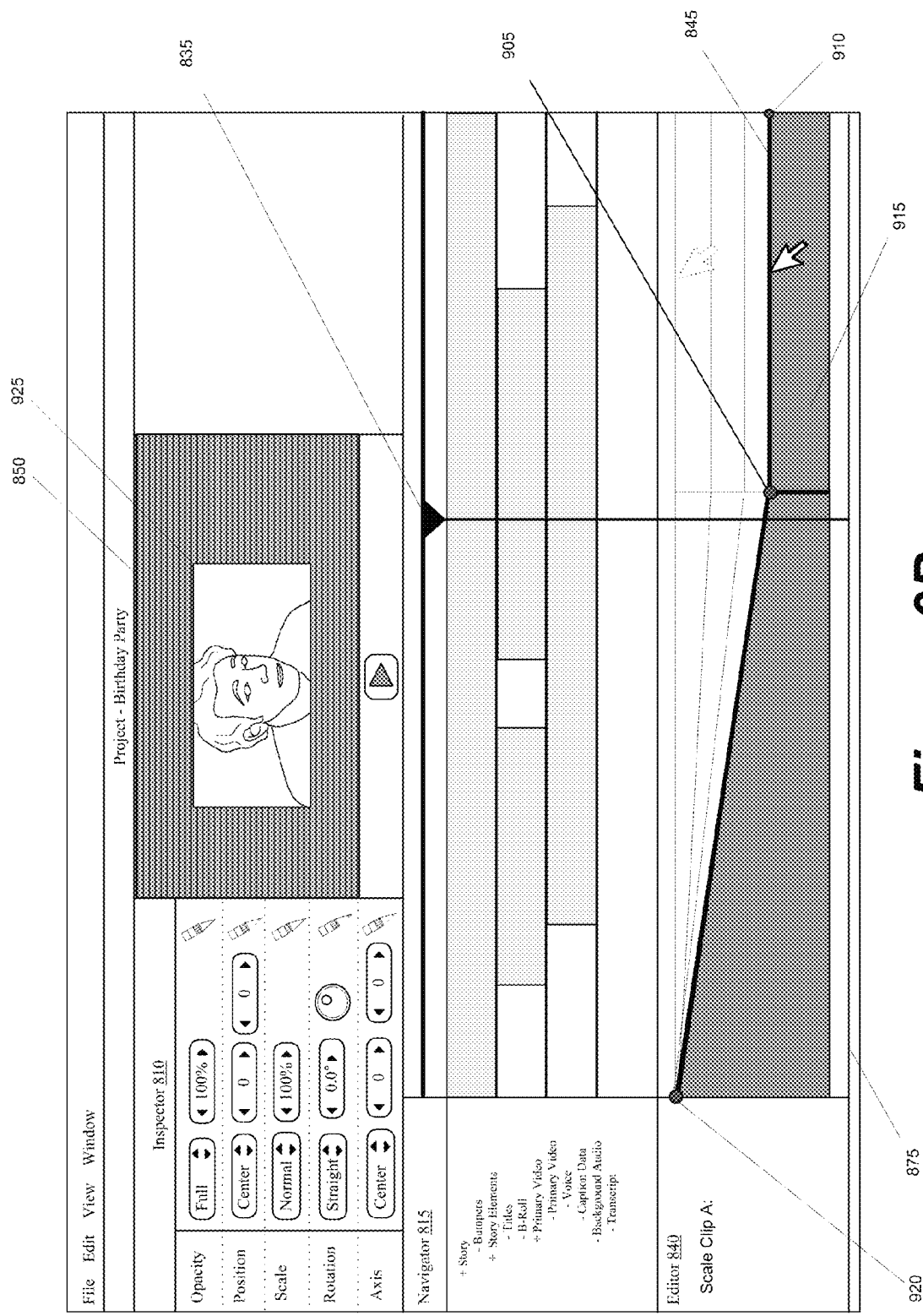
Figure 10:
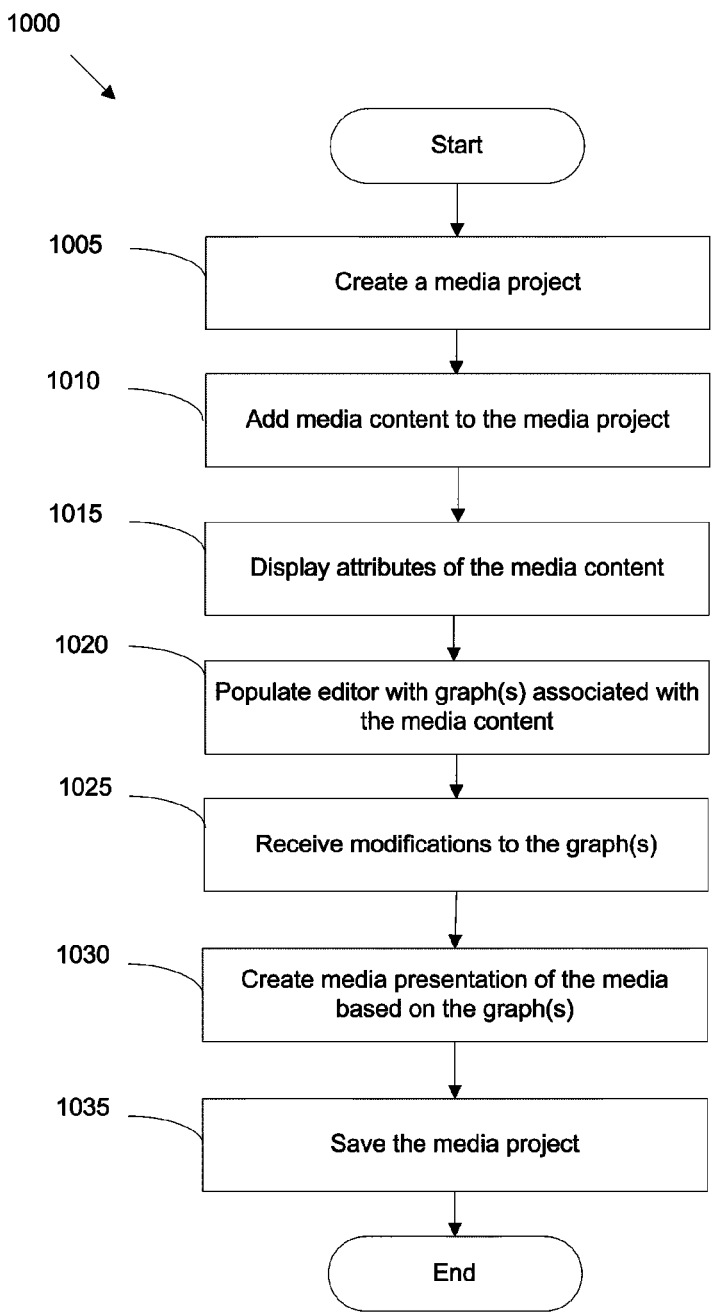
FIG. 10 illustrates a process that a media editing application performs in response to user input.

To describe the operation of the video editing application of FIG. 8, FIG. 10 illustrates a process 1000 that the video editing application performs in response to user input, while the user uses the application and its graph editing operations to create a media presentation. The number and sequence of operations in this process are arbitrary as the user might perform any number of operations in any sequence to create a presentation. The process 1000 of FIG. 10 will be described by reference to FIG. 8, FIGS. 9A and 9B, which show the GUI 800 at two different stages during an editing session than FIG. 8. FIG. 8 illustrates the GUI 800 before receiving a modification to a key-indexed graph 845 that is illustrated in the graph editing window 875, while FIGS. 9A and 9B illustrate it after receiving the modifications.

The process 1000 begins at 1005 when it receives input to a create media presentation project. In some embodiments, the media presentation project is a file that stores data about a media presentation. For examples, the project can include data such as a title, time code data, a media content's start and end time, a media content's attribute settings, filter settings, etc. The project may be created in a number of different ways. For instance, it may be created by a user selecting a menu item such as a "new project" item from a pull-down menu, selecting a toolbar icon, selecting a shortcut key, etc.

The process then adds (at 1010) media content to the media presentation project. In some embodiments, this is initiated by receiving a user's selection of one or more pieces of media content. For instance, the media presentation of FIG. 8 is a composite presentation that is formed by several pieces of media content that are illustrated on several different tracks of the composite display area 805.

At 1015, the process then displays attributes of the media content. The attributes of the media content may be displayed in a variety of different ways. For instance, in FIG. 8, the attributes of the video clip are listed in the attribute display area 810. These listed attributes include opacity, rotation, position, scale, and axis. In some embodiments, the media editing application displays the attributes when a user selects a representation of a piece of media content in a GUI. For instance, in FIG. 8, the attributes of the video clip may be displayed in the attribute display area 810 by selecting one of the representations on a track of the composite display area 805.

At 1020, the process populates a graph editor with one or more key-indexed graphs. Different embodiments populate the graph editor differently. For instance, in the example illustrated in FIG. 8, the graph editor 840 may be populated with the graph 845 by the user selecting a description 860 of the attribute in the attribute display area 810, and dragging and dropping it in the graph editor. The graph editor may also be populated by the user selecting an icon 870.

The process 1000 then receives (at 1025) modification to one or more of the key-indexed graphs. A graph (like graph 845) that is displayed in the graph editor can be modified when the user adjusts one of the user interface tools 855 (e.g., list boxes, text fields, buttons, radial dials, etc.). For instance, the user can drag the time marker 835 along the time line 820 to a particular point in time and modify the scale of the video clip at the particular point in time by directly adjusting a list box control 880 and/or a text box control 885.

A graph (like graph 845) that is displayed in the graph editor may also be modified by a user interacting with the graph in accordance with any one of the editing operations described above or below. FIGS. 9A and 9B illustrate one example of such an editing operation. Specifically, FIG. 9A illustrates the graph 845 after a new key index 905 has been created in response to a user's selection (e.g., through a cursor click operations such as a double click) of an interior location of within a shape 915 associated with the graph 845.

FIG. 9B then illustrates the graph 845 after the user has selected and moved downwards (e.g., though a cursor click and drag operation) the portion of the graph to the right of the key index 905. The selection and movement causes the scale attribute across a portion of the graph starting from the key index 905 and ending at key index 910 to be reduced by a constant value. Also, as the key index 905 represents an ending index for a portion of the graph starting from a key index 920, the movement creates a negative slope on the portion. This result in the scale attribute starting normally at the key index 920 and transitioning to about half at the key index 905. In FIG. 9B, this reduction in scaling value is pictorially illustrated as the smaller size of the clip that is displayed in the preview display area for the specified playhead 835 location.

At 1030, the process 1000 then creates the media presentation based on one or more of the key-indexed graphs. In some embodiments, the media editing application creates the media presentation by compositing the media content into the media presentation with the attribute values defined by one or more of the graphs. For instance, in some such embodiments, to composite the media content, the media editing application identifies attribute values at key indices and any transition between the key indices. The media editing application then composites the media content by interpolating the attribute values between the key indices according to one or more of the identified transitions. Lastly, the process (at 1035) saves the media project and ends.

Although though the process 1000 is described by reference to 1005-1035, one of ordinary skill in the art would understand that the process may not be performed in the same order, or may exclude one or more operations. For instance, a user of the media editing application may intersperse the graph editing operations with iterative selections of and edits to the media content.

II. Key-Indexed Graph Editing

As mentioned above, some embodiments provide several novel key-indexed graph editing operations for manipulating one or more key-indexed graphs. Several different examples of operations for modifying one or more key index graphs will be described below. In some cases, these different operations may be used conjunctively (i.e., all together) in one application, while in other cases, some of the operations may be alternatives to one another. When these operations are used conjunctively in one application, some embodiments allow a user to differentiate one operation from another operation by providing user interface tools, user interface techniques, and/or shortcuts (e.g., through the use of hotkeys). This will be further elaborated in the examples described below. Several examples of populating and manipulating the key-indexed graphs will now be described by reference to FIGS. 11-40.

A. Populating a Graph Editing Window

Figure 11:
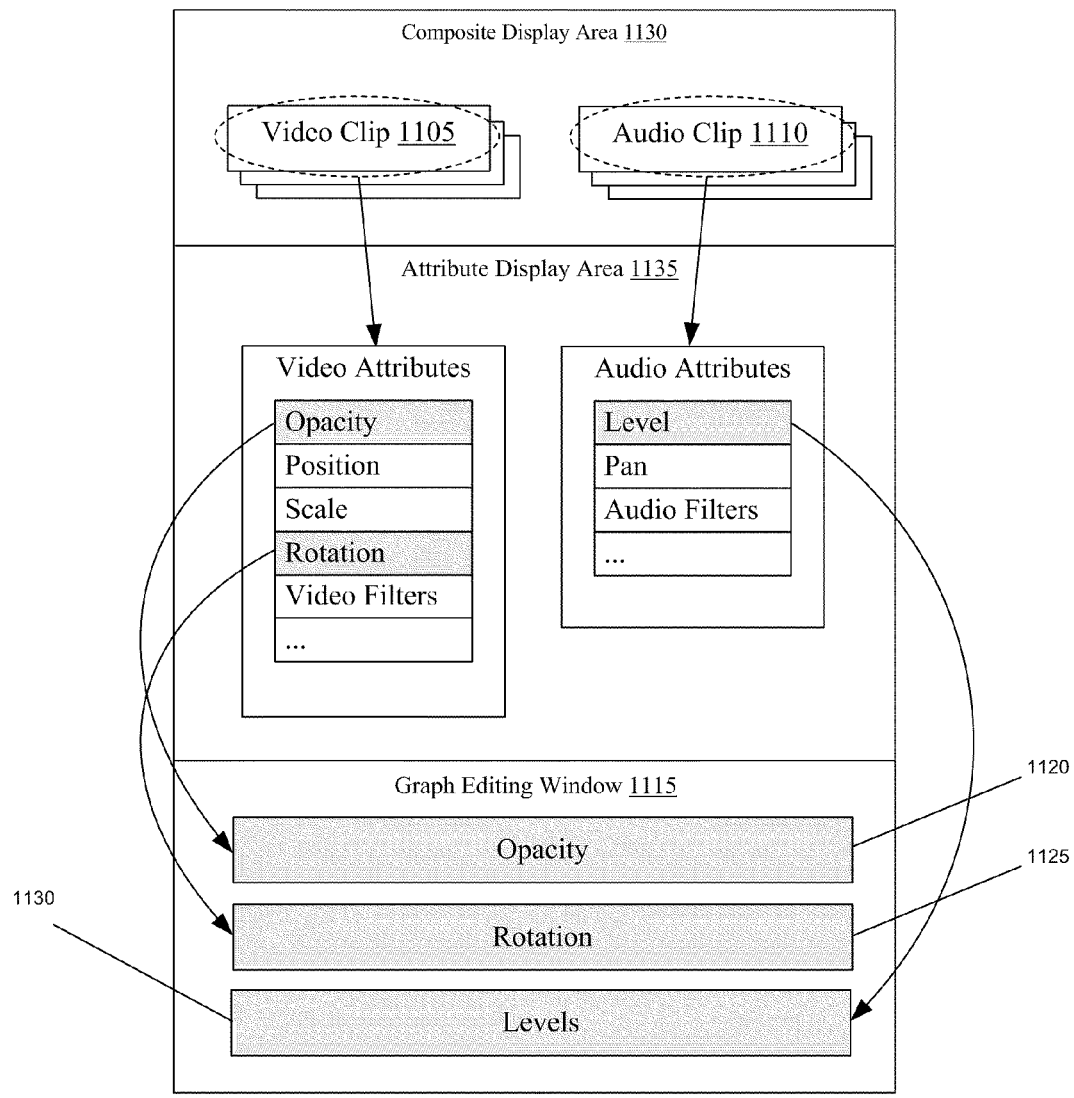
FIG. 11 conceptually illustrates an example of populating a graph editing window with key-indexed graphs.

FIG. 11 conceptually illustrates an example of populating a graph editing window 1115 with key-indexed graphs 1120-1130. In this example, a user of the media editing application populates the window 1115 with graphs associated with two different types of media content (i.e., video content, audio content) in a media project. Specifically, to populate the window, the user first selects a video clip 1105 in the composite display area 1130 of a media editing application, and then for this video clip, selects an opacity attribute in an attribute display area 1135 in order to populate it with the graph 1120. The user then selects a rotation attribute in the attribute display area 1135, in order to populate the window with the graph 1125. The user also selects an audio clip 1110 in the composite display area 1130, and then selects a level attribute in the attribute display area 1135, in order to populate the window with the graph 1130.

FIG. 11 also illustrates that the graph editing window 1115 may be populated with one or more key-indexed graphs associated other attributes of an editing operation. Specifically, the figure illustrate that the window may be populated with editing operation attributes such as filters. Filters, in some embodiments, are media editing components that may be associated with a piece of media content to create an effect. For instance, a color correction filter may be applied to a video clip, in order to adjust the color of the video clip; similarly, a twirl filter creates a twirling effect on the video clip, a blur filter creates a blurring effect on the video clip, etc. An audio clip may also be associated with filters, such as an echo filter that creates an echo, noise reduction filter that reduces noise, pass band filter that allows a range of frequencies to pass through while preventing other frequencies, etc.

In some embodiments, instead of manually populating a graph editor, the media editing application automatically populates the graph editor with one or more key-indexed graphs. For instance, in some such embodiments, when a user of the media editing applications selects a media content for a media presentation, the user is automatically presented with a graph editor that includes several key-indexed graphs associated with attributes of the media content.

B. Creating Key Indices

FIGS. 12-15 illustrate several examples of creating new key indices. Specifically, these figures illustrate creating new key indices by (i) selecting an interior location within a shape that is defined by a graph displayed in a graph editor window or (ii) selecting a location on the graph editor that is outside of the window. In these and other examples that follow, a graph editor 1200 includes a graph editing window 1240. The window displays graphs 1215 and 1220. The graph 1215 is associated with an opacity attribute of a media clip over a duration and defines a shape 1205, while the graph 1220 is associated with a scale attribute of the media clip over the duration and defines a shape 1260.

Figure 12:
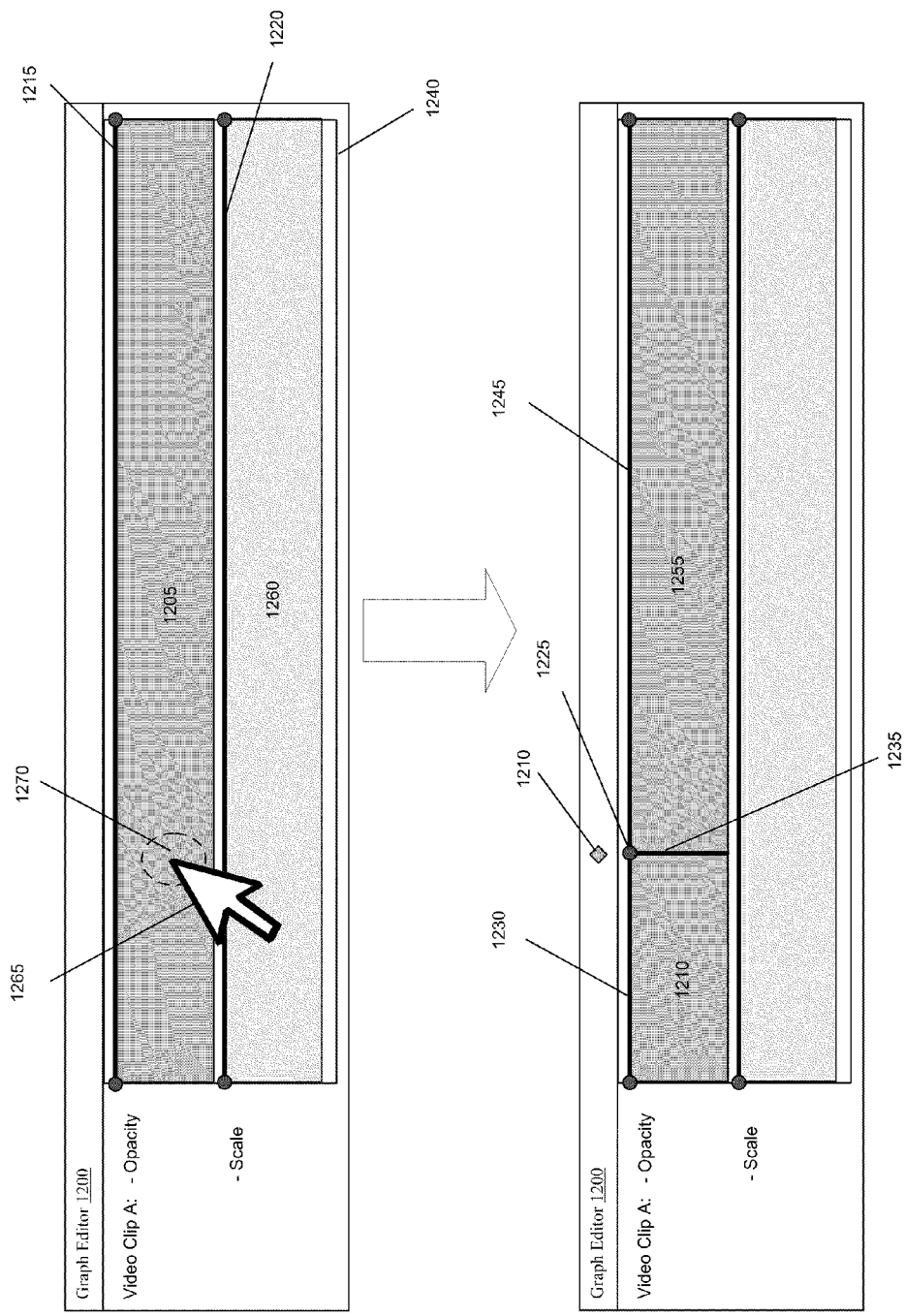
FIG. 12 illustrates creating a new key index by selecting an interior location within a shape that is defined by a graph.

FIG. 12 illustrates creating a new key index 1225 by selecting an interior location within the shape 1205 that is defined by the graph 1215. Similar to the example described above, this figure illustrates a cursor 1265 as performing a cursor selection of (e.g., a double click operation within) an interior location 1270 of the shape. It further illustrates that this selection causes the graph to divide into two portions (i.e., graphs 1230 and 1245) about the horizontal location of the cursor. As mentioned above, the media editing applications of different embodiments treat differently the division of the graph 1215 into the two line graphs 1230 and 1245. For instance, some embodiments discard the line graph 1215 and only use the two line graphs 1230 and 1245 as selectable elements in the graphical user interface of the media editing application. Other embodiments, however, use the new graphs 1230 and 1245 as conceptual, pictorial representations of the division of the graph 1215; in other words, these embodiments maintain the graph 1215 as the selectable element in the GUI, and use the new key index 1225 for placing bounds on the modifications that are received directly or indirectly with respect to the line graph 1215.

When a key index is created on a graph, some embodiments create and display on a shape that is defined by reference to the graph a representation of a key index. This representation can then be selected and moved in order to cause the key index to be relocated to a new location on the graph. One example of such a representation in some embodiments is a line that spans the shape at the location of the key index. For instance, in FIG. 12, the selection of the interior location of the shape 1205 causes a line 1235 to appear on the shape. This line 1235 can be viewed as dividing the shape 1205 into two distinct shapes 1210 and 1255. Alternatively, this line 1235 can simply be viewed as only a selectable control within the shape.

The media editing applications of different embodiments treat differently the division of the shape 1205 into the two shapes 1210 and 1255. For instance, some embodiments discard the shape 1205 and only use the shapes 1210 and 1255 as selectable elements in the graphical user interface of the media editing application. Other embodiments, however, use the new shapes 1210 and 1255 as conceptual, pictorial representations of the division of the shape 1205; in other words, these embodiments maintain the shape 1205 as the selectable element in the GUI, and use the new line 1235 and/or the key index 1225 for placing bounds on the modifications that are received directly or indirectly with respect to the shape 1205.

Instead of displaying a representation on a shape, or in conjunction with this, some embodiments display a representation of a new key index on a graph editor. For instance, FIG. 12 illustrates that when the key index 1225 is created, a symbol 1210 that represents the key index is displayed on the graph editor 1200. Specifically, the symbol is displayed on the graph editor at the horizontal coordinate of the key index. Similar to the line on the shape of the graph, the representation in some embodiments is a selectable graphical user interface item that the user can select and move in order to cause the key index to be relocated to a new location on the graph.

Figure 13:
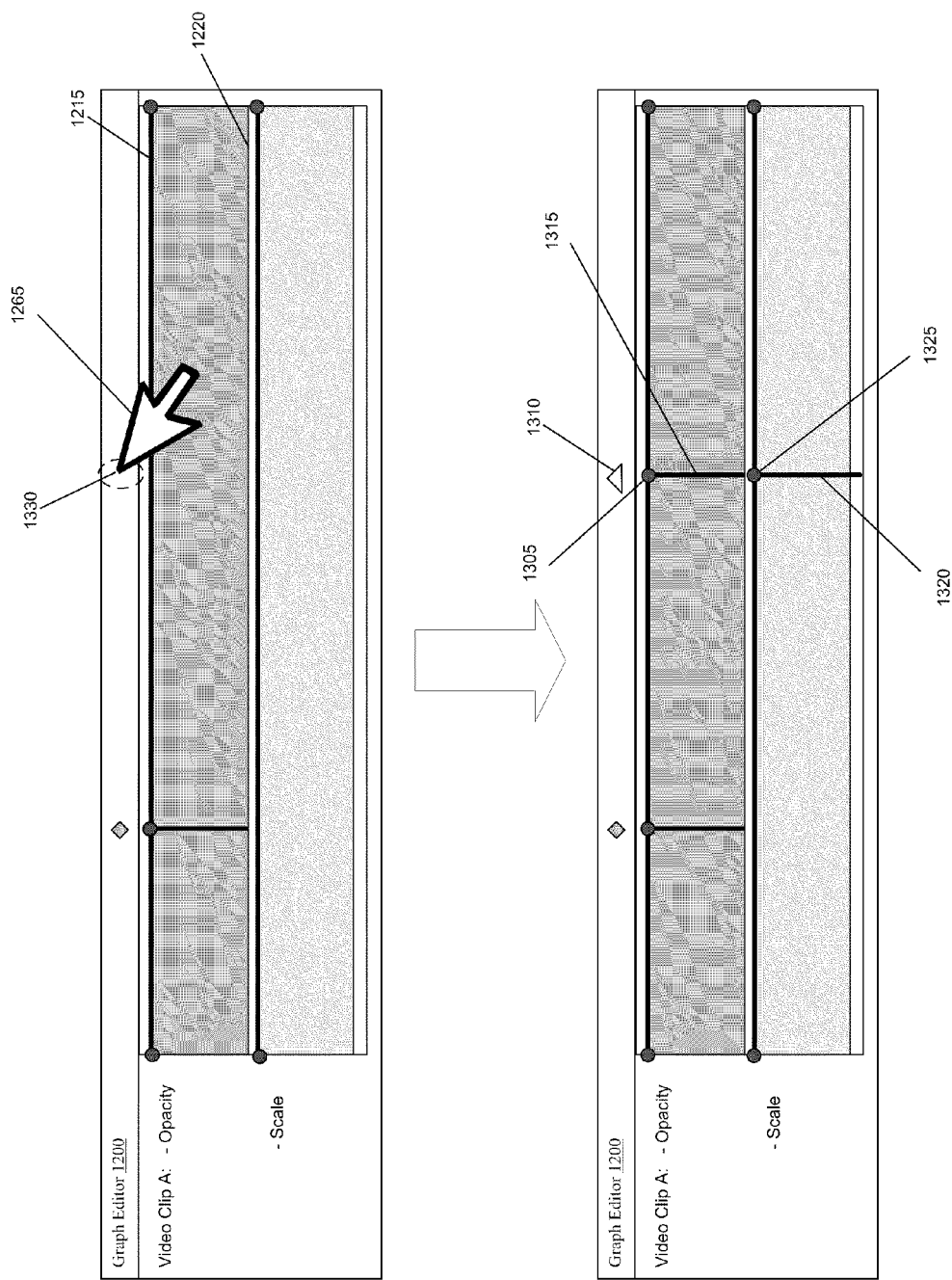
FIG. 13 illustrates an example of selecting a location on a graph editor in order to create two new key indices.

FIG. 13 illustrates an example of selecting a location on the graph editor 1200 outside of the window 1240 in order to create two new key indices 1305 and 1325. Specifically, it illustrates the cursor 1265 as selecting (e.g., through a double click operation) one location 1330 on the graph editor 1200. As shown in FIG. 13, this selection creates two new key indices 1305 and 1325, where one key index 1305 is associated with opacity graph 1215, while the other key index 1325 is associated with the scale graph 1220. In this example, the new key indices are created across the graphs 1215 and 1220 about the horizontal coordinate of the selected location. Also, two new lines 1315 and 1320 that correspond to the two new key indices are displayed across the graphs 1215 and 1220 about the horizontal coordinate of the selected location.

In some embodiments, when multiple new key indices are created at a same location along the duration on multiple graphs, some embodiments display one representation for the multiple key indices on a graph editor. For instance, in FIG. 13, as the two new key indices 1305 and 1325 are created at a same location along the duration, the selection causes one symbol 1310 that represents both the two key indices to be displayed on the graph editor 1200. Some embodiments also use such a representation when two key indices that were created at two different times for two different graphs subsequently overlap in time.

In some cases, a user of the media editing application may not want to manipulate multiple different graphs together as one. For instance, when multiple key-indexed graphs are displayed in a graph editor, the user may want to create key indices across only some but not all of the graphs through a single selection of a location on a graph editor. Accordingly, some embodiments allow the user to choose one or more key-indexed graphs to modify. In some such embodiments, the user can select or deselect a graph for modification by altering its selection state.

Figure 14:
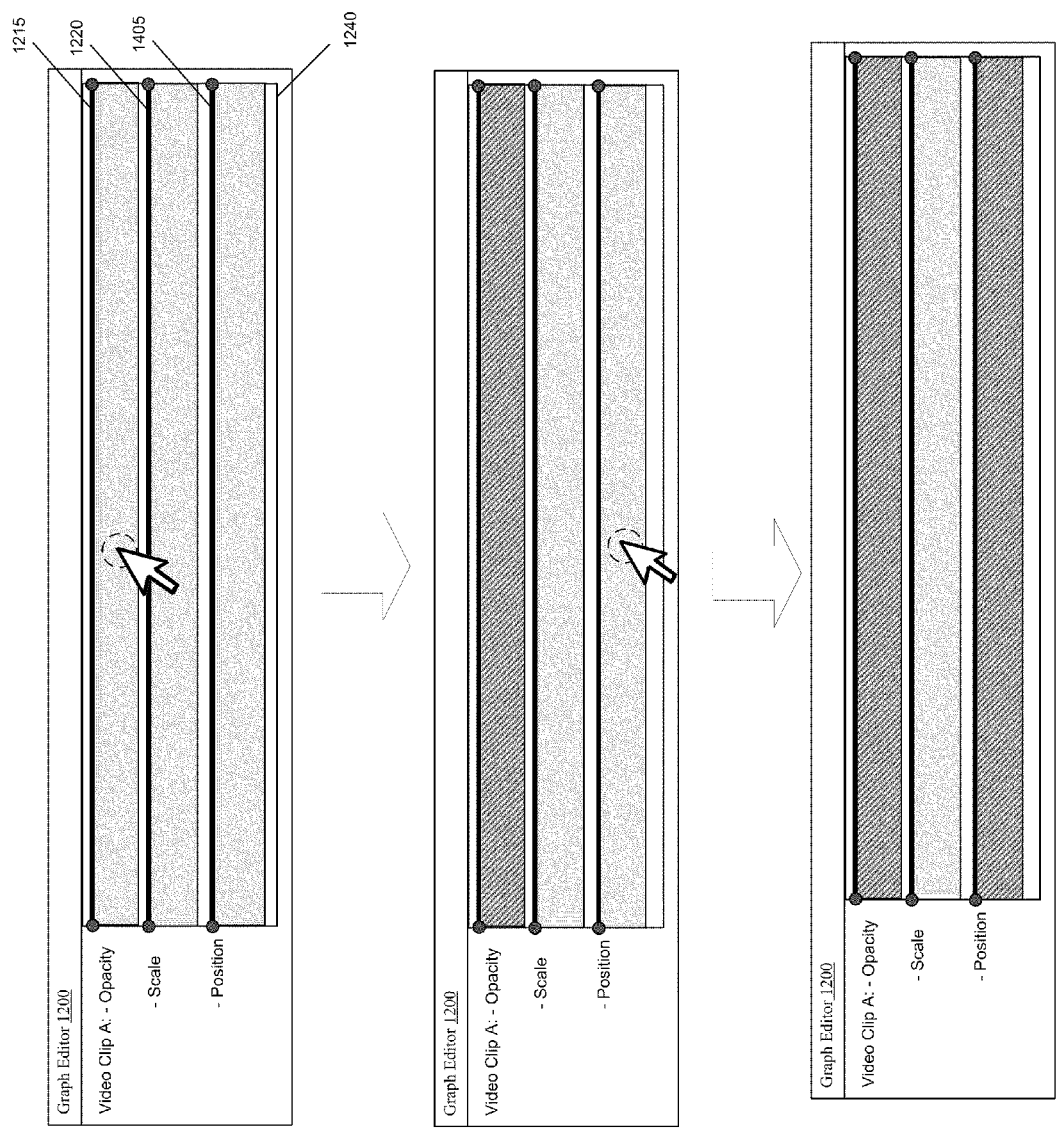
FIG. 14 illustrates an example of altering the selection state of several key-indexed graphs.

FIG. 14 illustrates altering the selection state of several key-indexed graphs. As shown, in addition to the opacity graph 1215 and the scale graph 1220, a graph 1405 that is associated with position of the media clip is displayed in the graph editing window 1240. In this example, the selection states of two of the graphs are altered. Specifically, the user alters the selection states by first selecting the opacity graph 1215 and then selecting the position graph 1405. The graphs 1215 and 1405 may be selected in any number of different ways. For instance, the user may select the graphs 1215 and 1405 through a cursor click operation while holding down a modifier key, by selecting user-interface controls (e.g., check boxes), through hotkeys (e.g., CTRL+A), etc.

Figure 15:
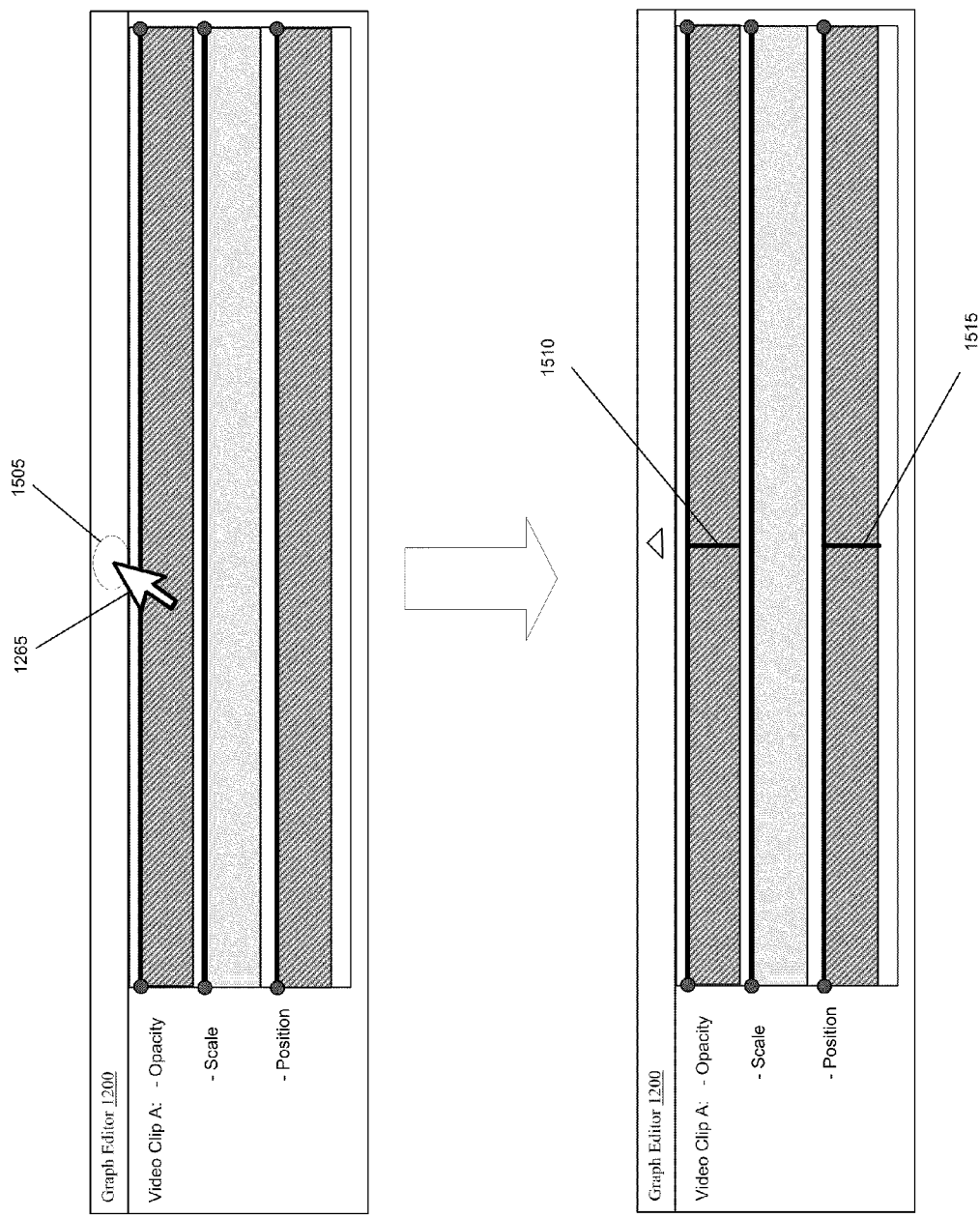
FIG. 15 illustrates an example of creating several key indices across selected key-indexed graphs.

FIG. 15 illustrates an example of creating key indices only across the selected graphs 1215 and 1405. Specifically, it illustrates the cursor 1265 as selecting (e.g., through a double click operation) one location 1505 on the graph editor 1200. As shown, this selection creates two new key indices, where one key index 1510 is associated with opacity graph 1215, while the other key index 1515 is associated with the position graph 1405. However, the cursor selection of the location 1505 does not cause a new key index to be created for the scale graph 1220 as it is not one of the selected graphs.

Figure 16:
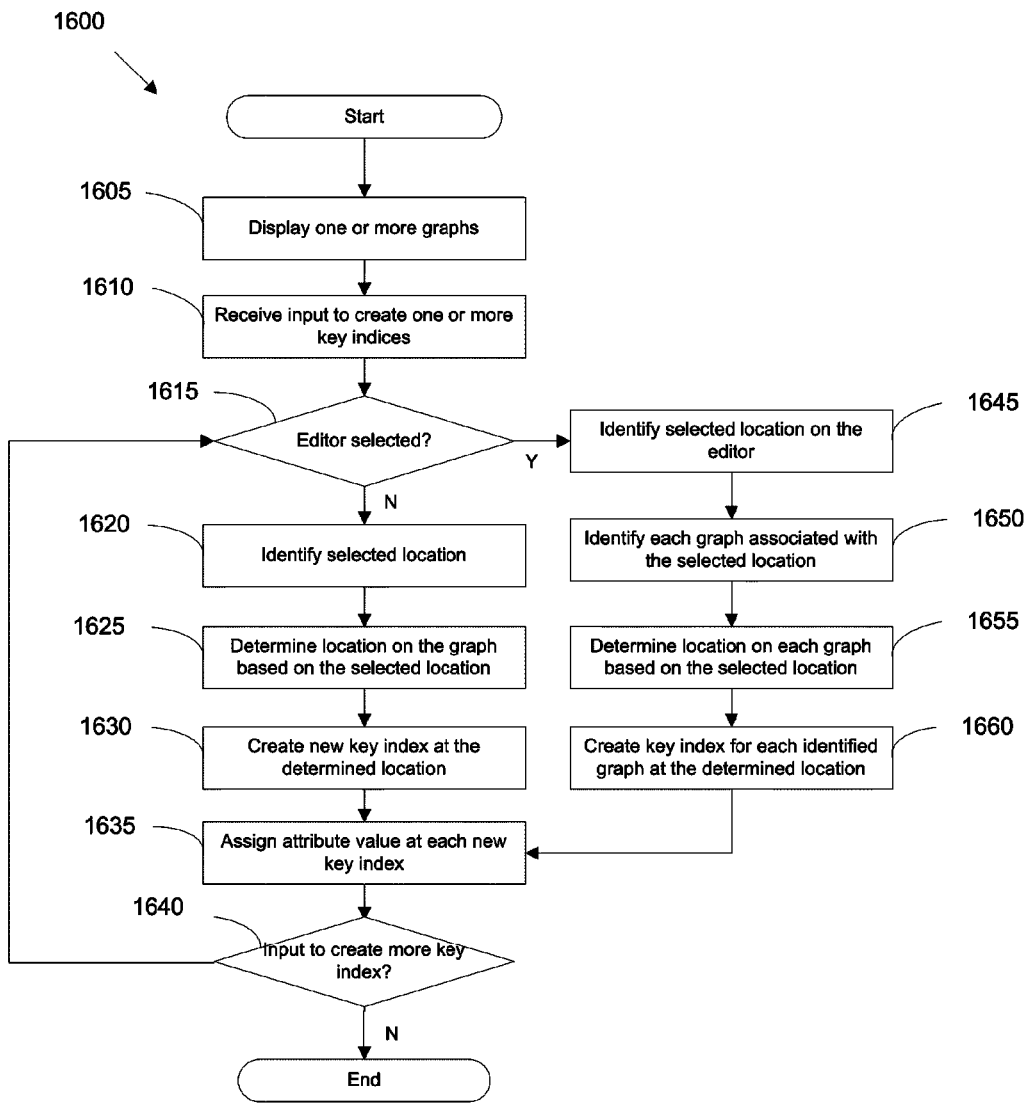
FIG. 16 illustrates a process of some embodiments for creating one or more new key indices.

The preceding section described and illustrated various ways to create new key indices. FIG. 16 conceptually illustrates a process 1600 of some embodiments for creating one or more new key indices. Process 1600 is performed by a media editing application in some embodiments. The process 1600 starts at 1605 when it displays one or more key-indexed graphs. Several examples of displaying such key-indexed graphs are illustrated in FIGS. 12-15.

The process 1600 then receives (at 1610) input to create one or more of the new key indices. In some embodiments, the input is received from the user interacting with a graphical user interface of the media editing application. At 1615, the process determines whether a graph (e.g., an interior location within a shape defined by the graph) is selected or another location on a graph editor is selected. An example of receiving a user's selection of a graph that is displayed in a graph editing window of a graph editor is described above by reference to FIG. 12. On the other hand, an example of receiving selection of a location on the graph editor that is outside of the graph editing window is described above by reference to FIG. 13.

When the graph is selected, the process 1600 proceeds to 1620; otherwise it proceeds to 1645. At 1620, the process 1600 identifies the selected location on the graph. In some embodiments, such identification entails determining the input coordinate of the selected location. At 1625, the process then determines a location on the graph for the new key index based on the selected location. For instance, when the user selects the interior location of a shape that is defined by the graph, some embodiments determine the location for the new key index at the horizontal coordinate of the selected location. At 1630, the process 1600 then creates the new key index on the graph at the determined location.

When the determination is made (at 1615) that the graph editor is selected, the process 1600 proceeds to 1645. The process identifies (at 1645) the selected location on the editor. In some embodiments, such identification includes determining the input coordinate of the selected location. At 1650, the process then identifies one or more graphs that are to be modified as a result of the selection. Several examples of performing such identifications are described above by reference to FIGS. 13-15.

The process 1600 then determines (at 1655) a location for each new key index on each identified graph based on the selected location of the graph editor. For instance, when the user selects the location on the graph editor, some embodiments determine the location for each new key index at the horizontal coordinate of the selected location. The process 1600 then creates (at 1660) a new key index for each identified graph.

When one or more key indices are created, the process 1600 assigns (at 1635) attribute value for each new key index. In some embodiments, one or more of the new key indices are assigned a default value. For instance, when the new key index represents an opacity attribute, it might be assigned a value that defines the opacity as fully visible. Some embodiments assign a value at the key index that is equal to the value of the attribute at the horizontal coordinate of the key index before the creation of the key index. That is, the creation of the key index does not alter the attribute of the graph at that point. The process 1600 then awaits (1640) input to create more new key index. When such input is received, the process returns to 1615. Otherwise, the process ends.

One of ordinary skill in the art will realize that not all features for creating key indices need to be used together. Accordingly, some embodiments perform variations on the process 1600. For example, some embodiments might not allow the user to specify a location for new key indices by selecting on a part of a graph editor that is outside of a graph editing window. Hence, in some such embodiments, the process 1600 might only include the operations for creating a new key index when a graph is selected. Furthermore, in some embodiments, the operations of process 1600 might be performed by two or more separate processes. That is, some embodiments could have one process for creating a new key index through selection of the graph and a separate process for creation of a new key index through selection within the graph editor.

C. Relocating Key Indices

FIGS. 17-23 provide several illustrative examples of relocating key indices on one or more key-indexed graphs. Specifically, these figures illustrate relocating key indices by selecting and moving: (i) a representation of a key index on a shape that is defined by a graph, (ii) an interior location within such a shape, and (iii) representations of key indices on a graph editor that are outside of a graph editing window.

Figure 17:
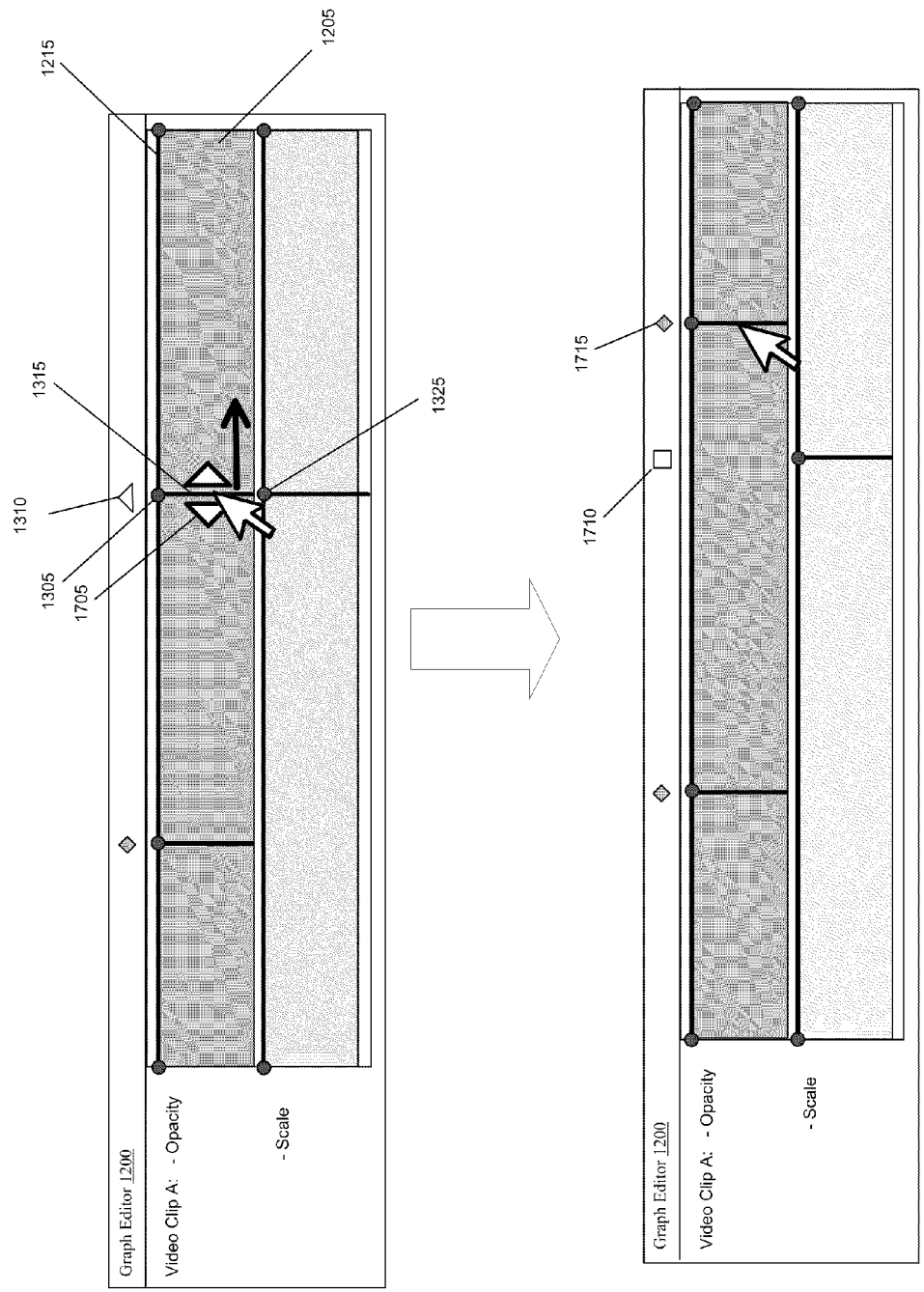
FIG. 17 illustrates relocating a key index on the graph by selecting and moving a representation of the key index on a shape.

FIG. 17 illustrates relocating the key index 1305 on the graph 1215 by selecting and moving a representation of the key index on the shape 1205 that is defined by the graph. Specifically, to relocate the key index 1305, this figure illustrates selecting and moving the line 1315 on the shape 1205 that is associated with the graph 1215, which was described above by reference to FIG. 13. In this example, when a user selects the line 1315 (e.g., through a cursor click operation), the user is presented with a directional arrows 1705 that indicate that the line is selected and can be moved in two different directions. The user then moves the line (e.g., through a cursor drag operation) to relocate the key index on the graph, as shown in FIG. 17.

When several key indices for several graphs overlap (i.e., are at the same point in the timeline), some embodiments display on the graph editor 1200 one representation for the several key indices, as mentioned above. When one of the two overlapping key indices is moved, some embodiments change the representation in the graph editor to signify that the two key indices are no longer overlapping. One such example is illustrated in FIG. 17. Specifically, this figure illustrates an example of the graph editor 1200 after relocating one of two overlapping key indices 1305 and 1325. As shown in this figure, the selection and movement of the line 1315 separates the key indices 1305 and 1325 in time, and thereby causes the symbol 1310 on the graph editor to be replaced by two separate symbols, namely a first symbol 1715 that represents the key index 1305 and a second symbol 1710 that represents the key index 1325.

Figure 18:
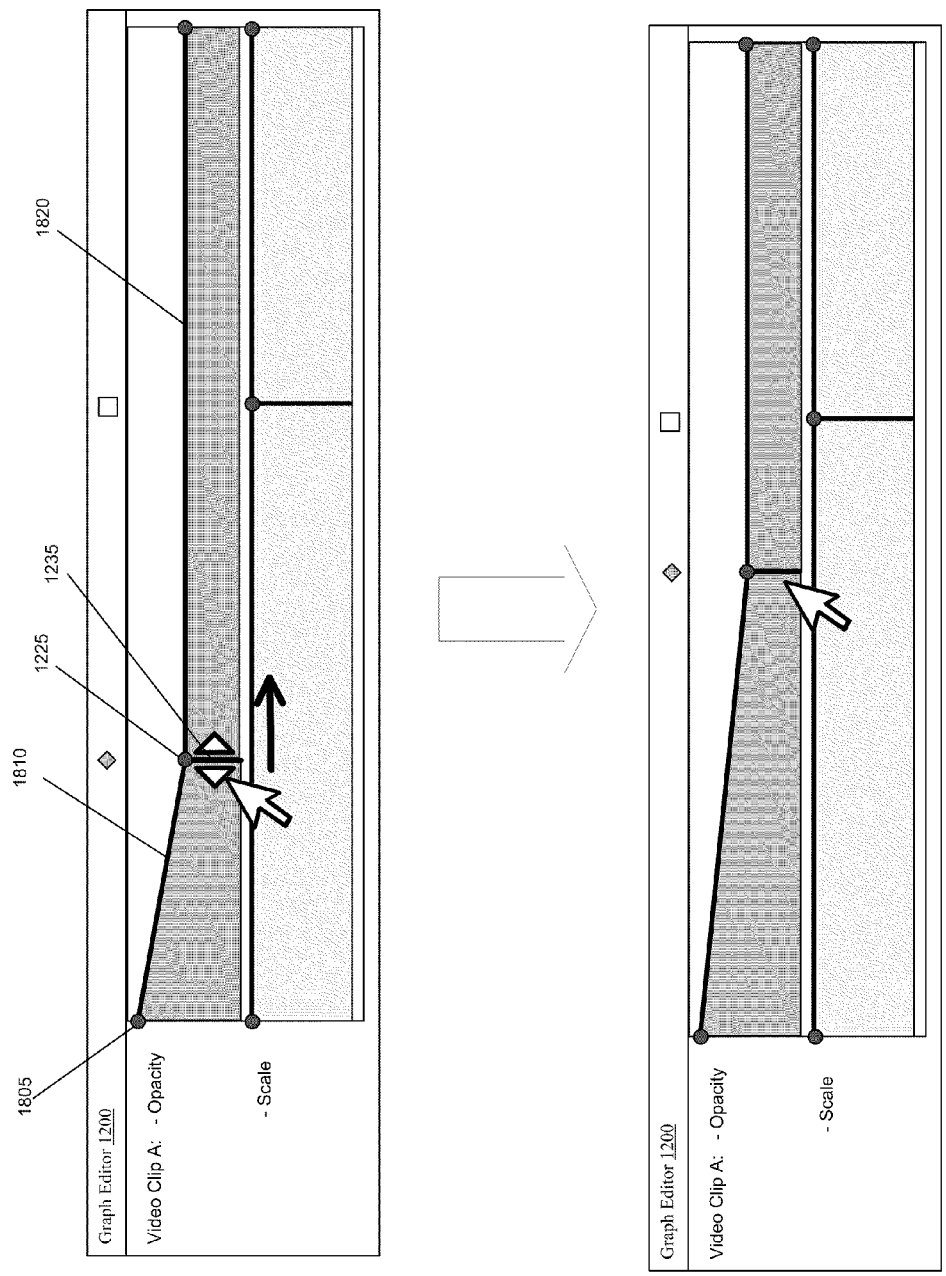
FIG. 18 illustrates another example of relocating a key index on a graph by selecting and moving a representation of the key index.

FIG. 18 illustrates another example of relocating a key index on the opacity graph 1215 by selecting and moving a representation of the key index. However, in this example, prior to the selection and movement of the representation, the user has created a sloped transition on a portion 1810 of the graph in between a beginning key index 1805 and the key index 1225. The user has created the sloped transition by selecting and moving a portion 1820 of the graph to the right of the key index 1225. As shown in FIG. 18, when the user selects and moves the line 1235 horizontally (e.g., through a cursor click and drag operation), the movement causes the transitional period between the key indices 1805 and 1225 to increase. This increase in the transitional period redefines the sloped transition. Specifically, the sloped transition is redefined such that the opacity attribute changes more gradually over the transitional period between the key indices 1805 and 1225.

Figure 19:
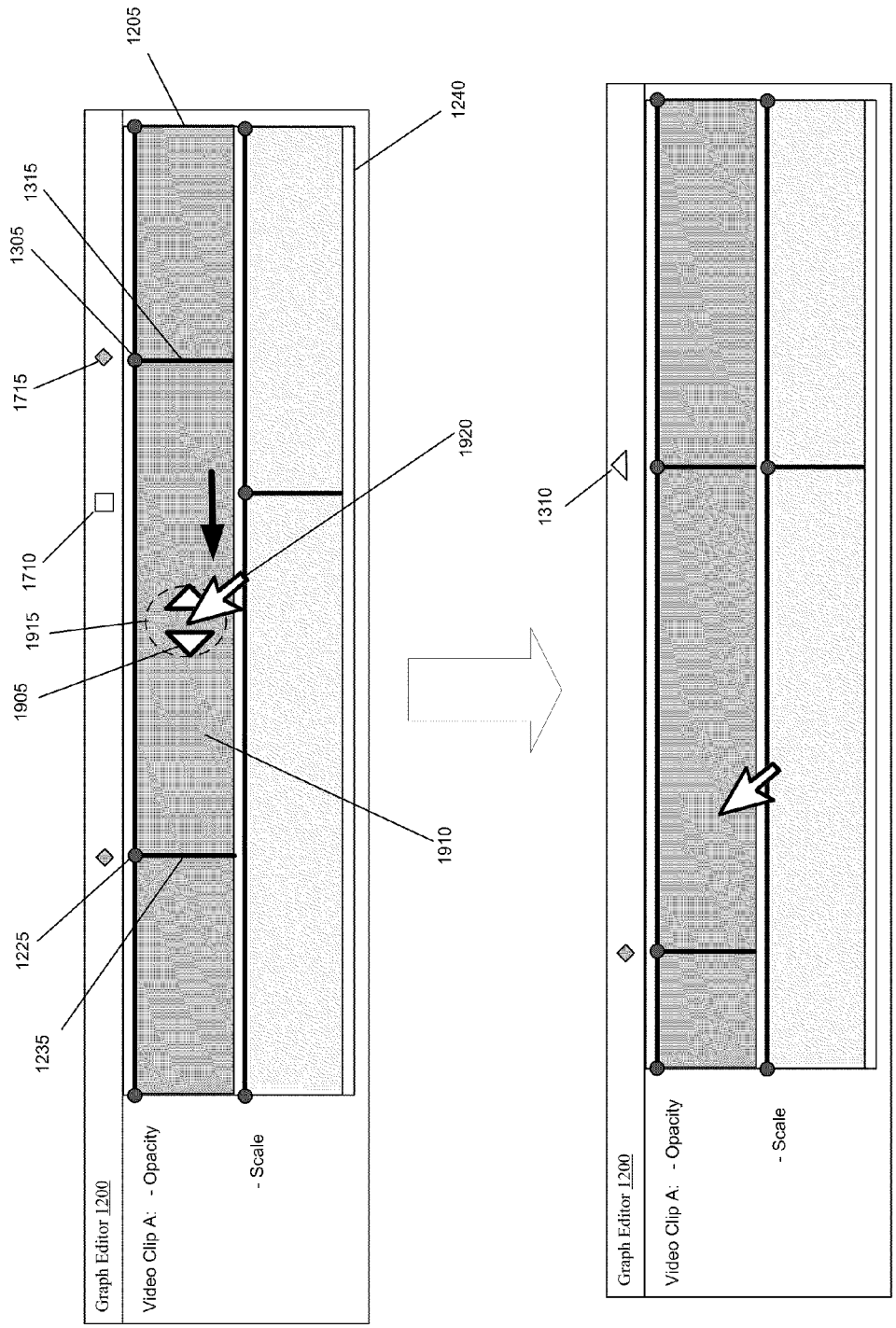
FIG. 19 illustrates relocating key indices on the graph by selecting and moving an interior location within a shape.

FIG. 19 illustrates relocating the key indices 1225 and 1305 on the graph 1215 by selecting and moving an interior location 1915 within the shape 1205. In this example, the selection of the interior location causes directional arrows 1905 to be displayed in the graph editing window 1240. These arrows indicate that the interior location is selected and can be moved in two different directions. The user then moves the selected interior location (e.g., by moving the cursor 1920). This movement causes both the key indices 1225 and 1305 and their corresponding lines 1235 and 1315 to be moved horizontally along the graph.

This movement can be implemented differently in different embodiments. For instance, some embodiments divide the shape 1205 into three smaller shapes based on the two lines 1235 and 1315. Some such embodiments then implement this move by moving the smaller shape 1910 whose interior the user selects. Other embodiments might not divide the shape 1205 into smaller shapes, or might divide it but not use that division implementing the operation illustrated in FIG. 19. Some of these embodiments implement this operation by simply relocating the key indices 1225 and 1305, and their associated lines 1235 and 1315, based on the duration of the drag operation that the user performs on the interior location 1915 in the shape 1205.

Figure 20:
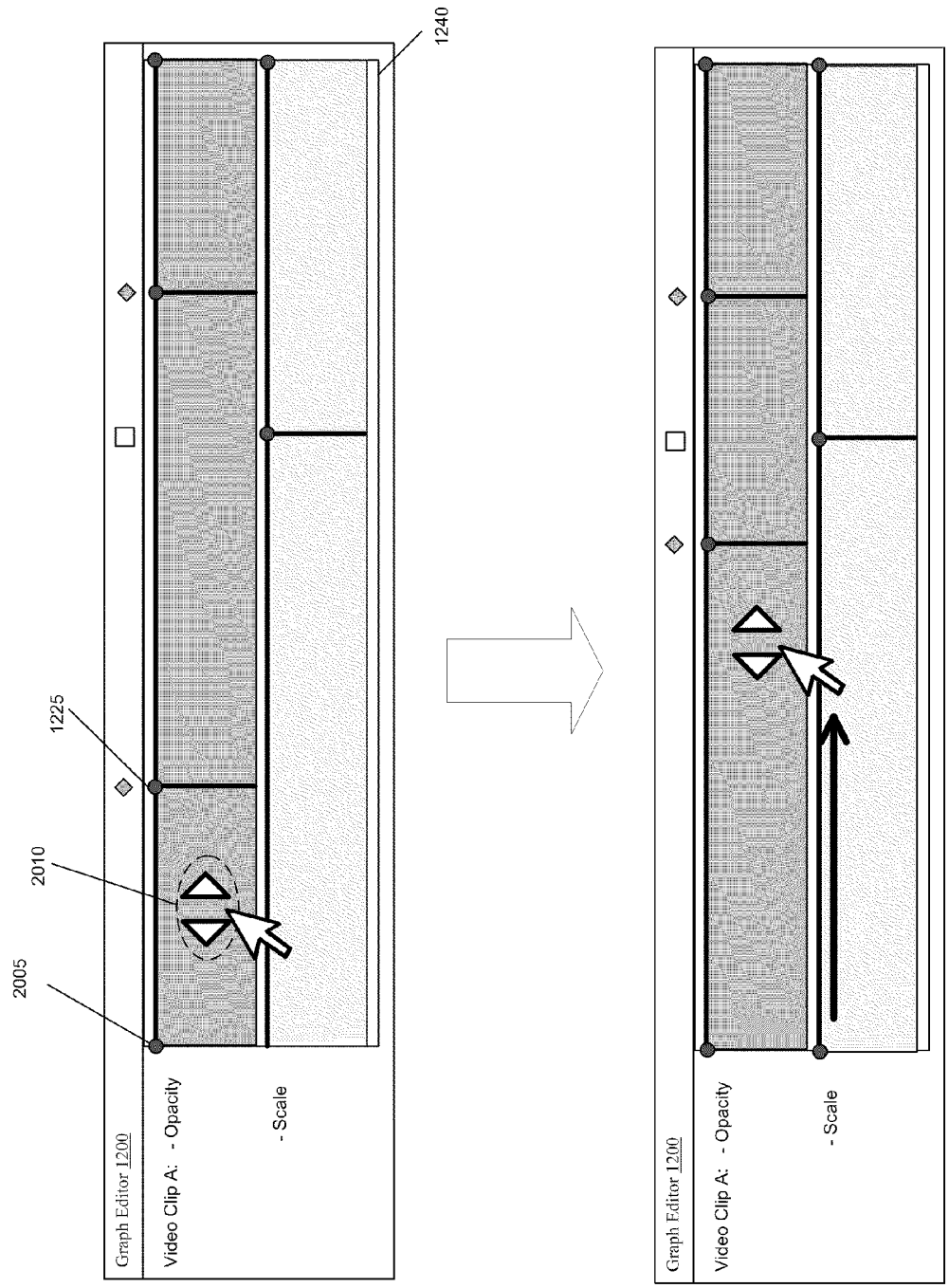
FIG. 20 illustrates relocating a key index on a graph by selecting and moving an interior location within the shape

FIG. 20 illustrates relocating the key index 1225 on the graph 1215 by selecting and moving an interior location 2010 within the shape. The selected interior location is adjacent to the key indices 1225 and 2005. In this example, the cursor selection and horizontal movement of the interior location 2010 causes the key index 1225 to be moved horizontally along the graph. However, the selection and movement does not affect the key index 2005. Some embodiments allow a left-most key index and/or right-most key index to persist (e.g., infinitely) beyond the boundaries of a graph display area. For instance, in FIG. 20, a horizontal cursor movement of the selected interior towards the key index 2005 might cause it to be moved past the boundaries of the graph editing window 1240.

Figure 21:
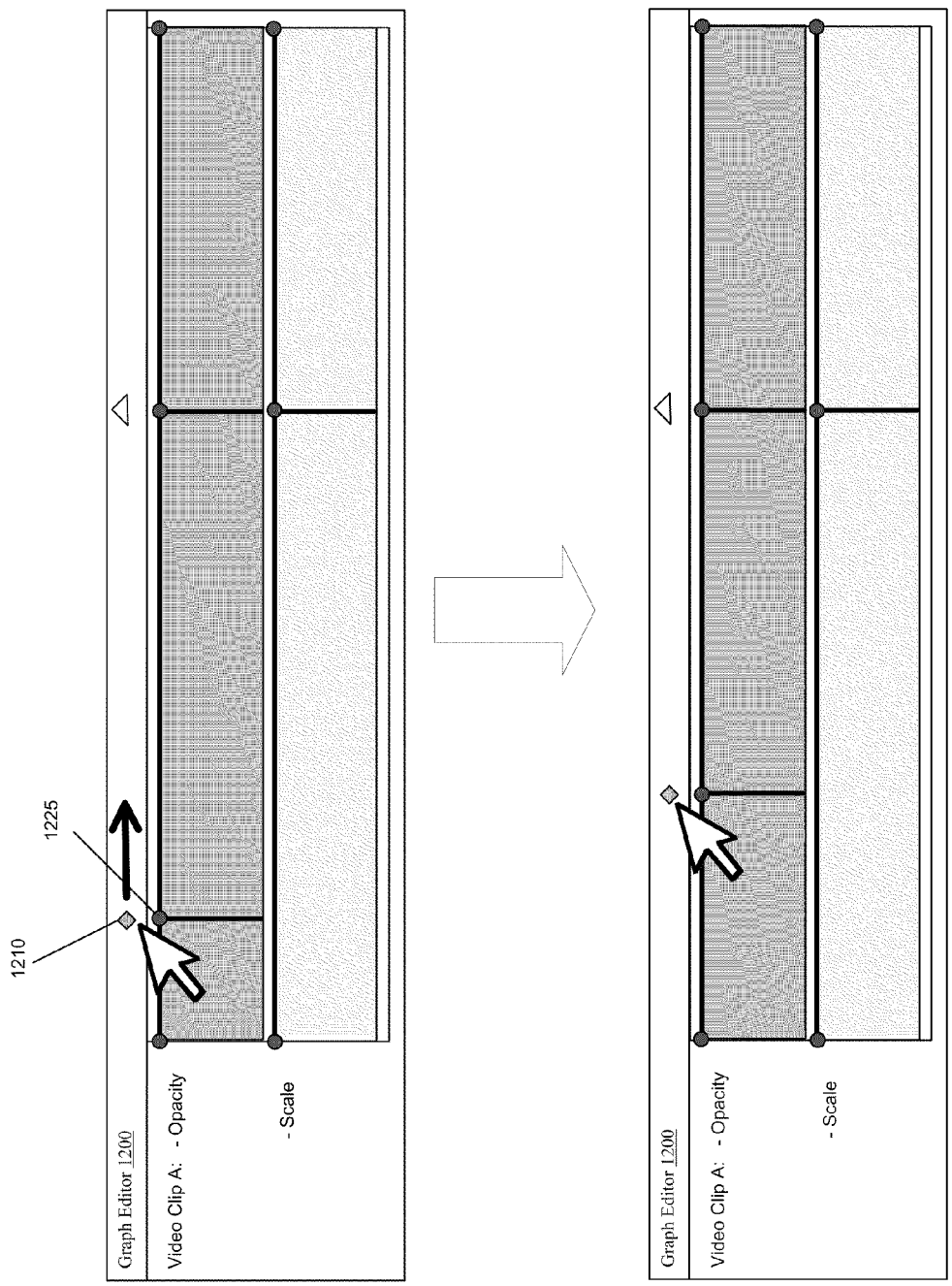
FIG. 21 illustrates relocating a key index by selecting and moving a symbol on a graph editor.
Figure 22:
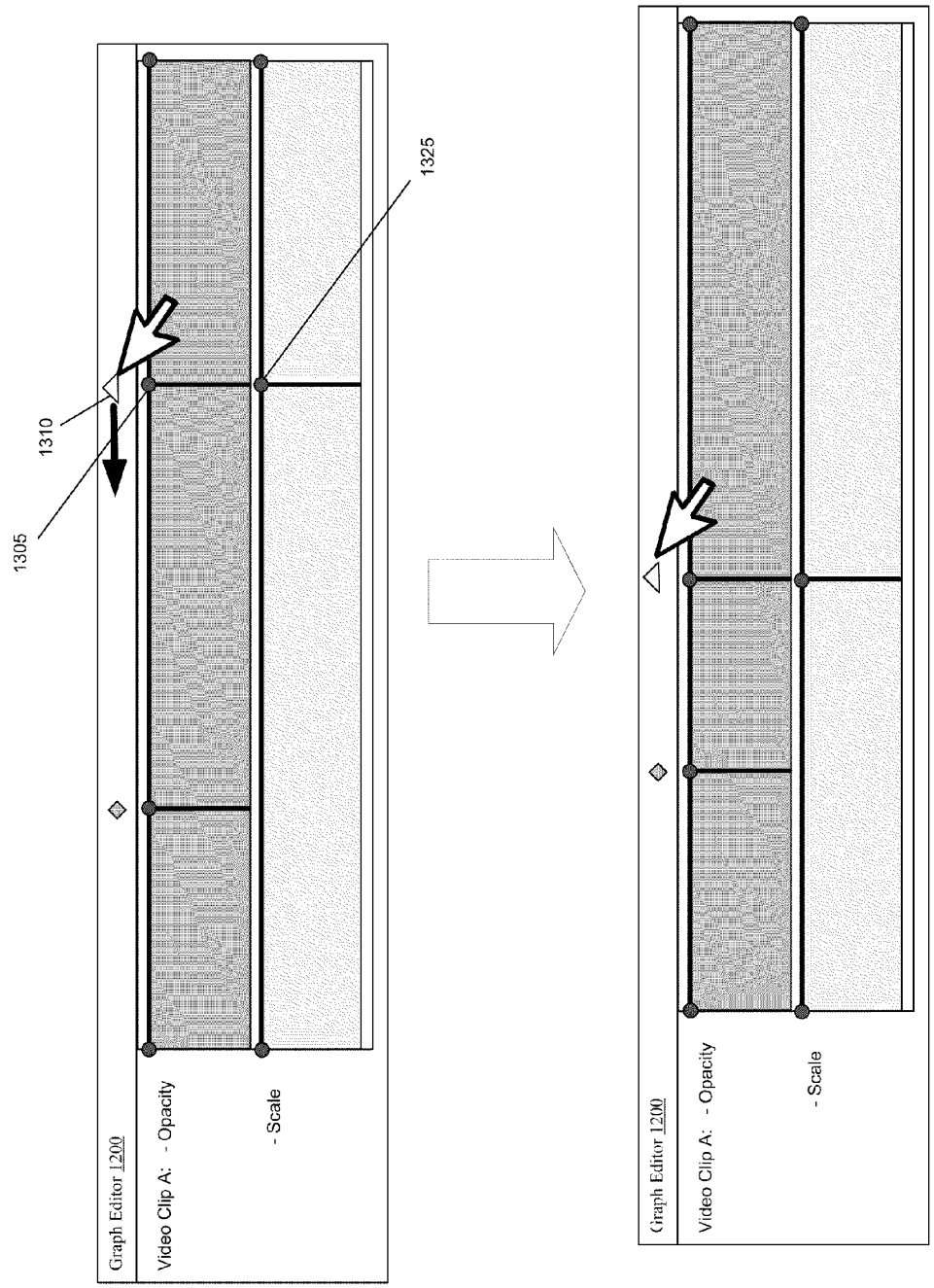
FIG. 22 illustrates relocating two aligned key indices by selecting and moving a symbol that represent the two aligned key indices.

FIGS. 21-22 illustrate relocating one or more key indices by selecting and moving representations on the graph editor 1200 that are outside of the graph editing window 1240. Specifically, FIG. 21 illustrates relocating the key index 1225 by selecting and moving the symbol 1210. Also, FIG. 22 illustrates relocating the two aligned key indices 1305 and 1325 by selecting and moving the symbol 1310 that represent the two aligned key indices.

Figure 23:
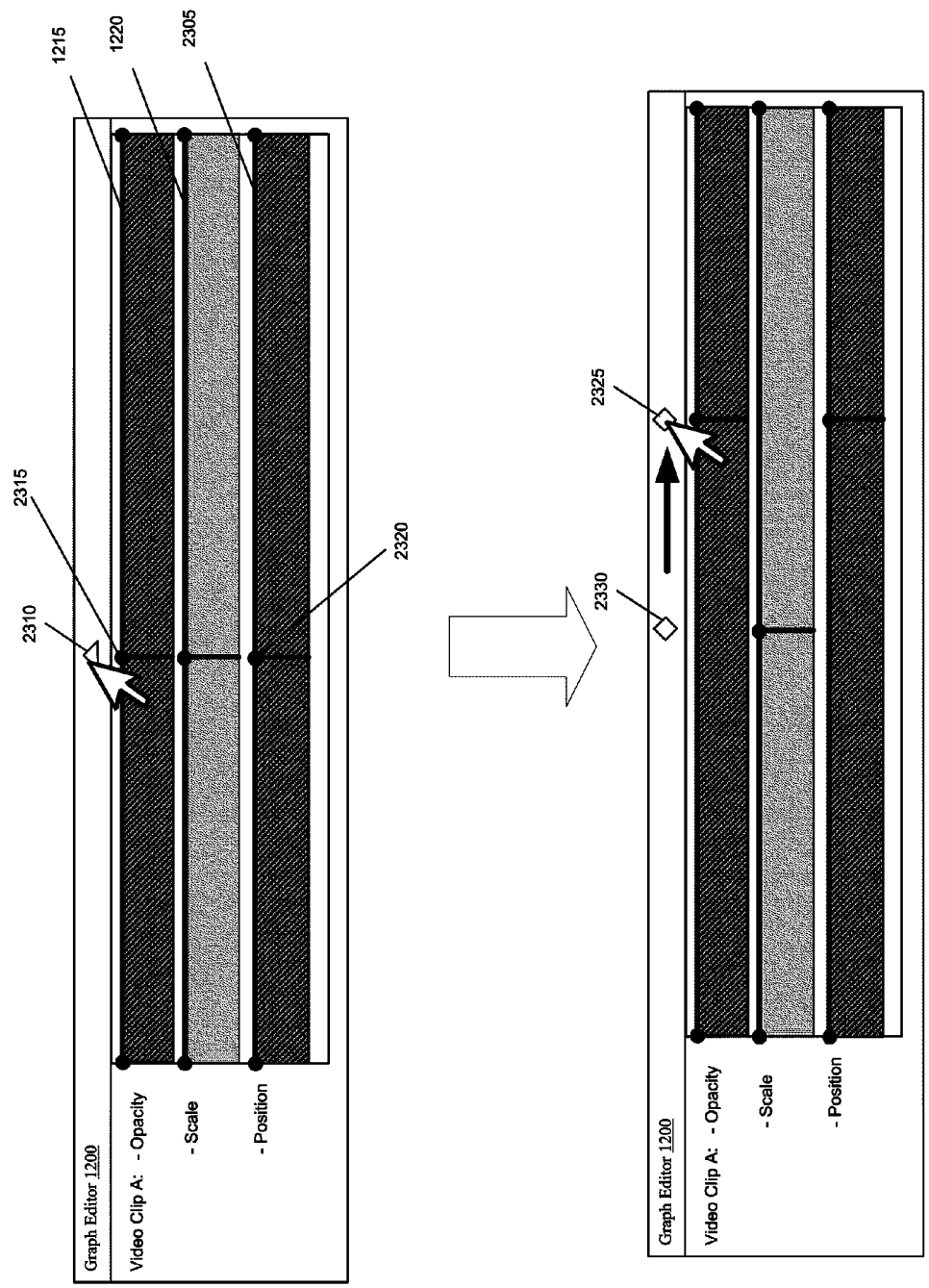
FIG. 23 illustrates an example of modifying the location of several overlapping key indices by selecting several graphs and moving a representation on a graph editor.

As mentioned above, some embodiments allow a user of a media editing application to select several key-indexed graphs in order to modify the selected graphs as one. FIG. 23 illustrates an example of modifying the location of several overlapping key indices by selecting several graphs and moving a representation on the graph editor 1200. In this example, the user has selected the opacity graph 1215 and position graph 2305. As described above, the graphs 1215 and 2305 may be selected in any number of different ways. For instance, the user may select the graphs 1215 and 2305 through a cursor click operation while holding down a modifier key, by selecting user-interface controls (e.g., check boxes), through hotkeys (e.g., CTRL+A), etc. As shown in FIG. 23, after selecting the graphs, the user then moves a symbol 2310. This movement causes the overlapping key indices 2315 and 2320 on only the selected graphs to be relocated; however, the movement does not affect key index on the scale graph 1220. This also causes the symbols in the graph editor to change in some embodiments, as shown. Symbol 2310 indicated that there was a key index at its horizontal coordinate for all graphs in the graph editor. On the other hand, symbols 2330 and 2325, after the key indices have been split up, indicate that there are multiple key indices at their horizontal coordinates, but not key indices for all of the graphs in the graph editor. Some embodiments use a third symbol in the graph editor at coordinates where there is only one key index.

Figure 24:
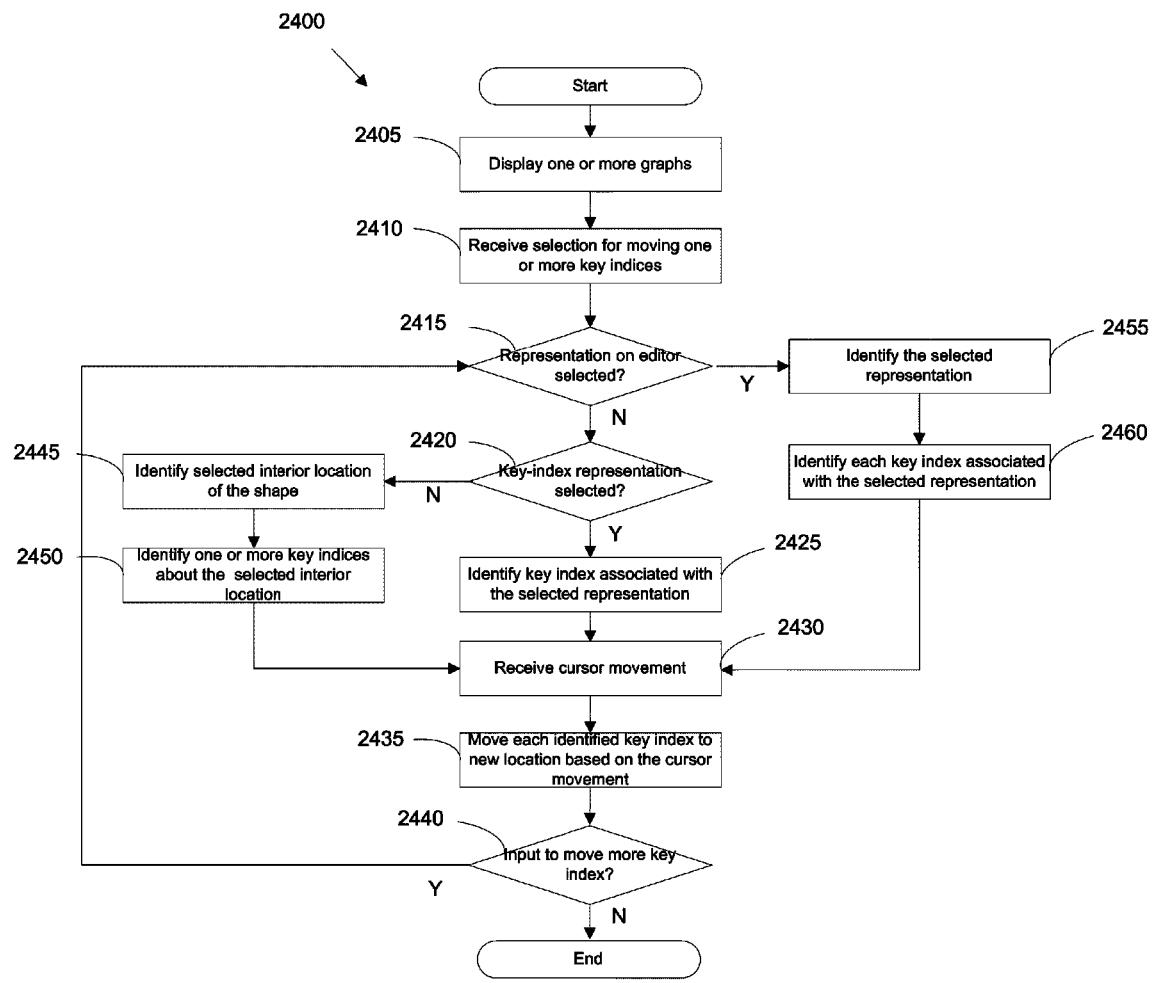
FIG. 24 illustrates a process of some embodiments for relocating one or more key indices.

The preceding section described and illustrated various ways to relocate key indices. FIG. 24 illustrates a process 2400 of some embodiments for relocating one or more key indices. The process 2400 is performed by a media editing application in some embodiments. The process 2400 starts when it displays (at 2405) one or more key-indexed graphs with one or more key indices. Several examples of displaying such key-indexed graphs are illustrated in FIGS. 17-23.

The process 2400 then receives (at 2410) input to move one or more the key indices. In some embodiments, the input is received from a user interacting with a graphical user interface of the media editing application. Next, the process 2400 determines (at 2415) whether a key-indexed graph or a representation (like the symbol 1310 shown in FIG. 17) on a graph editor is selected.

When a representation on the graph editor is selected, the process 2400 proceeds to 2455; otherwise it proceeds to 2420. At 2455, the process identifies the selected representation. After identifying the selected representation, the process 2400 identifies (at 2460) one or more key indices associated with the selected representation. Several examples of identifying key indices that are associated with a representation on a graph editor are described above by reference to FIGS. 21-23.

When the determination is made (at 2415) that the graph is selected, the process 2400 determines (at 2420) whether a representation of a key index (like the line 1315 shown in FIG. 17) on a graph is selected. When such representation on the graph is selected, the process identifies (at 2425) the key index associated with the representation.

When the determination is made (at 2420) that a representation on the graph is not selected, the selected portion of the graph is an interior location on the graph. The process then identifies (at 2445) the selected interior location. Based on this identification, the process then identifies (at 2450) one or more key indices that are affected by the selected interior location. Several examples of identifying such key indices are described above by reference to FIGS. 19-20. For instance, some embodiments identify the first key indices on either side horizontally of the selected location.

Once or more key indices are identified, the process 2400 receives (at 2430) cursor movement. Based on the cursor movement, the process (at 2435) moves each identified key index to a new location on a corresponding graph. The process 2400 then awaits (at 2440) input to relocate more key index. When such input is received, the process returns to 2415; otherwise, the process ends.

One of ordinary skill in the art will realize that not all features for relocating key indices need to be used together. Accordingly, some embodiments perform variations on the process 2400. For example, some embodiments might not allow the user to relocate one or more key indices by selecting and moving a representation (like the symbol 1310 shown in FIG. 17) on a graph editor. Hence, in some such embodiments, the process 2400 may only include the operations for relocating a key index by manipulation a graph. Furthermore, in some embodiments the operations of process 2400 might be performed by two or more separate processes. That is, some embodiments could have one or more processes for relocating key indices through selection of the graph and a separate process for relocating key indices through selection within the graph editor.

D. Specifying Attribute Values

Figure 25:
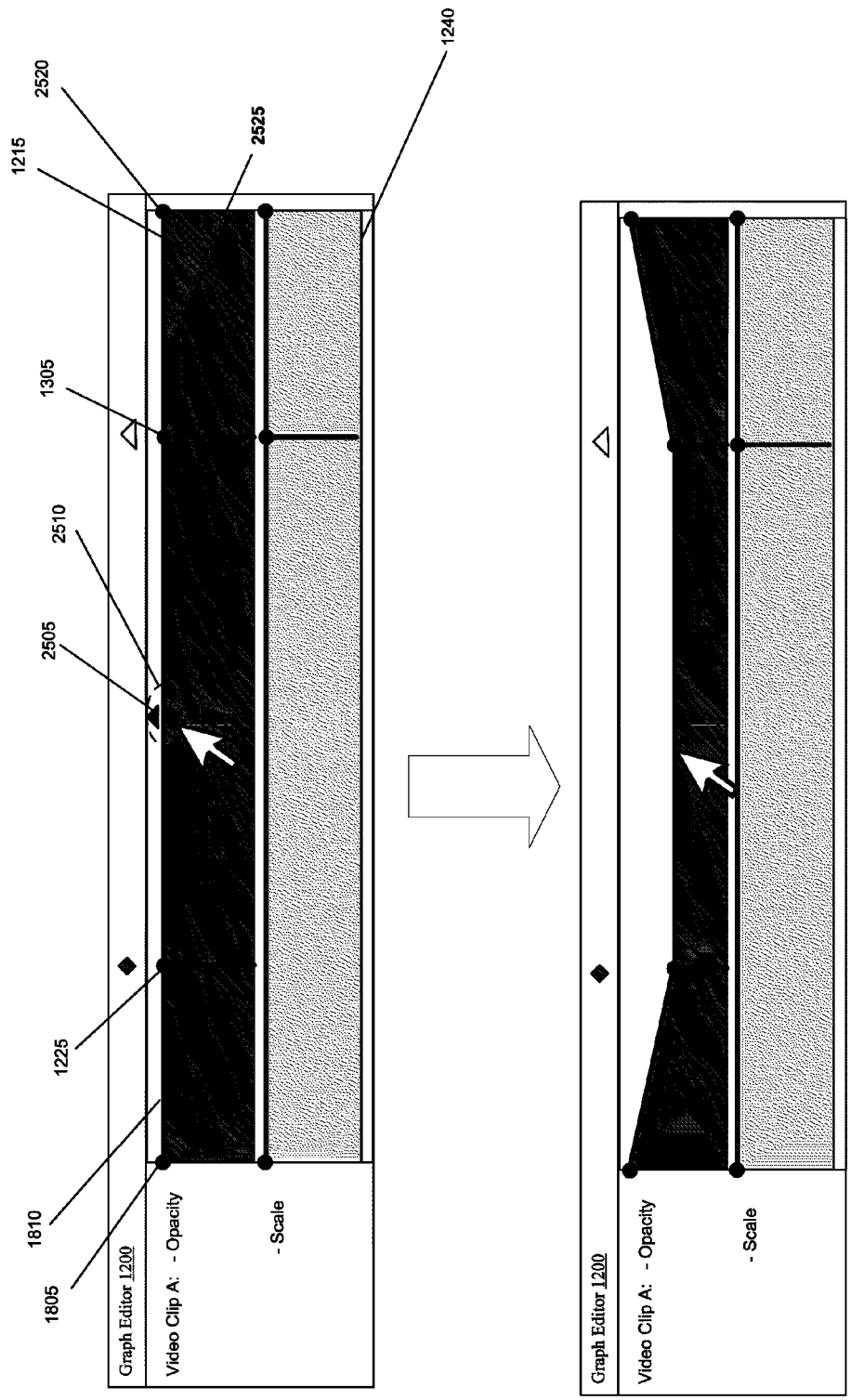
FIG. 25 illustrates an example of selectively modifying a graph without selecting any key index.
Figure 26:
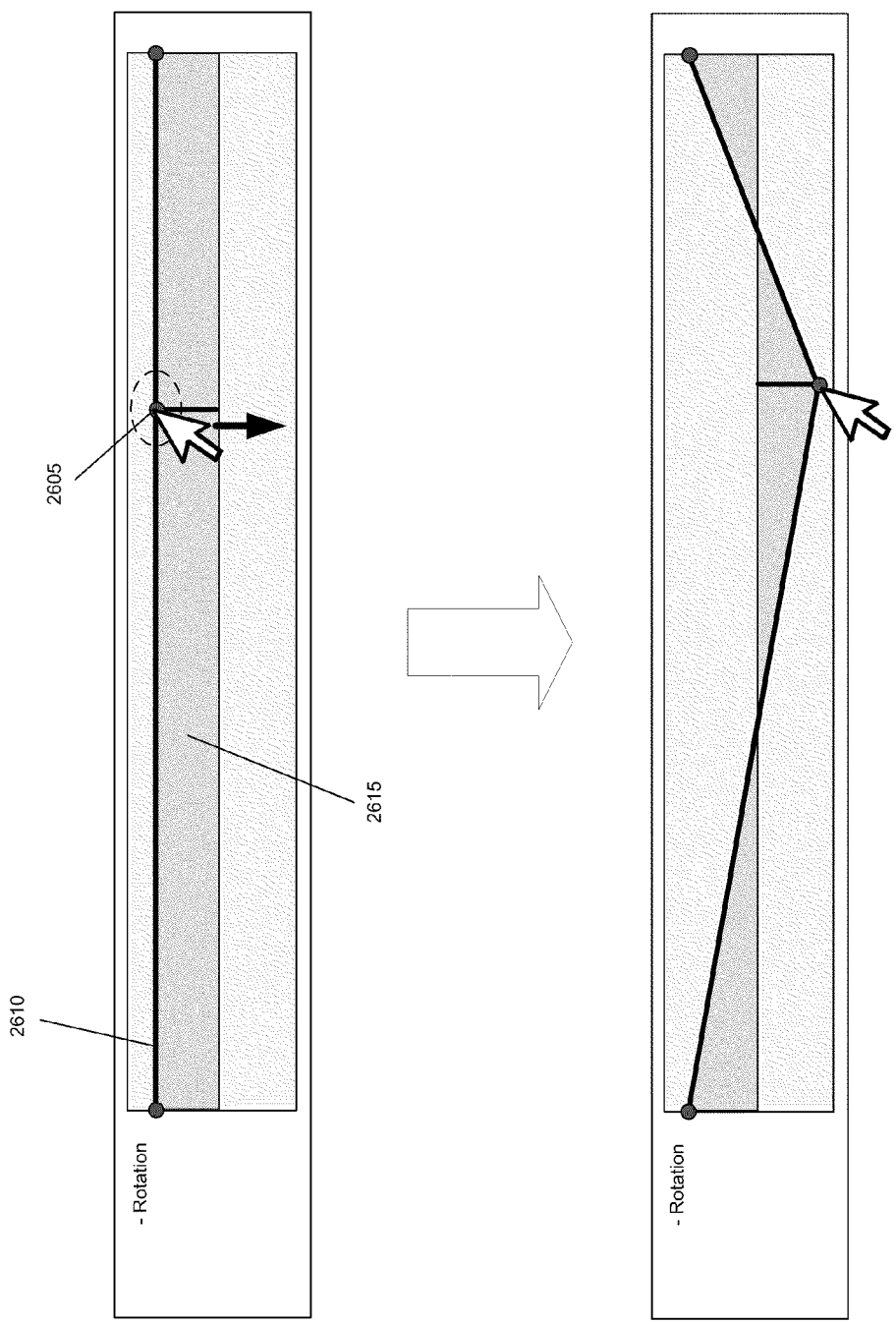
FIG. 26 illustrates modifying a graph by selecting a key index on the graph.

FIGS. 25-26 provide several illustrative examples of selecting a part of a graph directly and modifying the graph by moving the selected part to a new location. In particular, these figures illustrate (i) selectively modifying a graph without selecting any key index and (ii) selectively modifying the graph by selecting a key index on the graph.

As mentioned above, some embodiments allow a user to modify a graph without selecting any key index. FIG. 25 illustrates an example of selectively modifying the opacity graph 1215 without selecting any key index. In this example, the user selects a part 2510 of the graph 1215 that is defined between the two key indices 1225 and 1305. The selection of the interior location causes directional arrows 2505 to appear in the graph editing window 1240. These arrows indicate that the selected part is selected and can be moved in two different directions. The user then modifies the graph 1215 by moving the selected part 2510 vertically. The selection and movement causes the opacity attribute across a portion of the graph starting from the key index 1225 and ending at the key index 1305 to be reduced by a constant value.

FIG. 25 also illustrates that the movement of the selected part 2505 of the graph 1215 modifies the slopes of several parts of the graph. For instance, the movement causes a part 1810 of the graph that is defined between a starting key index 1805 to have a negative slope. The movement also causes a part 2525 of the graph that is defined between the key index 1305 and an ending key index 2520 to have a positive slope.

FIG. 26 illustrates modifying a rotation graph 2610 by selecting a key index 2605 on the graph. Specifically, it illustrates selecting and moving the key index 2605 to specify attribute value at the key index.

In some embodiments, when a modification to a graph causes an attribute to fall below a predetermined threshold value, it also causes a shape that is defined by the graph to changes its form. FIG. 26 illustrates an example of a shape 2615 that changes its form. The shape 2615 is defined by the rotation graph 2610. In this example, when the movement of the key index 2605 on the graph 2610 causes the attribute value to fall below zero, it also causes the shape 2615 to appear inverted. In conjunction, or instead of it, some embodiments modify the color and/or pattern of the shape when the attribute value falls below a predetermined value.

Some embodiments use colors and/or patterns on shapes for various other reasons. One such reason is to distinguish graphs of different attributes. For instance, in some such embodiments, a first shape that is defined by an opacity graph may be displayed with one set of colors, while a second shape that defined by a scale graph may be displayed with another set of colors. Alternatively, or conjunctively, some embodiments use colors and/or patterns to distinguish one segment of the graph from another segment. For instance, when a graph includes multiple segments that define different parts of a shape, one part of the shape may be colored differently from another part in order to distinguish the two parts.

Figure 27:
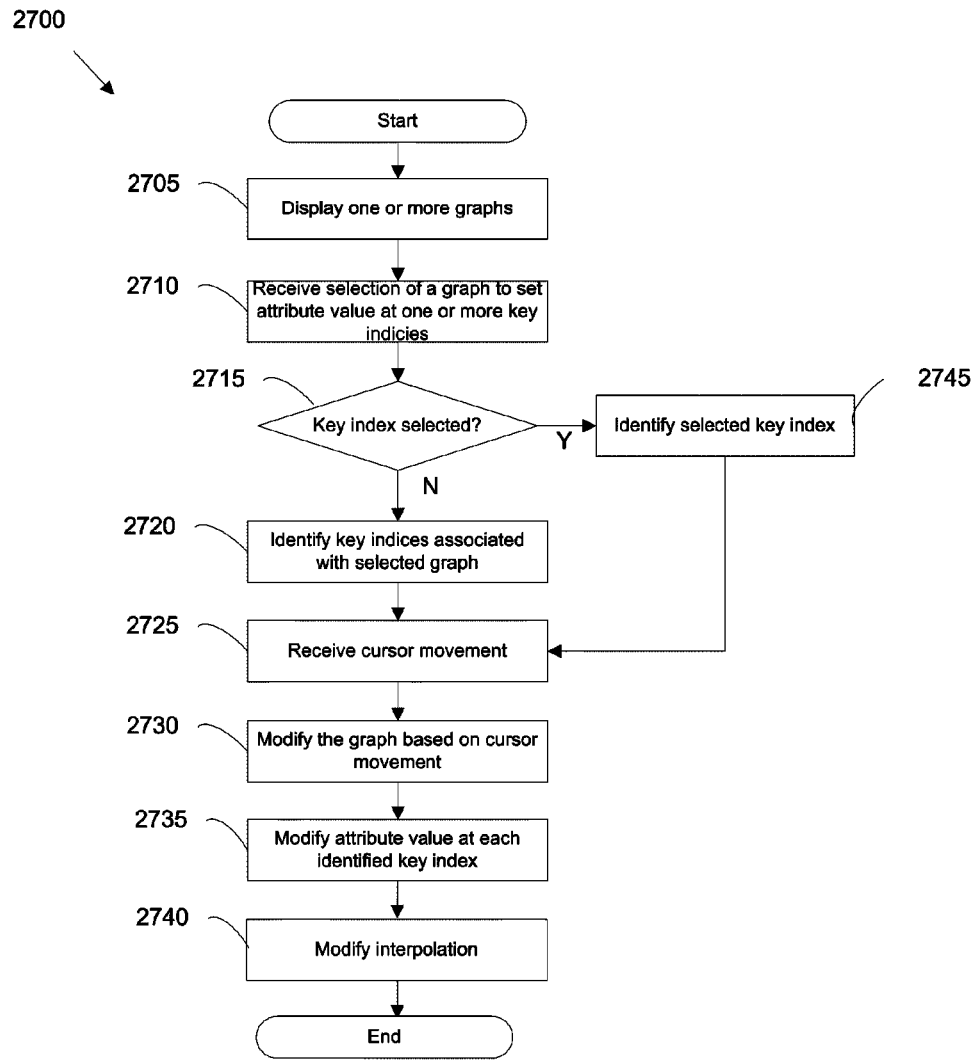
FIG. 27 conceptually illustrates a process of some embodiments for setting attribute value at one or more key indices.

The preceding section described and illustrated various ways to modify attribute values at key indices. FIG. 27 conceptually illustrates a process 2700 of some embodiments for setting attribute values at one or more key indices. The process 2700 is performed by a media editing application in some embodiments. The process 2700 starts when it displays (at 2705) one or more key-indexed graphs. Several examples of displaying such key-indexed graphs are illustrated in FIGS. 25-26.

The process 2700 then receives (at 2710) selection of a part of a key-indexed graph to set attribute values at one or more key indices. After receiving the selection, the process 2700 then determines (at 2715) whether the selected part of the key-indexed graph corresponds to a key index. Some embodiments make this determination based on comparing an input coordinate with a location of the key index on the graph. When the location corresponds to the key index, the process 2700 then identifies (at 2745) the corresponding key index.

When the selected part of the graph does not correspond to any key index, the process 2700 proceeds to 2720. At 2720, the process identifies key indices associated with the selected location. In some embodiments, the identification includes identifying the key indices that are adjacent to the selected part. That is, when the selection is at a point along the graph between two key indices, the process identifies the key indices on either side of the selected point.

Next, the process 2700 receives (at 2725) cursor movement. Based on the cursor movement, the process (at 2730) modifies the graph. The process 2700 then modifies (at 2735) attribute value at each identified key index in accordance with the modified graph. That is, as the graph is modified, the attribute values of the key indices are modified as well. Several examples of performing such modifications are described above by reference to FIGS. 25-26. The process also modifies (at 2740) the interpolation between key indices. For instance, in FIG. 25, the selection and movement of the part of the graph 1215 in between the key indices 1225 and 1305 causes the interpolation between the two key indices to be modified by a constant value. Similarly, modifying the attribute of one key index will modify the slope of a straight-line interpolation between the modified key index and a neighboring key index.

One of ordinary skill in the art will realize that not all features for setting attribute at key indices need to be used together. Accordingly, some embodiments perform variations on the process 2700. For example, some embodiments might not allow the user to select and move a part of a graph that corresponds to a key index in order to set an attribute value at the key index. Hence, in some such embodiments, the process 2700 might only include the operations for setting attribute values by selecting and moving a part of the graph that does not correspond to any key index. Furthermore, in some embodiments the operations of process 2700 might be performed by two or more separate processes. That is, some embodiments could have one process for modifying attribute values at key indices through selection of the graph between two key indices and a separate process for modifying attribute values at key indices through selection of the graph at a key index.

E. Creating a Curve on a Graph

FIGS. 28-35 illustrate examples of forming a curve on a straight line graph by interacting with a shape that is defined by the line graph. Specifically, these figures illustrate (i) selecting an interior location of the shape, (ii) moving the interior location vertically to form the curve on the line graph, and (iii) moving the interior location horizontally to form the curve. In some embodiments, the curve is a parameterizable curve (e.g., a bezier curve, a b-spline curve).

Figure 28:
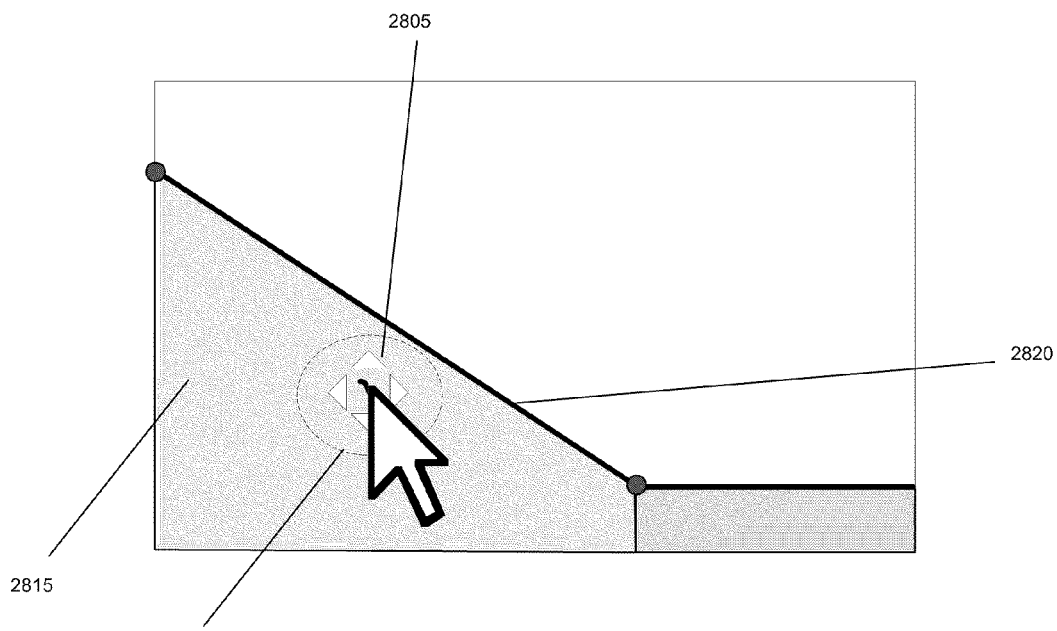
FIGS. 28-29 provide an illustrative example of forming a curve on a graph by selecting and moving an interior location in a vertical direction.

FIG. 28 illustrates an example of receiving selection of an interior location 2825 within a shape 2815 that is defined a line graph 2820. In particular, this figure illustrates receiving the selection of the interior location 2825 in order to create a curve on the line graph 2820. A location within a shape may be selected in a number of different ways. For example, the location may be selected by a user holding down a button of cursor controller along with a modifier key, holding down a right button of the cursor controller, etc. As shown in FIG. 28, when a user selects the interior location 2825, the user is presented with a directional arrows 2805 that indicate that the interior location is selected and can be moved in a number of different directions (e.g., vertically, horizontally, diagonally).

Figure 29:
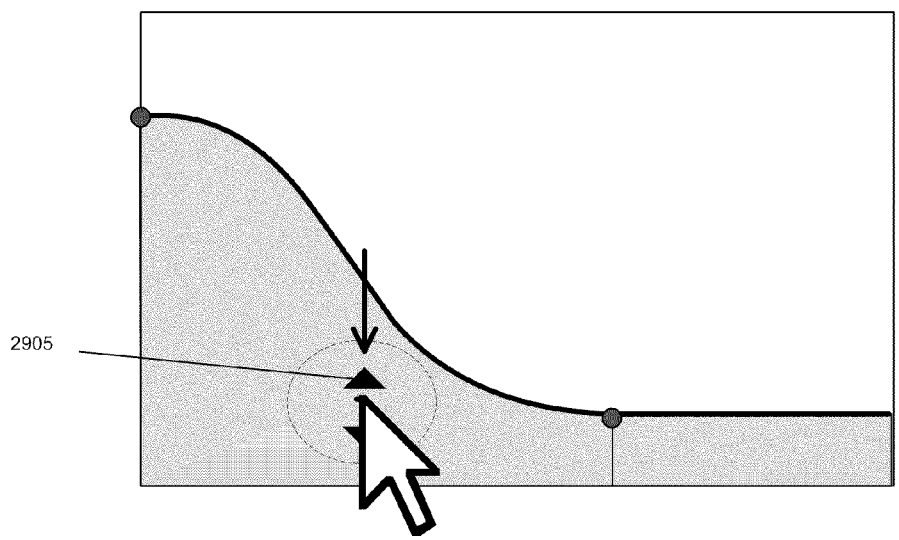

FIG. 29 provides an illustrative example of forming the curve on the graph by moving the selected location vertically. As shown, when the selected interior location 2825 is moved vertically (e.g., through a drag operation), the directional arrows 2805 is replaced by a directional arrow 2905 that indicates that the selected location is being moved. The movement also causes the curve to be modified on the graph 2820.

In some embodiments, a user's selection and movement of an interior location creates a smooth curve by pushing out one part of the line graph while pulling in another part of the line graph. For instance, in the example illustrated in FIG. 29, the selection and downward movement of the interior location creates the curve by pushing out one part of the graph 2820 to the left of the selected interior location outwards while pushing in another part to the right of the selected interior location inwards. In some such embodiments, the cursor selection and movement of the interior location creates the curve on the graph by defining a local inflection point on a line graph at the coordinate that corresponds to the selected location. For instance, in FIG. 29, the downward movement of the cursor defines a local inflection point on the line graph 2820 at the x-coordinate of the selected location 2825.

In the examples given above and the many examples illustrated below, the selection and movement of an interior location within a shape modifies a graph (e.g., creates a curve on the graph) and does not result in the relocation of one or more key indices. This is different from the example operations described above by reference to FIGS. 19 and 20. Some embodiments enable both these functionalities by providing user interface tools, user interface techniques, and/or shortcuts (e.g., through the use of hotkeys) to differentiate the two functionalities. Other embodiments do not allow both these functionalities but instead allow only one or the other. Still other embodiments provide both these functionalities but provide one functionality for one type of graph (e.g., audio level graph) and another functionality for another type of graph (e.g., position graph). Furthermore, some embodiments provide different functionalities in different types of windows, and/or provide one functionality in a first type of view (e.g., interpolation mode, full view), and another functionality in a second type of view (e.g., summary mode, collapsed view).

Figure 30:
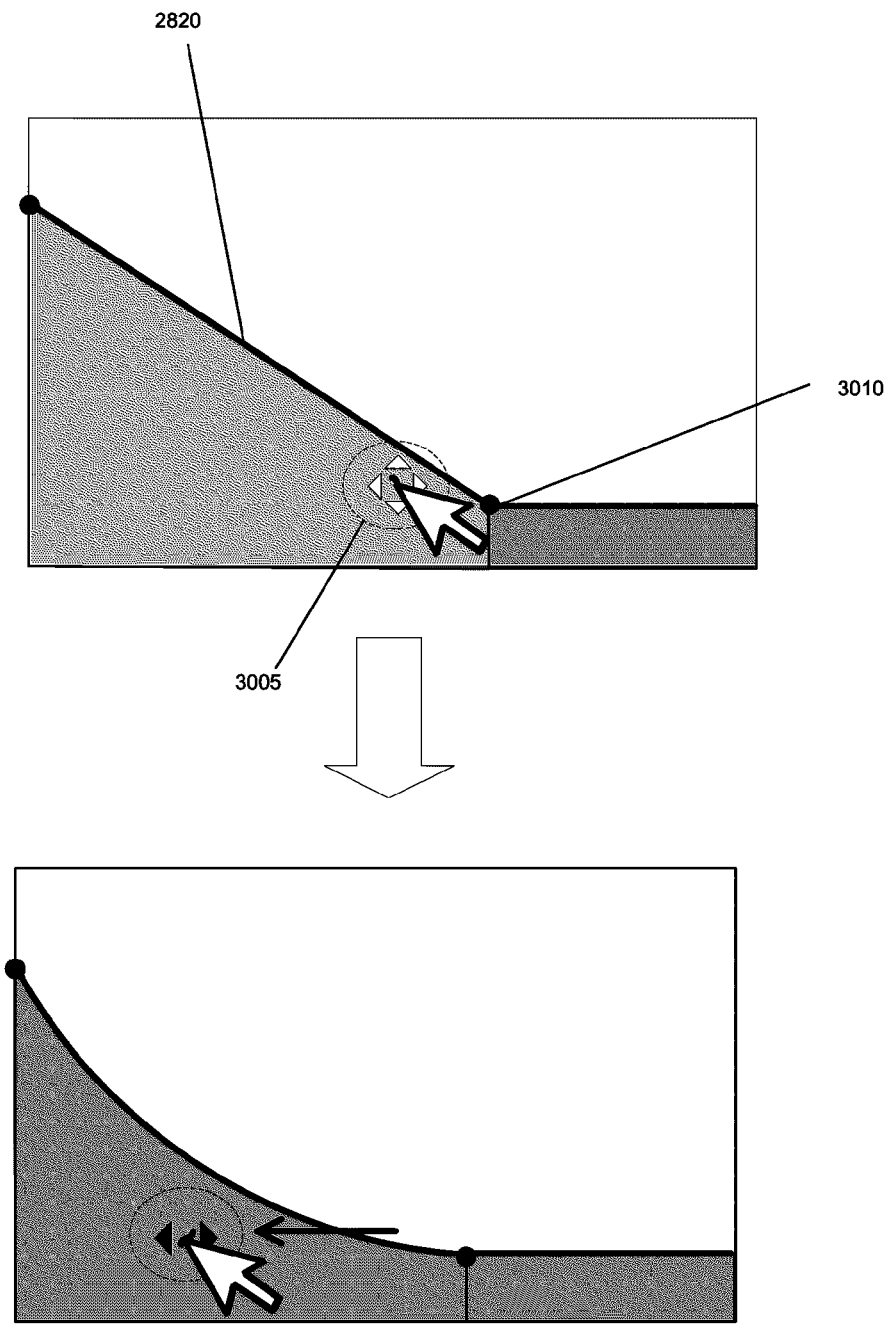
FIGS. 30-31 illustrate examples of forming a curve on a graph by moving an interior location in a horizontal direction.
Figure 31:
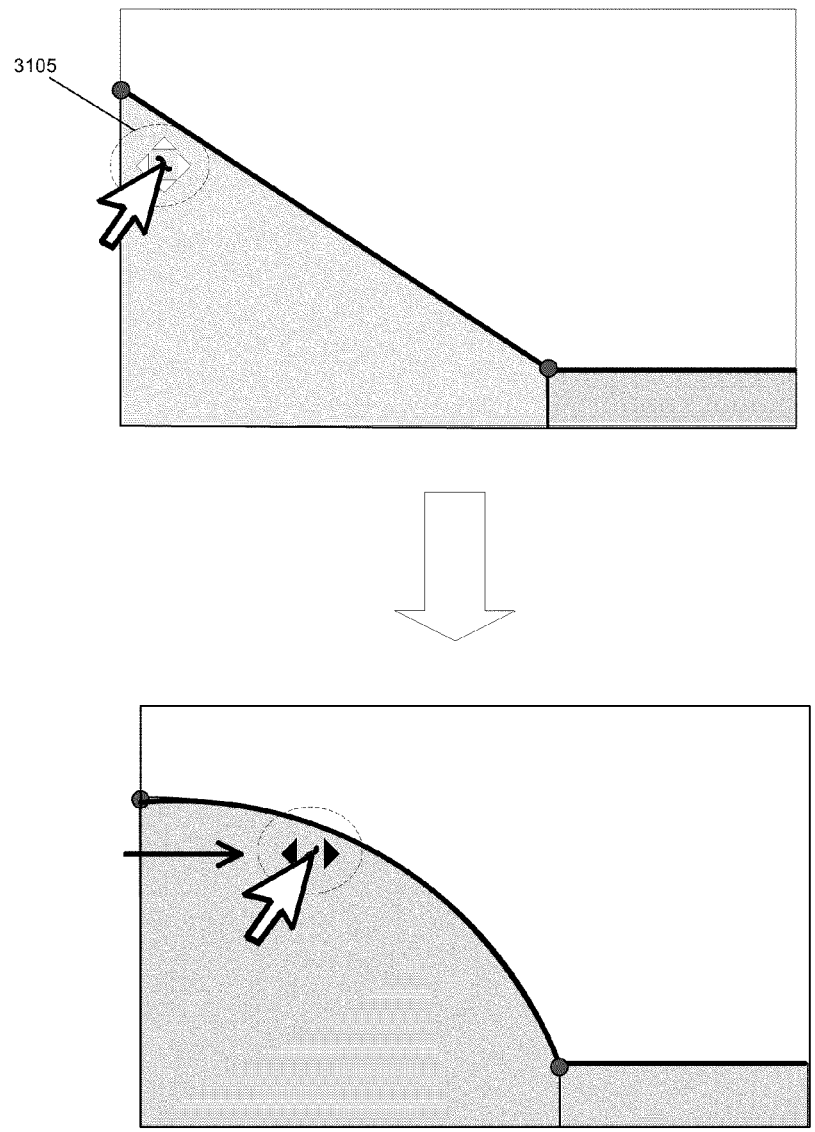

FIG. 30 illustrates an example of forming a curve on the graph by moving an interior location 3005 horizontally. In this example, the user selects an interior location near the key index 3010. The user then moves the interior location 3005 to form a curve on the straight line graph 2820. In some embodiments, the selection and movement of an interior location causes a concave curve to be formed on a graph. For instance, in the example illustrated in FIG. 30, the selection and movement of the interior location creates the concave curve by pulling the straight line graph 2820 inwards in the direction that corresponds to the cursor movement. Correspondingly, FIG. 31 illustrates an example in which the selection and movement of an interior location 3105 causes a convex curve to be formed. As shown, selecting an interior location and moving the cursor towards a straight line graph causes the curve to be pushed outwards, away from the selection point, in some embodiments.

Figure 32:
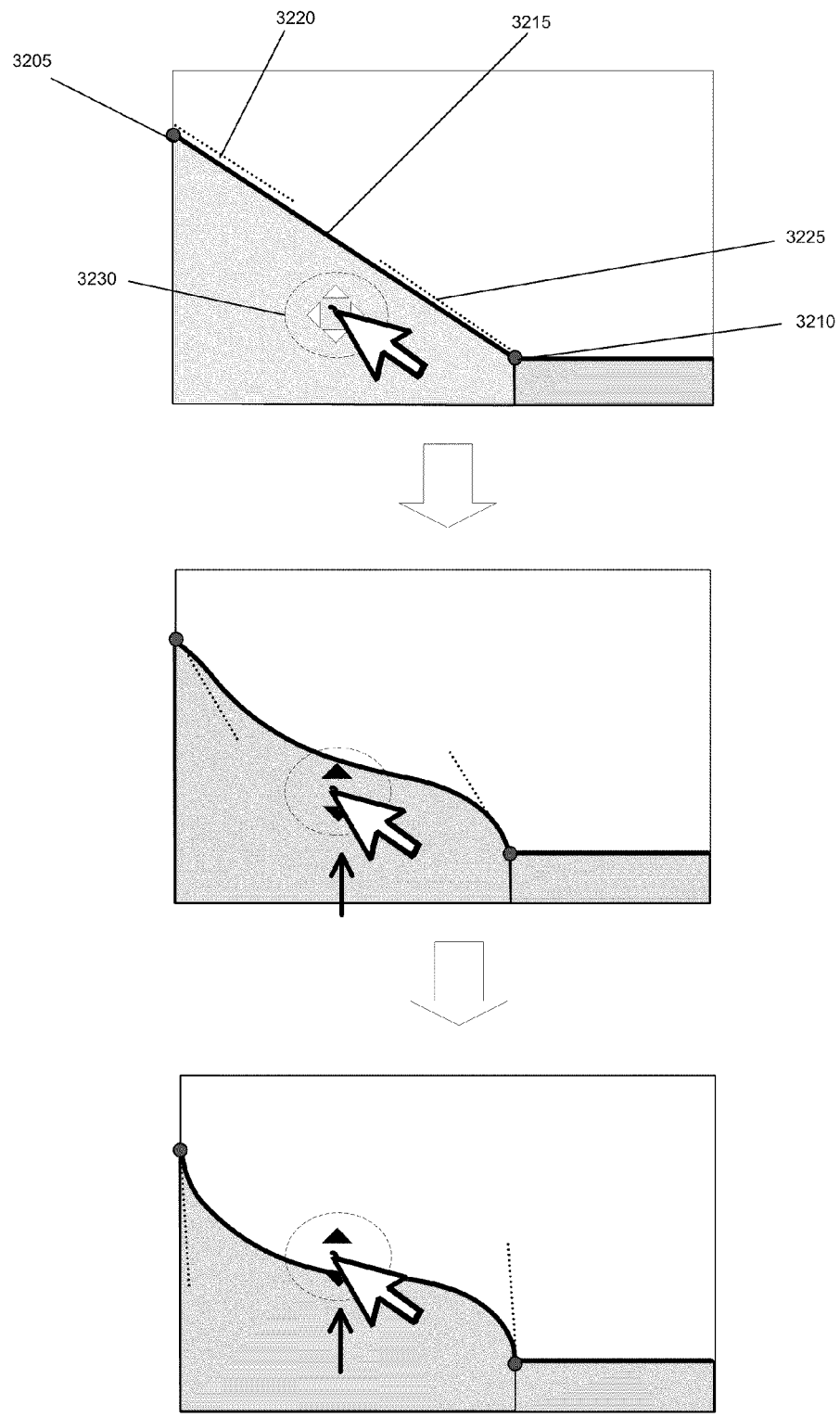
FIGS. 32-33 illustrate several examples of modifying the angle of the tangents at key indices.
Figure 33:
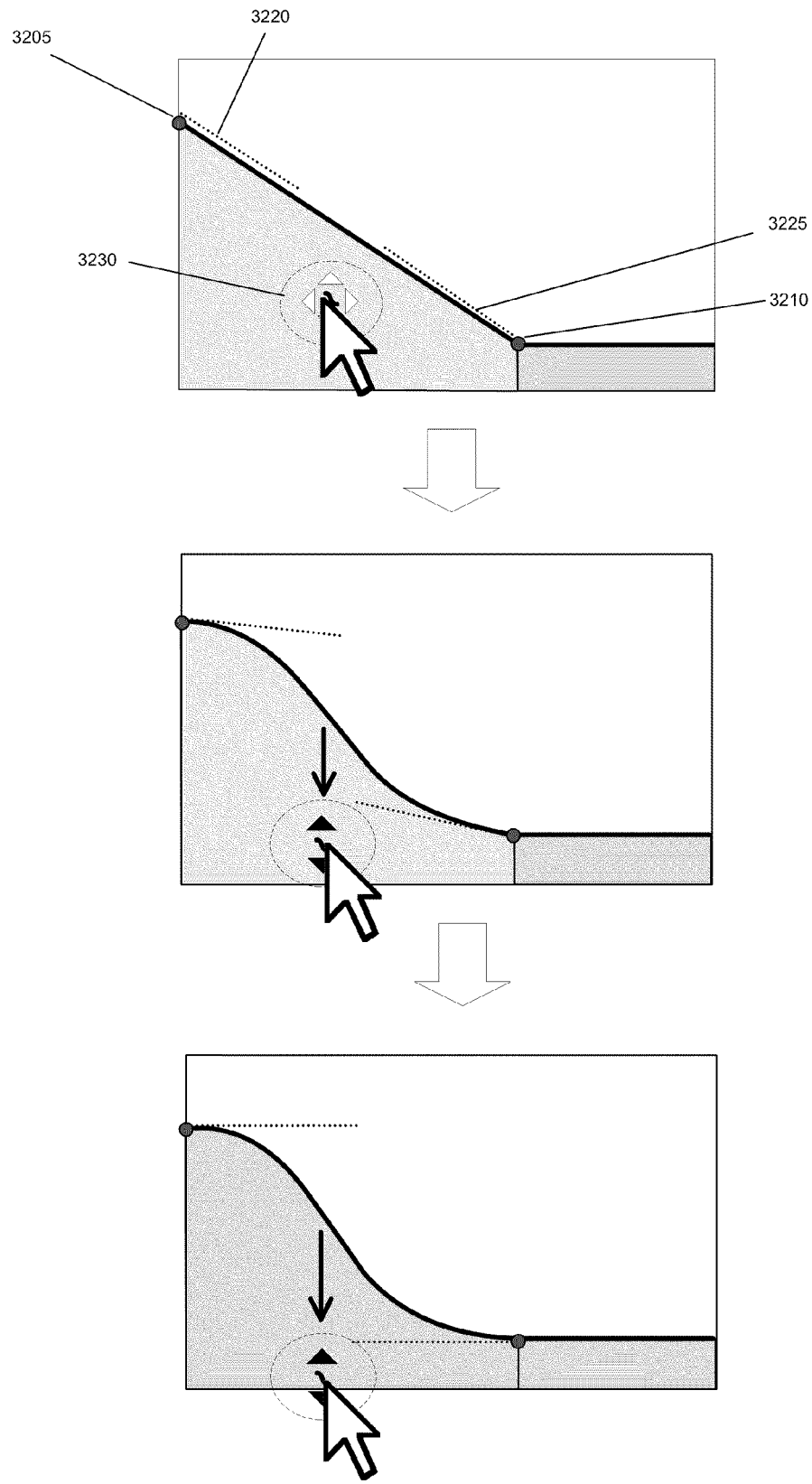

In some embodiments, the selection and movement of an interior location modifies tangents at key indices. In some embodiments, the interpolation between the key indices is a parameterizable curve that is defined by the tangents. The parameterizable curve is a bezier spline in some embodiments. FIGS. 32-33 illustrate several examples of modifying the angle of the tangents at key indices 3205 and 3210. In these examples, a segment 3215 of the graph is defined by the two key indices 3205 and 3210 and the tangents at the two key indices. Also, for illustrative purposes, two dashed lines 3220 and 3225 that represent the tangents are shown.

FIG. 32 illustrates an example of modifying the angle of the tangents at the key indices by selecting and moving an interior location upwards towards a segment of the line graph. As shown, when the interior location 3230 is selected, the tangents at the two key indices 3205 and 3210 are initially parallel to one another. However, the upward movement affects the tangents 3220 and 3225 at the key indices 3205 and 3210. Specifically, in this example, the upward movement causes the tangent 3220 at the key index 3205 to move downwards while at the same time causing the tangent 3225 at the key index 3210 to move upwards.

FIG. 33 illustrates an example of the affecting the angle of the tangents at the key indices by selecting and moving the interior location 3230 downwards away from the segment of the line graph. Specifically, this figure illustrates that the downward movement of selected interior location causes the tangent 3220 at the key index 3205 to move upwards while at the same time causing the tangent 3225 at the key index 3210 to move downwards.

In FIGS. 32 and 33, the selected internal location is horizontally halfway in between the two key indices and the angles of the tangents 3220 and 3225 are modified equally. In some embodiments, the amount of modification to the angle of the tangent is weighted depending on the location of the internal selection point. For instance, if the selection point is closer to a first key index than a second key index, the tangent at the first key index will be modified by a greater amount than at the second key index. In some embodiments, the angle modification is weighted such that the inflection point of the curve between the two key indices is at the horizontal coordinate of the selection location.

In conjunction with affecting the angle of the tangents, or instead of it, in some embodiments, the selection and movement of an interior location affects the length of the tangents at key indices. In some such embodiments, the lengths of tangents at the key indices are weighted such that the movement causes the length of one tangent to become shorter while causing the length of another tangent to become longer.

Figure 34:
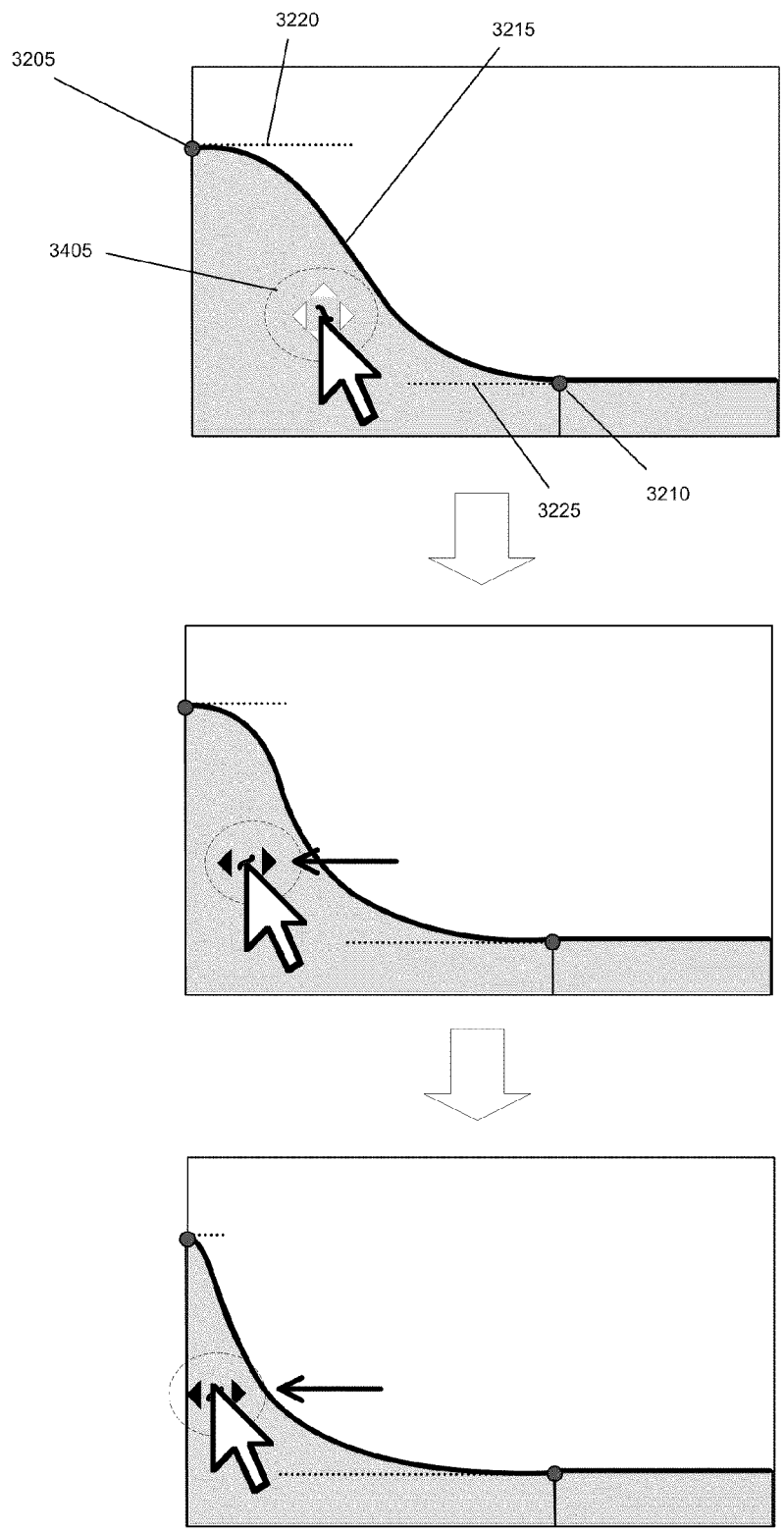
FIGS. 34-35 illustrate several examples of the affecting the lengths of tangents at key indices by selecting and moving an interior location horizontally.
Figure 35:
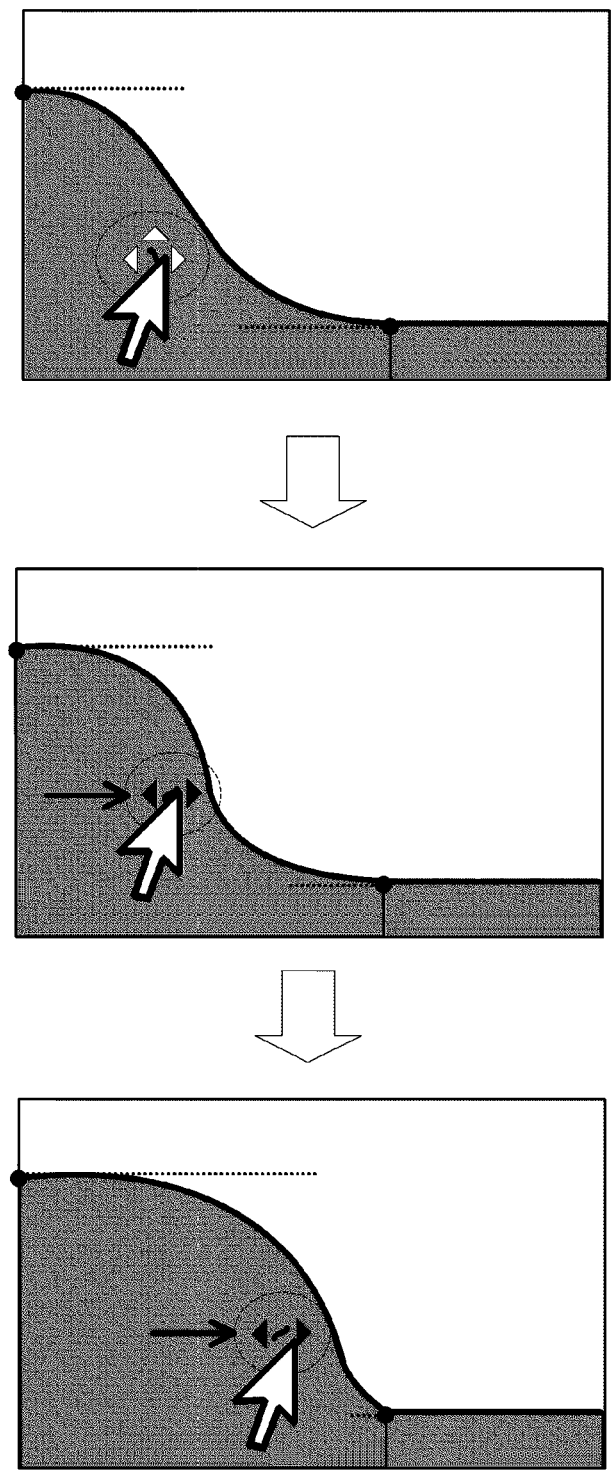

FIGS. 34-35 illustrate several examples of the affecting the lengths of tangents at the key indices by selecting and moving an interior location 3405 horizontally. Specifically, FIG. 34 illustrates that the selection and horizontal movement of the selected interior location 3405 away from the segment 3215 causes the tangent 3220 at the key index 3205 to become shorter while causing the tangent 3225 at the key index 3210 to become longer. Similarly, FIG. 35 illustrates that the selection and horizontal movement of the selected interior location towards the segment 3215 causes the tangent 3220 at the key index 3205 to become longer while causing the tangent 3225 at the key index 3210 to become shorter.

As shown, in some embodiments, moving the cursor horizontally towards a first key index and away from a second key index shortens the tangent at the first key index and lengthens the tangent at the second key index. In some cases, as in the examples, this causes the inflection point of the curve to move with the cursor towards the first key index. This is because, in some embodiments, the length of a tangent at a key index defines the sharpness of the curve moving away from the key index—the shorter the tangent, the sharper the curve.

In the examples of FIGS. 34 and 35, the selection point is vertically halfway between the two key indices. In some embodiments, the amount of modification to the length of the tangents is weighted based on the internal selection point. That is, if the selection point is closer to a first key index than a second key index, the tangent at the first key index will be modified more than the tangent at the second key index.

The above examples illustrate the definition of a parameterizable curve based on control points that are on the curve (the key indices) and tangents at the control points. One example of such a parameterizable curve is a bezier spline. Some embodiments use parameterizable curves defined by (i) control points not on the curve and (ii) a control polygon. One example of such a parameterizable curve is a b-spline. One of ordinary skill in the art will recognize that interpolations between key indices may use other parameterizable curves.

Some embodiments allow a curve between two key indices to be formed freely. For instance, in some such embodiments, the user can grab a region within an area of a key-indexed graph and push or pull the region in any way to freely form the curve between the two key indices. Alternative, or conjunctively, some embodiments constrain the movement that the user can make. Such constraint puts a limit on the movement to provide for a more precise interpolation between the two key indices.

Figure 36:
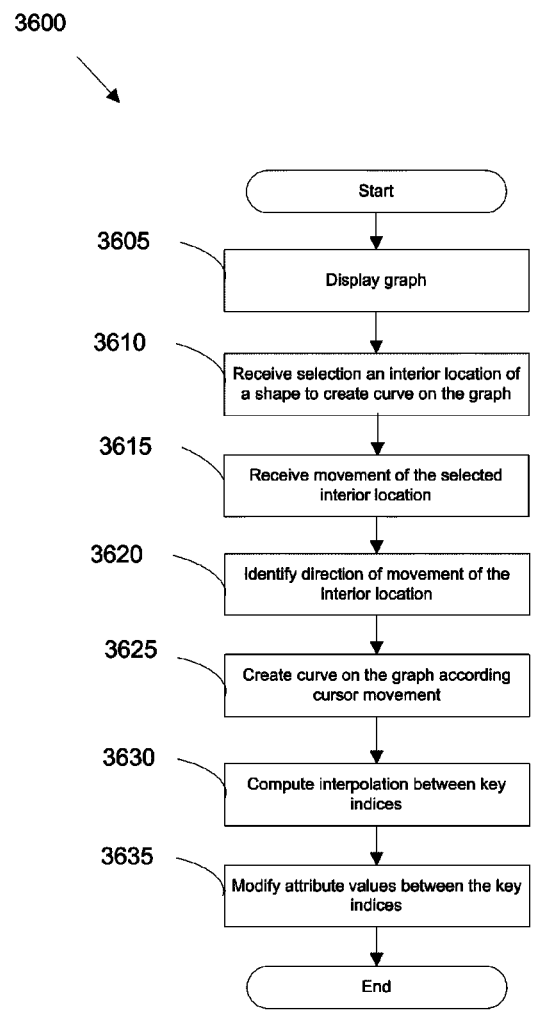
FIG. 36 illustrates a process of some embodiments for creating a curve on a graph by selecting and moving an interior location within a shape that is defined by the graph.

The preceding section described various examples of creating a curve on a graph by selecting and moving an interior location within a shape that is defined by the graph. FIG. 36 illustrates a process 3600 of some embodiments for creating a curve on a graph by selecting and moving an interior location within a shape that is defined by the graph. Process 3600 is performed by a media editing application in some embodiments. The process 3600 starts at when it displays (at 3605) a key-indexed graph. Several examples of displaying such key-indexed graphs are illustrated in FIGS. 28-35.

The process 3600 then receives (at 3610) selection of an interior location within a shape defined by the key-indexed graph to create the curve on the graph. For instance, as noted above, the selection could be a mouse click combined with a key combination, or a right click. Next, the process receives (at 3615) movement of the selected interior location. For instance, when the input includes a mouse click, the movement is movement of the mouse in some embodiments. The process then identifies (at 3620) the direction of this movement of the selected interior location. For instance, the process identifies whether the movement is left, right, up, down, or diagonal. One example of such selection and movement of an interior location is described above by reference to FIG. 28.

Next, process 3600 creates (at 3625) a curve on the graph in accordance with the cursor movement and selected location. Several examples of creating such curves are described above by reference to FIGS. 28-35. In some embodiments, the curve is a parameterizable curve (e.g., a bezier spline) defined by the key indices and tangents at the key indices. In conjunction with forming the curve on the graph, the process computes the interpolation between key indices (e.g., by applying bezier mathematics when the curve is a bezier spline, or similar computations for other parameterizable curves). The process also (at 3635) modifies the attribute values between the key indices.

One of ordinary skill in the art will realize that not all features for creating parameterizable curves between key indices need to be used together. Accordingly, some embodiments perform variations on the process 2700. For example, in some embodiments the operations of process 2700 might be performed by two or more separate processes. That is, some embodiments could have one process for horizontal movement and a separate process for vertical movement.

F. Modifying a Section of a Graph Independently of Neighboring Section

Figure 37:
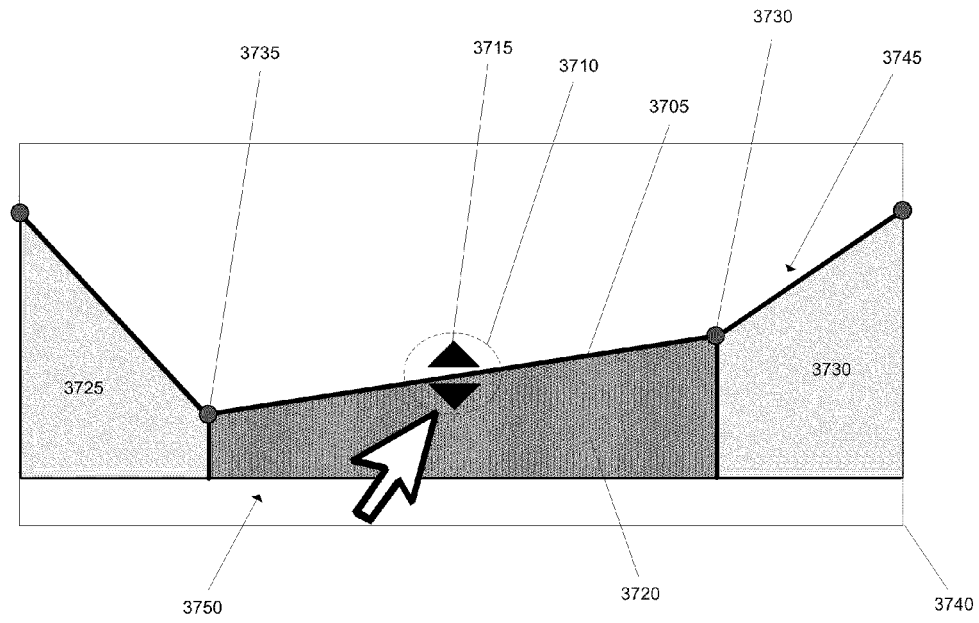
FIG. 37 illustrates an example of receiving selection of a section of a graph for independent modification.
Figure 38:
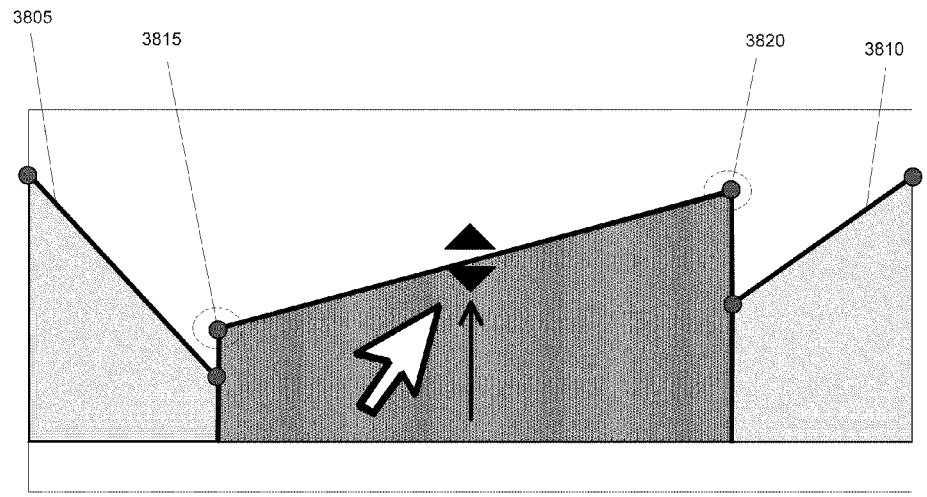
FIG. 38 illustrates moving a section of the graph vertically to separate the section from other neighboring sections of the graph.
Figure 39:
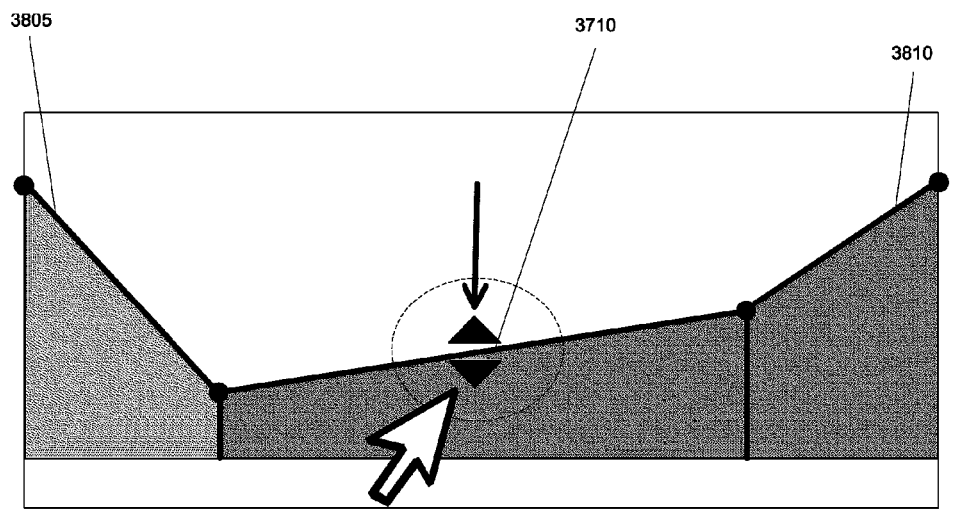
FIG. 39 illustrates realigning a section of a graph with several other neighboring sections.

FIGS. 37-39 illustrate examples of selecting and modifying a section of a graph independently of other neighboring sections. In particular, these figures illustrate (i) receiving selection of the section for independent modification, (ii) moving the section to separate it from the other neighboring sections, and (iii) moving the section to realign it with the other neighboring sections. In these examples, a section 3705 of a graph 3745 is initially defined by key indices 3735 and 3730. Also, a region 3720 of a shape 377 is defined by the section 3705.

FIG. 37 illustrates an example of receiving selection of the section 3705 for independent modification. In this example, the cursor selection (e.g., a cursor click operation such as a contextual click within) of a part 3710 of the section causes directional arrows 3715 to appear in a graph editing window 3740. These arrows indicate that the section 3705 is selected and can be moved in two different directions. Alternative, or conjunctively, some embodiments change the appearance (e.g., color, pattern) of a region of a shape that is associated with a section of a graph. For instance, in FIG. 37, the cursor selection of the part 3710 of the section causes the region 3720 to change its color. Specifically, the cursor selection causes the region 3720 to change its color so that the region appears distinct from other neighboring regions 3725 and 3730 of the shape.

FIG. 38 illustrates moving the section 3705 vertically to separate the section from other neighboring sections of the graph. Specifically, this figure illustrates separating the section 3705 from sections 3805 and 3810. As shown, the movement of the part 3710 of the section causes the section 3705 to be broken apart from the sections 3805 and 3810. As the section 3705 defines the region 3720, the vertical movement also causes the region 3720 to be resized. However, the movement does not affect the other sections (3805 and 3810) and the other regions (3725 and 3730) that are defined by these other sections.

To facilitate such independent modification, some embodiments automatically create one or more new key indices when a section is split away from another section. For instance, in FIG. 38, as a result of the movement, the section 3705 is defined by two new key indices 3815 and 3820, and is no longer defined by the key indices 3735 and 3730.

Allowing a section of a graph to be modified independently of another section is particularly useful in creating a sudden transition in an attribute between two key indices. For instance, in FIG. 38, if the graph 3745 represents a brightness attribute of a video clip, then the brightness value at the key index 3735 will suddenly rise to about double at the following key index 3815. Also, the brightness at the key index 3820 will suddenly fall to about half at the following key index 3730. In some embodiments, when a section of a graph is separated, a new key index is created one key index away from an existing key index. In other words, if the key index represents a sample of audio, then the new key index might represent the next or previous sample of audio. Similarly, if the key index represents a frame of video, then the new key index might represent the next or preview frame of video.

FIG. 39 illustrates realigning the section 3705 with the sections 3805 and 3810. Specifically, it illustrates realigning these sections (3705, 3805, and 3810) by moving the part 3710 of the section downwards. When the movement causes a section of a graph to be realigned with another section, some embodiments modify the appearance (e.g., color, pattern) of a region of a shape that is defined by the section. For instance, in FIG. 39, when the section 3705 is realigned with the neighboring sections 3805 and 3810, the region 3720 changes its color to indicate that the sections are realigned. Specifically, in this example, the movement causes the region 3720 to revert back to its original color (i.e., one that matches the regions 3725 and 3730). Alternatively, or conjunctively, some embodiments provide a snapping function for aligning two or more sections of a key-indexed graph that are not aligned. In some such embodiments, the snapping function causes a first vertex of one section that is next to or near a second vertex of another section to snap together.

When a section is realigned with another section, some embodiments maintain the new key indices that were created as a result of the separation. Alternatively, the new key indices may also be automatically deleted. For instance, in FIG. 39, the key indices 3815 and 3820 are automatically deleted when the section 3705 is realigned with the sections 3805 and 3810.

Figure 40:
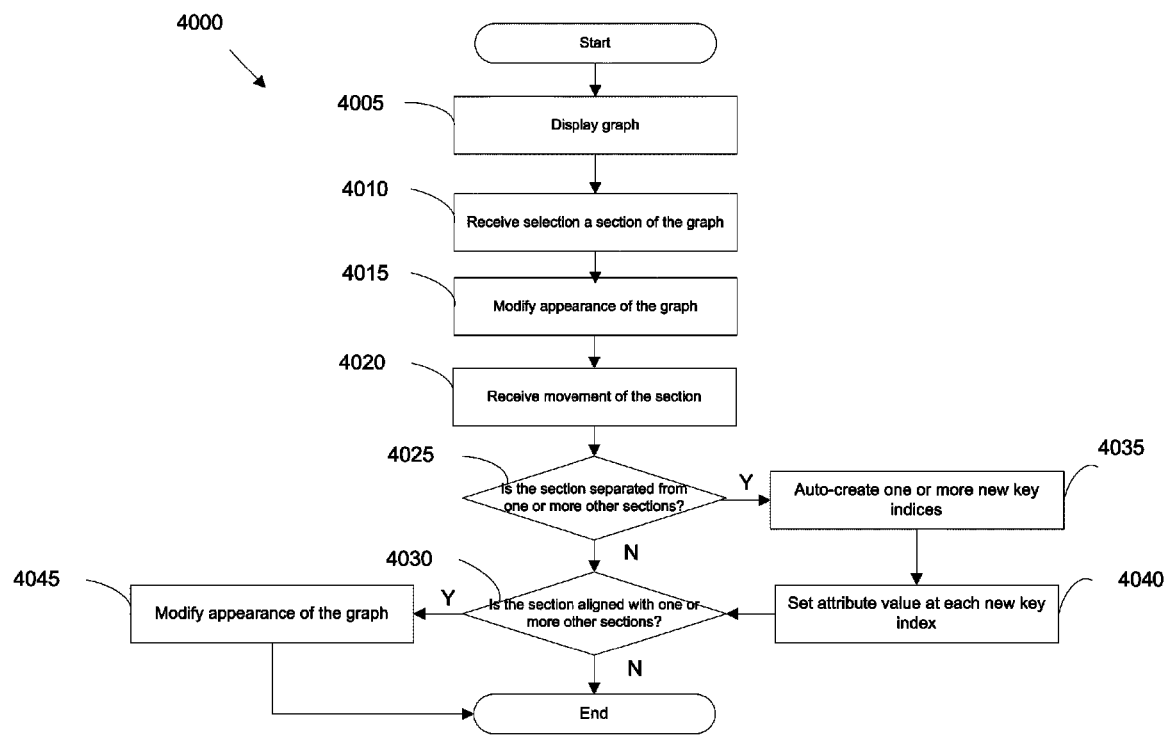
FIG. 40 illustrates a process of some embodiments for selecting and modifying a section of a graph independently of a neighboring section.

The preceding section described various examples of selecting and modifying a section of graph independently of another section. FIG. 40 illustrates a process 4000 of some embodiments for selecting and modifying a section of a graph independently of a neighboring section. Process 4000 is performed by a media editing application in some embodiments. The process 4000 starts at 4005 when it displays a key-indexed graph. Several examples of displaying such key-indexed graph are illustrated in FIGS. 37-39.

The process 4000 then receives (at 4010) a selection of a section of key-indexed graph. In some embodiments, the section is a portion of the graph between two key indices. One example of receiving such a selection is illustrated in FIG. 37. The process then modifies (at 4015) appearance of the section of the graph. As mentioned above, some embodiments accomplish this by changing the color/and or pattern of a region of a shape that is defined by the selected section.

The process 4000 then receives (at 4020) movement of the selected section of the graph. For instance, the process receives input from a cursor controller to move the selected section up or down. An example of receiving movement of such a selected section is described above by reference to FIG. 38. The process then determines (at 4025) whether the movement caused the section to be separated from another neighboring section. When the section is separated, the process proceeds to 4035; otherwise, it proceeds to 4030.

When the determination is made that the movement separated the selected section from the neighboring section, the process 4000 automatically creates (at 4035) one or more new key indices. That is, at the boundaries between sections, there are two key indices (one for each section) instead of one key index. An example of such automatic creation is described above by reference to FIG. 38. Once the new key indices are created, the process 4000 then sets (at 4040) the attribute values at the new key indices. In some embodiments, the new key index is assigned the value that its bordering key index had prior to the creation of the new key index.

The process 4000 determines whether the movement caused the section to be aligned with another section. When the determination is made that the section is aligned with another section, the process then modifies the appearance of the graph. An example of such modification is described above by reference to FIG. 39.

Some embodiments perform variations on the process 4000. For example, some embodiments might not change the appearance of a graph or shape. Hence, in some such embodiments, the process 4000 might not include the appearance changing operations and only include several other operations. Furthermore, in some embodiments the operations of process 4000 might be performed by two or more separate processes. That is, some embodiments could have one process for separating a section and a separate process for re-aligning sections.

III. Overall Software Architecture

A. Software Architecture of an Application

Figure 41:
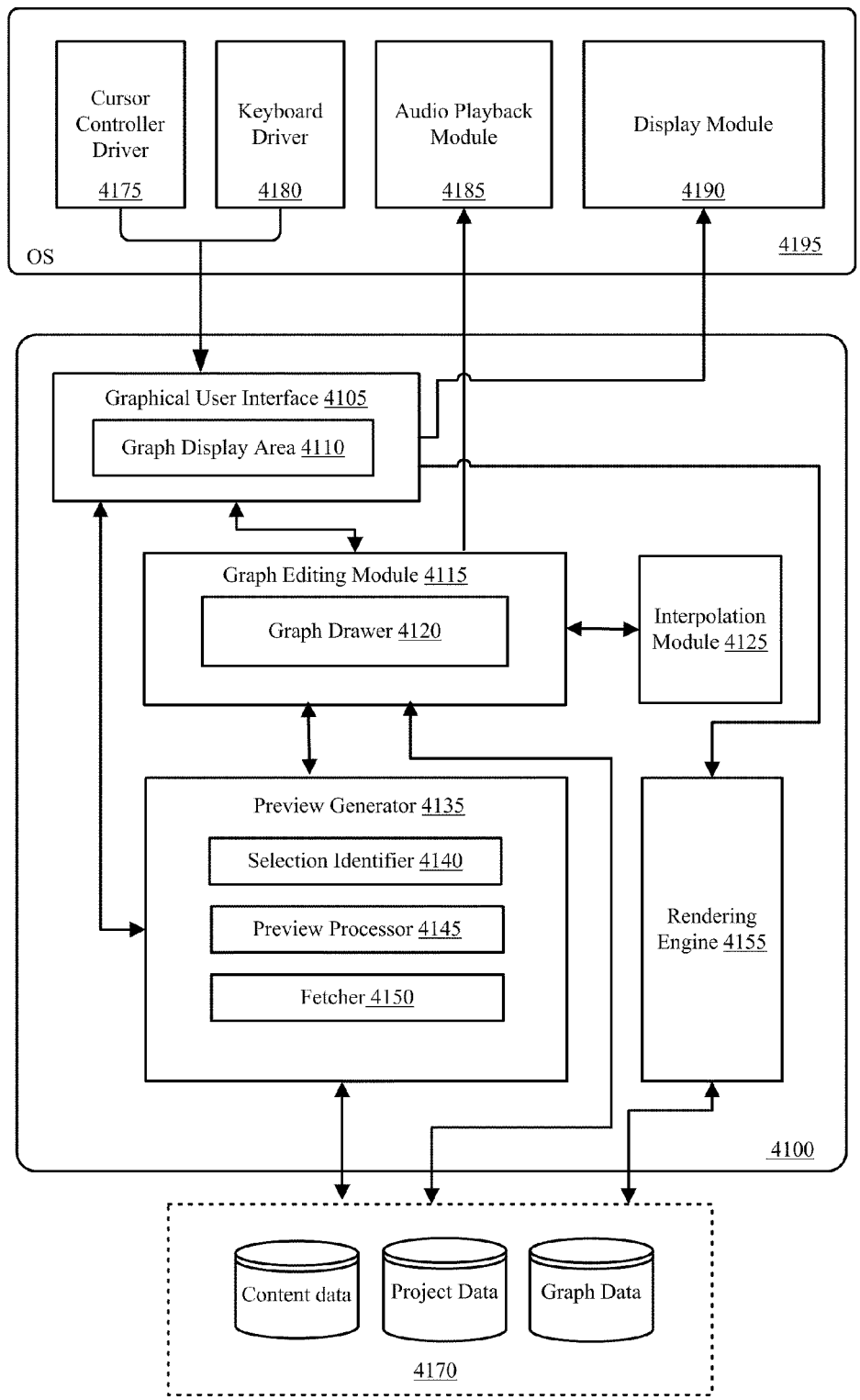
FIG. 41 conceptually illustrates the software architecture of an application of some embodiments.

In some embodiments, the above-described operations and user-interface tools are implemented as software running on a particular machine, such as a desktop computer, laptop, or handheld device, (or stored in a computer readable medium). FIG. 41 conceptually illustrates the software architecture of an application 4100 in accordance with some embodiments. In some embodiments, the application is a stand-alone application or is integrated into another application (for instance, application 4100 might be a portion of a media editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine. In still other embodiments, the components (e.g., engines, modules) illustrated in FIG. 41 are split among multiple applications. For instance, in some embodiments, one application defines one or more key-indexed graphs to use in creating the media presentation, while another application performs composing and rendering of the media presentation based on the key-indexed graphs.

As shown in FIG. 41, the application 4100 includes a graphical user interface 4105, graph editing module 4115, interpolation module 4125, preview generator 4135, and rendering engine 4155. The graphical user interface 4105 provides user-interface tools (e.g., display areas, user-interface controls, user-selectable graph elements, etc.) that a user of the media editing application 4100 interacts with in order to create a media presentation. In some embodiments, the graphical user interface includes a graph display area 4110 that displays one or more key-indexed graphs that can be modified by the user according to one or more of the novel graph-editing operations described above.

When the graph display area 4110 displays a key-indexed graph, some embodiments provide graph-selection and shape-selection capability by defining the key-indexed graph and its associated shape as selectable and modifiable elements (i.e., as items that can be selected and modified by the user).

As shown in FIG. 41, to facilitate graph editing and displaying operations, the media editing application 4100 includes the graph editing module 4115. In some embodiments, when the user inputs instructions to modify a particular key-indexed graph through one of the user-interface tools, the graph editing module 4115 receives and processes these instructions in order to modify and redraw the key-indexed graph in the graphical user interface 4105. As shown in FIG. 41, the graph editing module 4115 in some embodiments includes a graph drawer 4120 for drawing and/or redrawing one or more of the key-indexed graphs in the graphical user interface 4105.

To draw the key-indexed graphs, the graph drawer 4120 in some embodiments receives attributes values from the interpolation module 4125. This interpolation module 4125 in some embodiments is a module in the media editing application 4100 that receives the user modifications to one or more of the key-indexed graphs (e.g., attribute values at key indices, interpolation between the key indices) and performs data interpolation. For instance, in some such embodiments, the interpolation module receives a first attribute value at one key index and a second attribute value at a subsequent key index and fills in (i.e., interpolates) the attribute values between the two key indices in accordance with the interpolation that is defined between the two key indices. In some embodiments, the interpolation module performs the interpolation based on parameterizable curve mathematics in accordance with the angle of the tangents at the key indices and/or the length of the tangents at the key indices.

Preview generator 4135 in some embodiments generates a preview (e.g., real-time preview) of the media presentation that is being created by the media editing application 4100. When the preview generates the preview, it generates the preview by incorporating the media clip into the preview with the attribute values defined by one or more of the key-indexed graph in some embodiments.

As shown in FIG. 41, the preview generator 4135 of some embodiments includes a preview processor 4145 that may be used to communicate with the graph editing module 4115, and send and receive data (e.g., project data) to and from the graphical user interface 4105 and/or the set of data storages 4170. In addition, the preview processor 4145 may send and receive data to and from a section identifier 4140 and/or a fetcher 4150. In some embodiments, the preview processor 4145 sends timeline data to the section identifier 4140 that generates an appropriate set of data (e.g., a segment table) needed to generate the preview. In some embodiments, the preview processor 4145 supplies the set of data generated by the section identifier 4140 to the fetcher 4150. The fetcher 4150 of some embodiments retrieves content data (e.g., video frame data, audio sample data) from the set of data storages 4170 based on the set of data provided by the preview processor 4145. The preview generator 4135 in some embodiments receives and uses the content data in order to generate the preview.

Rendering engine 4155 enables the storage or output of audio and video from the media editing application 4100. For example, the rendering engine 4155 may use attribute values associated with one or more attribute of a media clip to render the media clip for display and/or storage. In some embodiments, the rendering engine 4155 may receive attribute data from the preview generator 4135 in order to generate the preview. In some embodiments, data from the rendering engine 4155 (e.g., audio and video data of a video scene, preview data, etc.) is passed to the graphical user interface 4105 and/or an audio playback module 4185.

The operating system 4195 of some embodiments includes a cursor controller driver 4175 for allowing the application 4100 to receive data from a cursor control device, a keyboard driver 4180 for allowing the application to receive data from a keyboard, the audio playback module 4185 for processing audio data that will be supplied to an audio device (e.g., a soundcard and speakers), and a display module 4195 for processing video data that will be supplied to a display device (e.g., a monitor).

An example operation of the media editing application 4100 will now be described by reference to the components (e.g., engines, modules) illustrated in FIG. 41. A user interacts with user-interface tools (e.g., graphs, shapes defined by the graphs, user-selectable controls, display areas) in the graphical user interface 4105 of the media editing application via input devices such as a cursor controller (e.g., a mouse, touchpad, touch screen, etc.) and keyboard (e.g., physical keyboard, virtual keyboard).

When the user interacts with one or more user-selectable elements of key-indexed graphs and/or other graph modifying items (e.g., controls, menu items) in the graphical user interface 4105, some embodiments translate the user interaction into input data and send this data to the graph editing module 4115. As mentioned above, the graph editing module 4115 in some embodiments receives the input data and processes the input data in order to modify one or more of the key-indexed graphs. For example, when the graph module receives instructions for creating a key index on a key-index graph that is associated with an attribute of a media clip, the graph editing module 4115 processes the input data (e.g., by identifying the location and attribute value) and creates the key index.

When the user input result in a need to modify the interpolation between two or more key indices in a particular key-indexed graph, the editing module 4115 sends the input data to the interpolation module. The interpolation module 4125 receives the input data (e.g., attribute value at key indices, interpolation between the key indices) from the editing module 4115 and performs data interpolation. For instance, in some such embodiments, the interpolation module receives a first attribute value at one key index and a second attribute value at a subsequent key index and fills in (i.e., interpolates) the attribute values between the two key indices in accordance with the interpolation that is defined between the two key indices (e.g., straight line, parameterizable curve, etc.). In some embodiments, the editing modules 4115 receive the attribute values (i.e., graph data) from the interpolation module 4155 and stores the attribute values in memory (e.g., the set of storage 4170). The graph drawer in some embodiments uses these attribute values to generate a display of the particular key-index graph.

In some embodiments, the attribute values that are stored in memory are used by preview generator 4135 in order to generate a preview of the media presentation. As mentioned above, the rendering engine may work in conjunction with the preview generator in order to render the preview for display and/or storage. Alternatively, the rendering engine may work separately from the preview generator in order to render the media presentation for display and/or storage.

B. Data Structure of a Key-Indexed Graph

When a key-indexed graph is displayed in a display area of a graphical user interface (UI), some embodiments provide graph-selection and shape-selection capability by defining the key-indexed graph and its associated shape as selectable and modifiable items in the UI of the media editing application (i.e., as items that can be selected and modified by the user in the UI).

Figure 42:
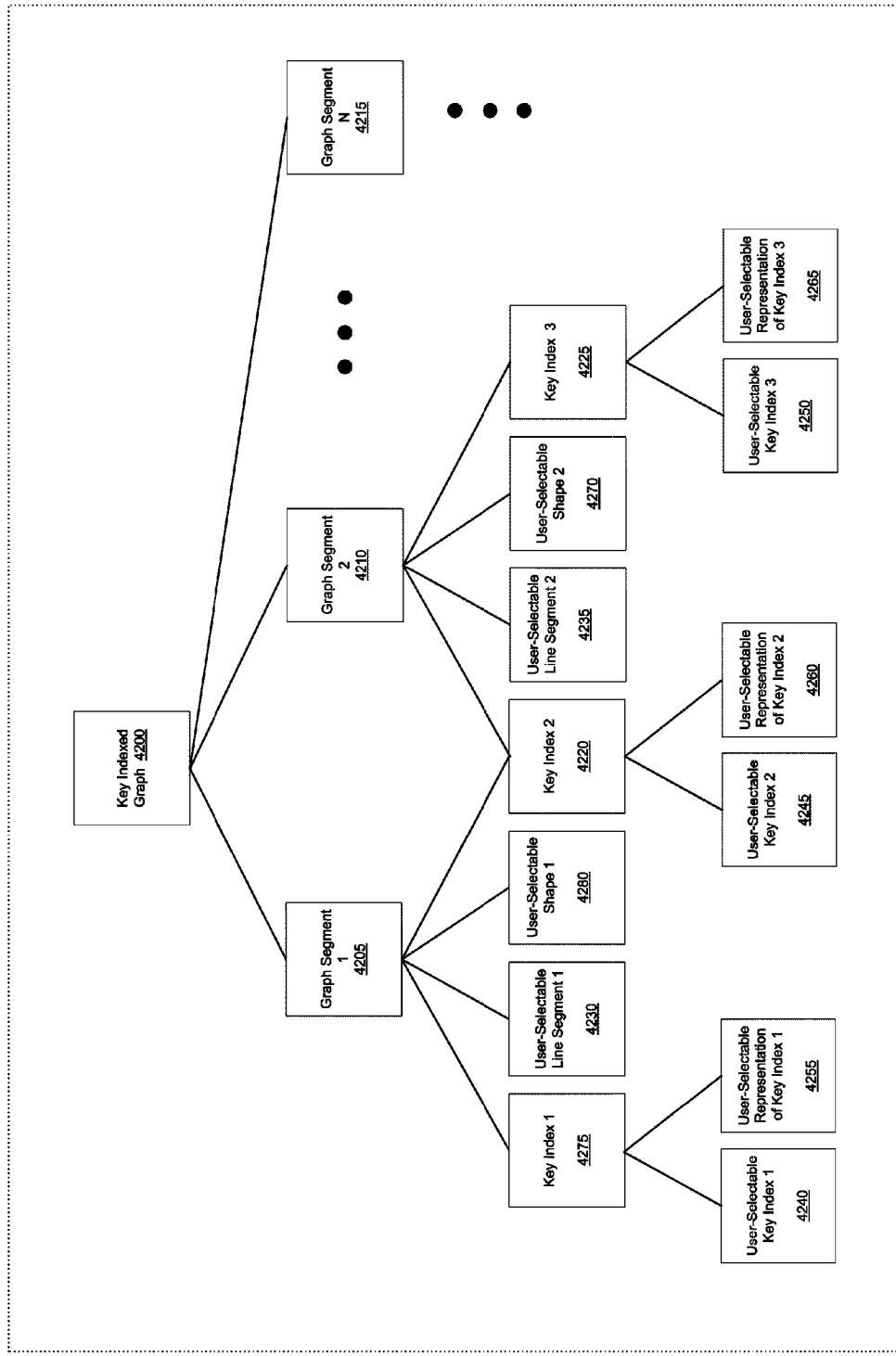
FIG. 42 conceptually illustrates a data structure of a key-indexed graph of some embodiments that may be displayed in a display area of a graphical user interface.

FIG. 42 conceptually illustrates a data structure of a key-indexed graph 4200 of some embodiments that may be displayed in the display area (like the graph display area 4110). In this data structure diagram, the root node represents the key-index graph 4200, while the leaf nodes represent selectable items in the UI. As shown, the key-index graph 4200 includes several segments 4205-4215. Each graph segment includes (i) two key indices that represent the endpoints of the segment, (ii) a user-selectable line segment that represent the segment between the two key indices, and (iii) a user-selectable shape that is defined by the graph segment. For instance, graph segment 1 4205 includes key indices 4275 and 4220 as endpoints, user-selectable line segment 4230 as the segment between the key indices, and a user-selectable shape 1 4280 as the shape.

As shown in FIG. 42, each of the key indices 4275 and 4220 includes two child nodes that represent user-selectable items in the UI. For instance, the key index 1 4275 includes a user-selectable key index 1 4240 at the key index 1 on the line graph and a user-selectable representation 1 4255 (e.g., the representation in the shape). As mentioned above by reference to FIG. 26, some embodiments allow a user to modify a key-indexed graph by selecting and moving a particular user-selectable key index on the graph, such as the user-selectable key index 1 4240. Instead of, or in conjunction with the particular user-selectable key index, some embodiments provide a user-selectable representation (like the user-selectable representation 1 4255) for modifying a key index on a key-index graph. Such user-selectable representation is described above by reference to FIG. 17.

In some embodiments, a graph segment defines a shape as a selectable element in the UI. For instance, in FIG. 42, the graph segment 1 4205 defines the user-selectable shape 1 4280, while the graph segment 2 4210 defines a user-selectable shape 2 4270. The user-selectable shape in some embodiments can be selected and manipulated by a user in order to (i) create and modify a curve on a graph segment of a key-indexed graph, and/or (ii) relocate key indices on the key index graph. Several examples of creating the curve by manipulating such user-selectable shape are described above by reference to FIGS. 28-35. Furthermore, several examples of relocating one or more key indices by manipulating such user-selectable inner area are described above by reference to FIGS. 19-20.

In conjunction with the user-selectable shape, or instead of it, a graph segment may include a user-selectable segment between two key indices. For instance, in FIG. 42, the graph segment 1 includes the user-selectable line segment 1 4230, while the graph segment 2 4210 includes a user-selectable line segment 2 4235. As mentioned above by reference to FIG. 25, such user-selectable line segments in some embodiments allows the user to selectively modify a key-indexed graph without actually selecting any key index.

In a display of a UI, several graph segments of a key index-graph may be adjoined by a common key index. For instance, in FIG. 42, the graph segments 1 and 2 (4205 and 4210) share a common key index (i.e., the key index 2 4220). As a result of sharing one key index, the graph segments 1 and 2 (4205 and 4210) share the user-selectable index 2 4245 and a user-selectable representation 2 4260. Accordingly, when one of the user-selectable representations (4245 and 4260) is selected and moved, it causes both the graph segment (4205 and 4210) to be modified. One example of modifying the slopes of two graph segments of a key-indexed graph by selecting and moving a user-selectable key-index (like the user-selectable key index 2 4245) is illustrated in FIG. 26. Furthermore, an example of modifying the length of the graph segments by selecting and moving a user-selectable representation (like the user-selectable representation 2 4260) is described above by reference to FIG. 18.

In some cases, when two graph segments share one common key index, a selection and movement of a user-selectable shape (like the user selectable shape 1 4280) of the first graph segment may affect the second graph segment. For instance, a selection and movement of an interior location to relocate one or more key indices may affect the lengths of each of the two segments. Several examples of affecting the lengths of two segments by selecting and moving an interior is described above by reference to FIGS. 19-20.

Furthermore, when two graph segments share one common key index, a selection and movement of a user-selectable line segment (like the user-selectable line segment 1 4230) of the first graph segment may affect the second graph segment. For instance, a selection and movement of the user-selectable line segment of the first graph segment may affect the slope of the second graph segment because the shared key index will be moved. An example of modifying the slope of one segment by moving an adjacent segment is described above by reference to FIG. 25.

The key-indexed graph 4200 in FIG. 42 was described above to include certain features. However, one of ordinary skill will realize that not all these features need to be used together. For instance, some embodiments might allow an interior location of a shape to be selected in order to create key indices but might not allow it to be manipulated in order to create a curve. Similarly, some embodiment might allow a key-indexed graph to be selected and moved anywhere along its duration but might not allow a representation of a key index (e.g., line) to be selected and moved.

C. Process for Defining an Application

Figure 43:
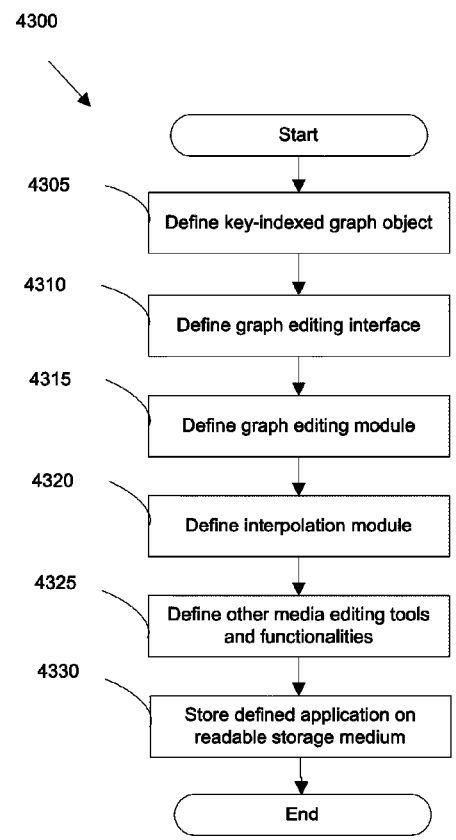
FIG. 43 conceptually illustrates a process of some embodiments for defining an application.

The section above described and illustrated the software architecture of an application in accordance with some embodiments. FIG. 43 conceptually illustrates a process 4300 of some embodiments for defining an application, such as application 4100. As shown, process 4300 begins by defining (at 4305) or more key-indexed graph objects. In some embodiments, the key-indexed graph object includes attributes (e.g., color of a shape, thickness of a graph line) and/or methods that perform a particular function (e.g., change color of the shape, modify the graph line).

Process 4300 then defines (at 4310) a graph editing interface. The graph display area 4110 is an example of such a module. Next, the process defines (at 4315) a graph editing module. As mentioned above, the graph editing module, in some embodiments, receives the instructions from the media editing module and processes the instructions to modify one or more of key-indexed graphs.

The process next defines (at 4320) an interpolation module. The interpolation module 4125 is an example of such a module. Process 4300 next defines (at 4325) other media editing tools and functionalities. After 4325, the application is defined. Accordingly, at 4330, the process 4300 stores a representation of the application in a readable storage medium. The readable storage medium may be a disk (e.g., CD, DVD, hard disk, etc.) or a solid-state storage device (e.g., flash memory) in some embodiments. One of ordinary skill in the art will recognize that the various modules and UI items defined by process 4300 are not exhaustive of the modules and UI items that could be defined and stored on a computer readable storage medium for an editing application incorporating some embodiments of the invention.

IV. Computer System

Many of the above-described processes, modules, and interfaces are implemented as software processes that are specified as a set of instructions recorded on a computer readable storage medium (also referred to as "computer readable medium", "readable storage medium", or "machine readable medium"). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 44:
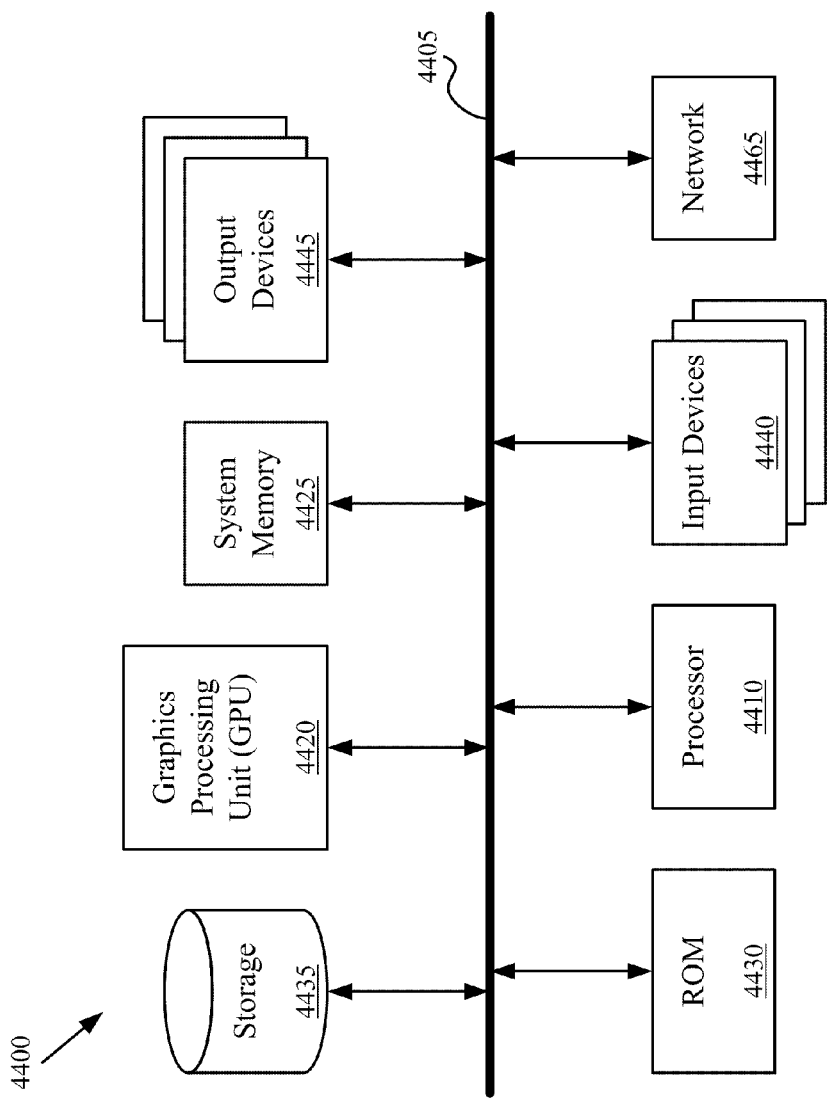
FIG. 44 conceptually illustrates a computer system with which some embodiments of the invention are implemented.

FIG. 44 conceptually illustrates a computer system 4400 with which some embodiments of the invention are implemented. For example, the system described above in reference to FIG. 41 may be at least partially implemented using sets of instructions that are run on the computer system 4400. As another example, the processes described in reference to FIGS. 10, 16, 24, 27, 36, and 40 may be at least partially implemented using sets of instructions that are run on the computer system 4400.

Computer system 4400 includes a bus 4410, a processor 4420, a system memory 4430, a read-only memory (ROM) 4440, a permanent storage device 4450, a graphics processing unit ("GPU") 4460, input devices 4470, output devices 4480, and a network connection 4490. The components of the computer system 4400 are electronic devices that automatically perform operations based on digital and/or analog input signals. The various examples of user interfaces shown in FIGS. 8, 37, 14, 26, 28, 37, and 41 may be at least partially implemented using sets of instructions that are run on the computer system 4400 and displayed using the output devices 4480.

One of ordinary skill in the art will recognize that the computer system 4400 may be embodied in other specific forms without deviating from the spirit of the invention. For instance, the computer system may be implemented using various specific devices either alone or in combination. For example, a local PC may include the input devices 4470 and output devices 4480, while a remote PC may include the other devices 4410-4460, with the local PC connected to the remote PC through a network that the local PC accesses through its network connection 4490 (where the remote PC is also connected to the network through a network connection).

The bus 4410 collectively represents all system, peripheral, and chipset buses that communicatively connect the numerous internal devices of the computer system 4400. For instance, the bus 4410 communicatively connects the processor 4420 with the system memory 4430, the ROM 4440, and the permanent storage device 4450. From these various memory units, the processor 4420 retrieves instructions to execute and data to process in order to execute the processes of the invention. In some embodiments, the processor comprises a Field Programmable Gate Array (FPGA), an ASIC, or various other electronic components for executing instructions. In some cases, the bus 4410 may include wireless and/or optical communication pathways in addition to or in place of wired connections. For example, the input devices 4470 and/or output devices 4480 may be coupled to the system 4400 using a wireless local area network (W-LAN) connection, Bluetooth®, or some other wireless connection protocol or system.

The ROM 4440 stores static data and instructions that are needed by the processor 4420 and other modules of the computer system. The permanent storage device 4450, on the other hand, is a read-and-write memory device. This device is a non-volatile memory unit that stores instructions and data even when the computer system 4400 is off. Some embodiments of the invention use a mass-storage device (such as a magnetic or optical disk and its corresponding disk drive) as the permanent storage device 4450.

Other embodiments use a removable storage device (such as a floppy disk, flash drive, or CD-ROM) as the permanent storage device. Like the permanent storage device 4450, the system memory 4430 is a read-and-write memory device. However, unlike storage device 4450, the system memory 4430 is a volatile read-and-write memory, such as a random access memory (RAM). The system memory stores some of the instructions and data that the processor needs at runtime. In some embodiments, the sets of instructions used to implement the invention's processes are stored in the system memory 4430, the permanent storage device 4450, and/or the read-only memory 4440. For example, the various memory units include instructions for processing multimedia items in accordance with some embodiments. From these various memory units, the processor 4410 retrieves instructions to execute and data to process in order to execute the processes of some embodiments.

In addition, the bus 4410 connects to the GPU 4460. The GPU of some embodiments performs various graphics processing functions. These functions may include display functions, rendering, compositing, and/or other functions related to the processing or display of graphical data.

The bus 4410 also connects to the input devices 4470 and output devices 4480. The input devices 4470 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 4480 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 44, bus 4410 also couples computer 4400 to a network 4490 through a network adapter (not shown). In this manner, the computer can be a part of a network of computers (such as a local area network ("LAN"), a wide area network ("WAN"), an Intranet, or a network of networks, such as the Internet. For example, the computer 4400 may be coupled to a web server (network 4490) so that a web browser executing on the computer 4400 can interact with the web server as a user interacts with a GUI that operates in the web browser.

As mentioned above, the computer system 4400 may include electronic components, such as microprocessors, storage and memory that store computer program instructions in one or more of a variety of different computer-readable media (alternatively referred to as computer-readable storage media, machine-readable media, machine-readable storage media, readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. It should be recognized by one of ordinary skill in the art that any or all of the components of computer system 4400 may be used in conjunction with the invention. Moreover, one of ordinary skill in the art will appreciate that any other system configuration may also be used in conjunction with the invention or components of the invention.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) user-interface elements in the graphical user interface. However, in some embodiments, these user-interface elements in the graphical user interface can also be controlled or manipulated through other control, such as touch control. In some embodiments, touch control is implemented through an input device that can detect the presence and location of touch on a display of the device. An example of such a device is a touch screen device. In some embodiments, with touch control, a user can directly manipulate user-interface elements by interacting with the graphical user interface that is displayed on the display of the touch screen device. For instance, a user can select a particular user-selectable element in the graphical user interface by simply touching that particular user-selectable element on the display of the touch screen device. As such, when touch control is utilized, a cursor may not even be provided for enabling selection of a user-selectable element of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms (i.e., different embodiments may implement or perform different operations) without departing from the spirit of the invention. One of ordinary skill in the art would also recognize that some embodiments may divide a particular module into multiple modules. In addition, although the examples given above may discuss accessing the system using a particular device (e.g., a PC), one of ordinary skill will recognize that a user could access the system using alternative devices (e.g., a cellular phone, PDA, smartphone, BlackBerry®, or other device).

One of ordinary skill in the art will realize that, while the invention has been described with reference to numerous specific details, the invention can be embodied in other specific forms without departing from the spirit of the invention. For instance, alternate embodiments may be implemented by using a generic processor to implement the video processing functions instead of using a GPU. One of ordinary skill in the art would understand that the invention is not to be limited by the foregoing illustrative details, but rather is to be defined by the appended claims.

The invention claimed is:

1. A method of providing a media editing application comprising a graphical user interface (GUI) for editing media content, said method comprising:
    to represent an attribute of a media item along a dimension, defining a key-indexed graph that spans along the dimension, and that comprises (i) at least two key indices at two different locations along the dimension to specify values of the attribute at the two different locations and (ii) a segment between the two key indices that defines a rate of change in the attribute values between the two key indices; and
    to modify the key-indexed graph without selection of any key indices, defining a selectable region below the key-indexed graph that when selected and moved, remains below the graph but changes a shape of the segment of the key-indexed graph in order to change the rate of change of the attribute values between the two key indices.

2. The method of claim 1, wherein said media item is a media clip, wherein said media editing application creates a media presentation of the media clip by incorporating the media clip into the media presentation with the attribute values specified by the key-indexed graph.

3. The method of claim 2, wherein said media editing application incorporates the media clip into the media presentation by interpolating attribute values in between the key indices based on the shape of the segment.

4. The method of claim 1, wherein said media item is a media editing operation.

5. The method of claim 4, wherein said media editing operation is a filter operation for creating an effect in a media presentation, wherein said media editing application creates the media presentation in accordance with the attribute values of the filter operation that are specified by the key-indexed graph.

6. The method of claim 1, wherein the key-indexed graph spans horizontally along the dimension, wherein selection and movement of the segment of the key-indexed graph between the two key indices along a vertical direction moves the two key indices in unison to modify the attribute values at the two locations by a constant value.

7. The method of claim 1, wherein the key-indexed graph comprises a third key index, and another segment between the third key index and one of the two key indices, wherein selection and movement of the segment separates the segment from at least the other segment.

8. The method of claim 7, wherein the selection and movement of the segment automatically creates at least one key index adjacent to one of the two key indices in order to create a sudden transition in the attribute values.

9. The method of claim 1, wherein the selection and movement of the region changes the shape by forming a curve on the segment of the key-indexed graph.

10. The method of claim 1 further comprising providing, in said GUI, a preview display area for displaying a real-time preview of the media item in accordance with the attribute values specified by the key-indexed graph.

11. The method of claim 1, wherein the media item is a media clip that is part of a composite presentation, the method further comprising defining a composite display area for displaying representations of one or more pieces of media clips that are part of the composite presentation.

12. A method of providing a media editing application comprising a graphical user interface (GUI) for editing media presentations, said method comprising:
    to represent an attribute of a media item along a dimension, defining a key-indexed graph that spans the dimension and that comprises (i) a plurality of key indices at different locations along the key-index graph to specify values of the attribute at the different locations and (ii) a segment between at least two key indices that defines the attribute values between the two key indices; and
    to modify said key-indexed graph without selection of any key indices, defining a selectable region that remains underneath the segment of the key-indexed graph that when selected (i) creates a new key index on the key-indexed graph at a location about the selected region and (ii) displays on the selected region a representation of the new key index that is movable along the dimension to move the location of the key index along the key-indexed graph.

13. The method of claim 12, wherein the selectable region is a shape that is formed underneath the segment of the key-indexed graph.

14. The method of claim 9, wherein the selection and movement of the region creates the curve by pushing out a first portion of the segment of the key-indexed graph while pulling in a second portion of the segment of the key-indexed graph.

15. The method of claim 9, wherein the selection and movement of the region creates a concave or convex curve on the segment of the key-indexed graph.

16. The method of claim 9, wherein the selection and movement of the region creates the curve by modifying the angle of tangents at the two key indices.

17. The method of claim 16, wherein the amount of modification to the angle of the tangent is weighted depending on a location of the region with respect to the two key indices, wherein when the selected region is closer to a first key index than a second key index, the angle of the tangent at the first key index is modified by a greater amount than at the second key index.

18. The method of claim 9, wherein the selection and movement of the region creates the curve by affecting the length of tangents at the two key indices.

19. The method of claim 18, wherein the amount of modification to the lengths of tangents at the key indices are weighted such that the movement causes a length of one tangent to become shorter while causing a length of another tangent to become longer.

20. The method of claim 9, wherein the curve created by the selection and movement of the region is a parameterizable curve.

21. The method of claim 20, wherein the parameterizable curve is one of a bezier curve and a b-spline curve.

22. The method of claim 9, wherein said curve defines an interpolation of the attribute values between the two key indices.

23. The method of claim 12, wherein the selection of the region causes the new key index to be created on the key-indexed graph at the horizontal coordinate of the selected region.

24. The method of claim 23, wherein the key-indexed graph spans along the dimension in a horizontal direction, wherein the representation comprises a line that spans across the region in a vertical direction at the location of the new key index.

25. The method of claim 24, wherein the line is movable along the dimension to move the location of the new key index on the key-indexed graph.

26. The method of claim 12, wherein the region changes color or pattern based on user-modifications to said key-indexed graph.

27. A non-transitory computer readable medium storing a computer program that when executed by at least one processing unit provides a graphical user interface (GUI), the GUI comprising:

to represent an attribute of a media item along a dimension, a key-indexed graph that spans along the dimension, and that comprises (i) at least two key indices at two different locations along the dimension to specify values of the attribute at the two different locations and (ii) a segment between the two key indices that defines a rate of change in the attribute values between the two key indices; and to modify the key-indexed graph without selection of any key indices, a selectable region below the key-indexed graph that when selected and moved, does not move above the key-indexed graph but changes a shape of the segment of the key-indexed graph in order to change the rate of change of the attribute values between the two key indices.

28. A non-transitory computer readable medium storing a computer program that when executed by at least one processing unit provides a graphical user interface (GUI), the GUI comprising:

to represent an attribute of a media item along a dimension, a key-indexed graph that spans the dimension and that comprises (i) a plurality of key indices at different locations along the key-index graph to specify values of the attribute at the different locations and (ii) a segment between at least two key indices that defines the attribute values between the two key indices; and to modify said key-indexed graph without selection of any key indices, a selectable region that remains underneath the segment of the key-indexed graph that when selected (i) creates a new key index on the key-indexed graph at a location about the selected region and (ii) displays on the selected region a representation of the new key index that is movable along the dimension to move the location of the key index along the key-indexed graph.

29. The non-transitory computer readable medium of claim 28, wherein the selectable region is a shape that is formed underneath the segment of the key-indexed graph.

30. The non-transitory computer readable medium of claim 28, wherein the key-indexed graph spans along the dimension in a horizontal direction, wherein the representation comprises a line that spans across the region in a vertical direction at the location of the new key index.

31. The non-transitory computer readable medium of claim 27, wherein the movement of the selected region toward the segment forms a curve on the segment by pushing out at least a portion of the segment.

32. The non-transitory computer readable medium of claim 27, wherein the movement of the selected region away from the segment forms a curve on the segment by pulling in at least a portion of the segment.

* * * * *